US012288300B2

(12) United States Patent
Sadalgi et al.

(10) Patent No.: US 12,288,300 B2
(45) Date of Patent: Apr. 29, 2025

(54) TECHNIQUES FOR VIRTUAL VISUALIZATION OF A PRODUCT IN A PHYSICAL SCENE

(71) Applicant: Wayfair LLC, Boston, MA (US)

(72) Inventors: Shrenik Sadalgi, Cambridge, MA (US); Christian Vázquez, Revere, MA (US)

(73) Assignee: Wayfair LLC, Boston, MA (US)

( * ) Notice: Subject to any disclaimer, the term of this patent is extended or adjusted under 35 U.S.C. 154(b) by 0 days.

(21) Appl. No.: 18/492,639

(22) Filed: Oct. 23, 2023

(65) Prior Publication Data

US 2024/0054738 A1 Feb. 15, 2024

Related U.S. Application Data

(63) Continuation of application No. 17/476,313, filed on Sep. 15, 2021, now Pat. No. 11,836,867.

(60) Provisional application No. 63/135,481, filed on Jan. 8, 2021, provisional application No. 63/135,490, filed on Jan. 8, 2021, provisional application No. 63/079,429, filed on Sep. 16, 2020.

(51) Int. Cl.
*G06T 19/00* (2011.01)
*G06T 15/50* (2011.01)

(52) U.S. Cl.
CPC ............ *G06T 19/006* (2013.01); *G06T 15/50* (2013.01); *G06T 19/003* (2013.01); *G06T 2219/008* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

| 7,523,411 B2 | 4/2009 | Carlin |
| 10,482,674 B1 | 11/2019 | Wu et al. |
| 11,176,752 B1 * | 11/2021 | Agarwal ............ G06Q 30/0643 |
| (Continued) | | |

FOREIGN PATENT DOCUMENTS

CN 111134496 A 5/2020

OTHER PUBLICATIONS

International Search Report and Written Opinion mailed Jan. 24, 2022 for International Application No. PCT/US2021/050513.

(Continued)

*Primary Examiner* — Yingchun He
(74) *Attorney, Agent, or Firm* — Wolf, Greenfield & Sacks, P.C.

(57) ABSTRACT

Described herein is a method for generating a two-dimensional (2D) image of one or more products within a physical scene is provided. The method comprises: obtaining, via a communication network from another computing device, an image of the physical scene; obtaining, via the communication network from the other computing device, position information indicative of a target position of a first product in the physical scene; rendering a 2D image of a second product in the physical scene using the image of the physical scene, the position information, and a 3D model of the second product; and providing, via the communication network to the other computing device, the rendered 2D image of the second product in the physical scene for display by the other computing device.

23 Claims, 25 Drawing Sheets

(56) References Cited

U.S. PATENT DOCUMENTS

| | | | |
|---|---|---|---|
| 2012/0113141 A1 | 5/2012 | Zimmerman et al. | |
| 2014/0327666 A1* | 11/2014 | Suzuki | G06T 19/006 345/419 |
| 2018/0114264 A1* | 4/2018 | Rafii | G06T 15/50 |
| 2019/0051052 A1 | 2/2019 | Corazza et al. | |
| 2019/0197599 A1 | 6/2019 | Zia et al. | |
| 2019/0197779 A1 | 6/2019 | Avramov et al. | |
| 2019/0221040 A1 | 7/2019 | Shantharam et al. | |
| 2019/0362540 A1 | 11/2019 | Chen et al. | |
| 2020/0060007 A1 | 2/2020 | Harrison et al. | |
| 2021/0065440 A1 | 3/2021 | Sunkavalli et al. | |
| 2022/0084296 A1 | 3/2022 | Sadalgi et al. | |

OTHER PUBLICATIONS

International Preliminary Report on Patentability for International Application No. PCT/US2021/050513 dated Mar. 30, 2023.
[No Author Listed], Adobe Dimension. Adobe. 2022. 10 pages. https://www.adobe.com/products/dimension.html. (Last accessed Apr. 4, 2022).
[No Author Listed], Matterport. 2022. 15 pages. https://matterport.com/ (Last accessed Apr. 4, 2022).
[No Author Listed], Ikea Place. Apple App Store. 2022. 4 pages. https://apps.apple.com/us/app/ikea-place/id1279244498. (Last accessed Apr. 4, 2022).
[No Author Listed], Amazon AR View. Amazon. 2022. 3 pages. https://www.amazon.com/adlp/arview. (Last accessed Apr. 4, 2022).
[No Author Listed], Floorplanner. 2022. 14 pages. https://floorplanner.com/. (Last accessed Apr. 4, 2022).
[No Author Listed], Houzz. Apple App Store. 2022. 4 pages. https://apps.apple.com/us/app/houzz-home-design-remodel/id399563465. (Last accessed Apr. 4, 2022).
[No Author Listed], Measurement Accuracy in Matterport Spaces. Matterport. 2022. 24 pages. https://support.matterport.com/hc/en-us/articles/212629928-How-accurateare-dimensions-in-Matterport-Spaces—(Last accessed Apr. 4, 2022).
[No Author Listed], How Does Modsy Work ?: See Our Online Interior Design Process. Modsy. 2020. 5 pages. https://www.modsy.com/how-it-works/ (Last accessed Apr. 4, 2022).
[No Author Listed], Ikea Place. Ikea. 2022. 15 pages. https://apps.apple.com/US/app/ikea-place/id1279244498. (Last accessed Apr. 4, 2022).
[No Author Listed], Matterport BundleSDK. 2022. 7 pages. https://matterport.github.io/showcase-sdk/sdkbundle_home.html. (Last accessed Apr. 4, 2022).
[No Author Listed], Occipital. 2022. 7 pages. https://structure.io/ (Last accessed Apr. 4, 2022).
[No Author Listed], Revit. 2022. 10 pages. https://www.autodesk.com/products/revit/overview. (Last accessed Apr. 4, 2022).
[No Author Listed], Roomstyler. 2022. 4 pages. https://roomstyler.com/3dplanner. (Last accessed Apr. 4, 2022).
[No Author Listed], SketchupPro. 2022. 8 pages. https://www.sketchup.com/products/sketchup-pro. (Last accessed Apr. 4, 2022).
[No Author Listed], Virtual Staging Services Overview. Rooomy. 2022. 12 pages. https://rooomy.com/real-estate-virtual-staging-overview/ (Last accessed Apr. 4, 2022).
[No Author Listed], Online Interior Design with Modsy | Living Rooms, Dining Rooms, Bedrooms & More! Modsy. 2022. 7 pages. https://www.modsy.com/ (Last accessed Apr. 4, 2022).
[No Author Listed], IKEA Place: Bridging the Imagination Gap With AR | SPACE10. 2022. 15 pages. https://space10.com/project/ikea-place/. (Last accessed Apr. 4, 2022).
[No Author Listed], Rooomy. 2022. 8 pages. https://rooomy.com/ (Last accessed Apr. 4, 2022).
[No Author Listed], Wayfair View in Room. Apple App Store. 2022. 4 pages. https://apps.apple.com/us/app/wayfair-shop-all-things home/id836767708. (Last accessed Apr. 4, 2022).
Baier et al., Analyzing Online Reviews to Measure Augmented Reality Acceptance at the Point of Sale: The Case of IKEA. Successful Technological Integration for Competitive Advantage in Retail Settings. IGI Global. 2016:1714-36.
Baldwin, NRf2020: Wayfair's journey to 3D imagery. Jan. 2020. https://web.archive.org/web/20200930053454/https://www.essentialretail.com/news/nrf2020-wayfair-3d-imagery/ [Last accessed Sep. 10, 2021].
Brenner, Virtual Reality: The Game Changer for Residential Real Estate Staging through Increased Presence. CMC Senior Theses. 2017:52 pages.
Brucks, Unreal Octahedral Impostors. 2018. 16 pages. https://www.shaderbits.com/blog/octahedral-impostors. (Last accessed Apr. 4, 2022).
Bulearca et al., Augmented reality: A sustainable marketing tool. Global business and management research: An international journal. Apr. 1, 2010;2(2):237-52.
Caboni et al., Augmented reality in retailing: a review of features, applications and value. International Journal of Retail & Distribution Management. 2019;47(11):1125-40.
Carvalho et al., Use of Augmented Reality in the furniture industry. First Experiment@ Int. Conference (exp. at'11), Lisboa, Portugal. 2011. 7 pages.
Chittaro, Visualizing information on mobile devices. Computer. Mar. 20, 2006;39(3):40-5.
Chiu et al., AR filming: augmented reality guide for compositing footage in filmmaking. ACM SIGGRAPH 2017 Posters Jul. 30, 2017:1-2.
Christiansen, The use of Imposters in Interactive 3D Graphics Systems. Department of Mathematicsand Computing Science Rijksuniversiteit Groningen Blauwborgje. 2005;1-8.
Christopoulos et al., Image-based techniques for enhancing virtual reality environments. 2nd International Workshop on ICT's, Arts and Cultural Heritage Nov. 2003. 6 pages.
Debevec, Rendering synthetic objects into real scenes: Bridging traditional and image-based graphics with global illumination and high dynamic range photography. ACM siggraph 2008 classes Aug. 11, 2008:1-10.
Enthed, A retailers way into 3D: IKEA. ACM SIGGRAPH 2013 Studio Talks Jul. 21, 2013. 1 page.
Fournier et al., Common Illumination between Real and Computer Generated Scenes. Proceedings of Graphics Interface'93. 1993. 9 pages.
Gardner et al., Deep parametric indoor lighting estimation. Proceedings of the IEEE/CVF International Conference on Computer Vision 2019:7175-83.
Gardner et al., Learning to predict indoor illumination from a single image. ACM Transactions on Graphics (TOG). Nov. 20, 2017;36(6):176:1-4.
Garun, I Let Strangers Design My Apartment. Aug. 2019. 13 pages. https://www.theverge.com/2019/8/9/20798453/modsy-havenly-ikea-roomstyler-e-interiordesign-services-review-virtual-home-redecoration. (Last accessed Apr. 4, 2022).
Gaspari et al., ARSTUDIO: A virtual studio system with augmented reality features. Proceedings of the 13th ACM SIGGRAPH International Conference on Virtual-Reality Continuum and Its Applications in Industry Nov. 30, 2014:17-25.
Gervautz et al., Anywhere interfaces using handheld augmented reality. Computer. Feb. 21, 2012;45(7):26-31.
Gibson et al., Photorealistic Augmented Reality. Eurographics (Tutorials) Oct. 2003. 40 pages.
Ichikari et al., Mixed reality pre-visualization for filmmaking: On-set camera-work authoring and action rehearsal. Int. J. Virtual Reality. Dec. 2008;7(4):25-32.
Jones et al., Roomalive: Magical experiences enabled by scalable, adaptive projector-camera units. Proceedings of the 27th annual ACM symposium on User interface software and technology Oct. 5, 2014. 8 pages.
Kàn et al., DeepLight: light source estimation for augmented reality using deep learning. The Visual Computer. Jun. 2019;35(6):873-83.
Karsch et al., Automatic scene inference for 3d object compositing. ACM Transactions on Graphics (TOG). Jun. 2, 2014;33(3):32:1-15.
Karsch et al., Rendering Synthetic Objects into Legacy Photographs. arXiv preprint arXiv:1912.11565. Dec. 24, 2019. 12 pages.

(56) References Cited

OTHER PUBLICATIONS

Kronander et al., Photorealistic rendering of mixed reality scenes. Computer Graphics Forum. May 2015;34(2):643-65.
Lane et al., The impact of staging conditions on residential real estate demand. Journal of Housing Research. 2015;24(1):21-36.
Ling et al., ARFMS: An AR-based WYSIWYG Filmmaking System. TELKOMNIKA Indonesian Journal of Electrical Engineering. Jun. 1, 2014;12(6):4345-52.
Makolska et al., CES: ModiFace updates ar beauty makeover tool. Jan. 2016. 4 pages. https://www.stylus.com/ces-modiface-updates-ar-beauty-makeover-tool (Last accessed Apr. 5, 2022).
Mcgrady, 7 Pro Tips to Help Your Home Sell Faster, for More Money. Forbes. 2015. https://www.forbes.com/sites/vanessamcgrady/2015/11/04/staging/?sh=416f38af50c9. (Last accessed Apr. 21, 2022).
Niemelä, Impostor Rendering with Oculus Rift. 2014. 54 pages.
Nowacki et al., Capabilities of arcore and arkit platforms for ar/vr applications. International Conference on Dependability and Complex Systems. Research Gate. 2020. 13 pages.
Ozturkcan, Service innovation: Using augmented reality in the IKEA Place app. Journal of Information Technology Teaching Cases. May 2021;11(1):8-13.
Park et al., "DreamHouse" NUI-based Photo-realistic AR Authoring System for Interior Design. Proceedings of the 7th Augmented Human International Conference. Feb. 25, 2016:1-7.
Pomi et al., Interactive mixed reality rendering in a distributed ray tracing framework (Doctoral dissertation, Verlag nicht ermittelbar). 2005. 3 pages.
Porter et al., Why every organization needs an augmented reality strategy. HBR'S 10 MUST. 2017;85.
Poushneh et al., Discernible impact of augmented reality on retail customer's experience, satisfaction and willingness to buy. Journal of Retailing and Consumer Services. Jan. 1, 2017;34:229-34.
Ramos et al., Efficient visualization of 3D models on hardware-limited portable devices. Multimedia tools and applications. Nov. 2014;73(2):961-76.
Rauschnabel et al., Augmented reality marketing: How mobile AR-apps can improve brands through inspiration. Journal of Retailing and Consumer Services. Jul. 1, 2019;49:43-53.
Reinhard et al., High dynamic range imaging: acquisition, display, and image-based lighting. Morgan Kaufmann; May 28, 2010.
Reitmayr et al., Mobile collaborative augmented reality. Proceedings IEEE and ACM International Symposium on Augmented Reality Oct. 29, 2001:114-23.
Rhee et al., Mr360: Mixed reality rendering for 360 panoramic videos. IEEE transactions on visualization and computer graphics. Jan. 23, 2017;23(4):1379-88.
Risser, NVIDIA True Impostors. 2022. 12 pages. https://developer.nvidia.com/gpugems/gpugems3/part-iv-image-effects/chapter-21-true-impostors. (Last accessed Apr. 4, 2022).
Sadalgi, Wayfair's 3D Model API—Wayfair Tech Blog. https://tech.wayfair.com/2016/10/wayfairs-3d-model-api/. (Last accessed Apr. 4, 2022).
Song et al., Try-on experience with augmented reality comforts your decision: Focusing on the roles of immersion and psychological ownership. Information Technology & People. Nov. 31, 2019. 21 pages.
Spielmann et al., VPET: a toolset for collaborative virtual filmmaking. SIGGRAPH Asia 2016 Technical Briefs Nov. 28, 2016:1-4.
Sulaiman et al., Matterport: virtual tour as a new marketing approach in real estate business during pandemic COVID-19. Proceedings of the International Conference of Innovation in Media and Visual Design (IMDES 2020). Atlantis Press Dec. 3, 2020:221-6.
Yang et al., A virtual try-on system in augmented reality using RGB-D cameras for footwear personalization. Journal of Manufacturing Systems. Oct. 1, 2014;33(4):690-8.
Yue et al., Scenectrl: Mixed reality enhancement via efficient scene editing. In Proceedings of the 30th annual ACM symposium on user interface software and technology. Oct. 20, 2017:427-36.
Zhang, Augmented reality virtual glasses try-on technology based on iOS platform. EURASIP Journal on Image and Video Processing. Dec. 2018;2018(1):1-9.
U.S. Appl. No. 17/476,313, filed Sep. 15, 2021, Sadalgi et al.
PCT/US2021/050513, Jan. 24, 2022, International Search Report and Written Opinion.
PCT/US2021/050513, Mar. 30, 2023, International Preliminary Report on Patentability.

\* cited by examiner

TECHNIQUES FOR VIRTUAL VISUALIZATION OF A PRODUCT IN A PHYSICAL SCENE

RELATED APPLICATIONS

This application is a continuation of and claims priority under 35 U.S.C. § 120 to U.S. patent application Ser. No. 17/476,313, filed Sep. 15, 2021, titled "TECHNIQUES FOR VIRTUAL VISUALIZATION OF A PRODUCT IN A PHYSICAL SCENE", which claims priority under 35 U.S.C. § 119 (e) to U.S. Provisional Patent Application No. 63/079,429 entitled "TECHNIQUES FOR VIRTUAL VISUALIZATION OF A PRODUCT IN A PHYSICAL SCENE," filed on Sep. 16, 2020, U.S. Provisional Application No. 63/135,490 entitled "MIXED REALITY STAGING TECHNIQUES," filed on Jan. 8, 2021, and U.S. Provisional Application No. 63/135,481 entitled "TECHNIQUES FOR VIRTUAL VISUALIZATION OF A PRODUCT IN A PHYSICAL SCENE," filed on Jan. 8, 2021, each of which is incorporated by reference herein in its entirety.

BACKGROUND

Three-dimensional (3D) models provide a representation of a physical scene. For example, a 3D model of a home may be used to provide prospective buyers of the home a virtual tour. A user may further interact with a 3D model of a physical scene by navigating through the 3D model to observe different perspectives of the physical scene.

Augmented reality (AR) provides an interactive virtual environment for a user by superimposing computer-generated virtual objects on a view of the user's physical environment. AR systems may be implemented on devices such as smartphones, smart glasses, and mobile devices. A user may interact in an AR virtual environment through an AR interface. For example, a user may interact with the virtual environment in an AR interface shown on a display of a smartphone.

SUMMARY

In some embodiments, a method for obtaining a two-dimensional (2D) image of one or more products a physical scene is provided. The method is performed by a computing device comprising a computer hardware processor. the method comprises: generating an extended reality (XR) scene; generating, using the XR scene, an image of the physical scene; determining, based on input provided by a user through the XR scene, position information indicative of a target position of a first product in the physical scene; transmitting the image of the physical scene and the position information to another computing device via a communication network; receiving a 2D image of a second product in the physical scene from the other computing device via the communication network, the 2D image rendered using the image of the physical scene and the position information; and displaying the 2D image of the second product in the physical scene.

In some embodiments, determining the position information indicative of the target position comprises: receiving, through an XR interface, a user input indicating a position in the XR scene at which to place a model of the first product; and determining the target position based on the user input.

In some embodiments, the method further comprises: determining one or more camera setting values used to capture the image of the physical scene; and transmitting, via the communication network to the other computing device, the one or more camera setting values for user in rendering the 2D image of the second product in the physical scene. In some embodiments, the one or more camera setting values comprise camera exposure offset (EV) and field of view (FOV).

In some embodiments, the method further comprises: obtaining lighting information indicating one or more light sources in the physical scene; and transmitting, via the communication network to the other computing device, the lighting information for use in rendering the 2D image of the second product in the physical scene. In some embodiments, obtaining the lighting information indicating the one or more light sources in the physical scene comprises: receiving, through an XR interface, user input identifying the one or more light sources in the physical scene; and determining one or more locations of the one or more light sources in the physical scene based on the user input. In some embodiments, the lighting information further comprises an indication of ambient light intensity in the physical scene.

In some embodiments, the method further comprises: obtaining an indication of a plane in the physical scene; and transmitting, via the communication network to the other computing device, the indication of the plane for use in rendering the 2D image of the second product in the physical scene. In some embodiments, obtaining the indication of the plane in the physical scene comprises identifying the plane in the XR scene.

In some embodiments, the first product is selected from a group consisting of furniture, floor covering, décor, light fixture, appliance, art, wall covering, flooring, bedding, storage container, fencing, heating device, cooling device, bathroom accessory, wall fixture, plant, organization accessory, kitchen accessory, cookware, and tableware. In some embodiments, the second product and the first product are a same product. In some embodiments, the second product is different from the first product. In some embodiments, the second product is identified using information about a customer.

In some embodiments, a system for obtaining a 2D image of one or more products in a physical scene is provided. The system comprises: a camera; a computer hardware processor; and a non-transitory computer-readable storage medium storing instructions that, when executed by the computer hardware processor, cause the computer hardware processor to perform: generating an XR scene using the camera; generating, using the XR scene, an image of the physical scene; determining, based on input provided by a user through the XR scene, position information indicative of a target position of a first product in the physical scene; transmitting the image of the physical scene and the position information to another computing device via a communication network; receiving a 2D image of a second product in the physical scene from the other computing device via the communication network, the 2D image rendered using the image of the physical scene and the position information; and displaying the 2D image of the second product in the physical scene.

In some embodiments, determining the position information indicative of the target position comprises: receiving, through an XR interface, a user input indicating a position in the XR scene at which to place a model of the first product; and determining the target position information based on the user input.

In some embodiments, the instructions further cause the computer hardware processor to perform: determining one or more camera setting values used to capture the image of the physical scene; and transmitting, via the communication network to the other computing device, the one or more camera setting values for user in rendering the 2D image of the second product in the physical scene. In some embodiments, the one or more camera setting values comprise camera exposure offset (EV) and field of view.

In some embodiments, the instructions further cause the computer hardware processor to perform: obtaining lighting information indicating one or more light sources in the physical scene; and transmitting, via the communication network to the other computing device, the lighting information for user in rendering the 2D image of the second product in the physical scene. In some embodiments, obtaining the lighting information indicating the one or more light sources in the physical scene comprises: receiving, through an XR interface, user input identifying the one or more light sources in the physical scene; and determining one or more locations of the one or more light sources in the physical scene based on the user input. In some embodiments, the lighting information further comprises an indication of ambient light intensity in the physical scene.

In some embodiments, the instructions cause the computer hardware processor to perform: obtaining an indication of a plane in the physical scene; and transmitting, via the communication network to the other computing device, the indication of the plane in the physical scene for use in rendering the 2D image of the second product in the physical scene. In some embodiments, obtaining the indication of the plane in the physical scene comprises identifying the plane in the XR scene.

In some embodiments, second product is the same as the first product. In some embodiments, the second product is different from the first product.

In some embodiments, a non-transitory computer-readable storage medium storing instructions is provided. The instructions, when executed by a computer hardware processor, cause the computer hardware processor to perform: generating an XR scene; generating, using the XR scene, an image of the physical scene; determining, based on input provided by a user through the XR scene, position information indicative of a target position of a first product in the physical scene; transmitting the image of the physical scene and the position information to another computing device via a communication network; receiving a 2D image of a second product in the physical scene from the other computing device via the communication network, the 2D image rendered using the image of the physical scene and the position information; and displaying the 2D image of the second product in the physical scene.

In some embodiments, a method for obtaining a two-dimensional (2D) image of one or more products in a physical scene is provided. The method is performed by a computing device comprising a computer hardware processor. the method comprises: obtaining a three-dimensional (3D) model of the physical scene; generating an image of the physical scene using the 3D model of the physical scene; determining, based on input provided by a user through a graphical user interface (GUI), position information indicative of a target position of a first product in the physical scene; transmitting, via a communication network to another computing device, the image of the physical scene and the position information; receiving, via the communication network from the other computing device, a 2D image of a second product in the physical scene, the 2D image rendered using the image of the physical scene and the position information; and displaying the 2D image of the second product in the physical scene.

In some embodiments, the method further comprises displaying the 3D model of the physical scene in the GUI. In some embodiments, determining the position information indicative of the target position comprises determining the target position based on input provided by the user through the GUI to position a model of the first product in the 3D model of the physical scene. In some embodiments, displaying the 3D model of the physical scene in the GUI comprises displaying the 3D model of the physical scene using JAVASCRIPT. In some embodiments, displaying the 3D model of the physical scene using JAVASCRIPT comprises displaying the 3D model of the physical scene using THREE.JS (3JS).

In some embodiments, the method further comprises: determining a field of view of a camera for capturing the image of the physical scene; and transmitting, via the communication network to the other computing device, the field of view for use in rendering the 2D image of the second product in the physical scene.

In some embodiments, the image of the physical scene comprises a panorama generated using the 3D model of the physical scene. In some embodiments, the method further comprises: obtaining a rotation angle of the panorama relative to a camera position; and transmitting the rotation angle of the panorama relative to the camera position to the other computing device via the at least one communication network.

In some embodiments, the method further comprises determining a plane in the 3D model of the physical scene. In some embodiments, determining the plane in the 3D model of the physical scene comprises determining the plane in the 3D model of the physical scene using ray casting.

In some embodiments, the first product is selected from a group consisting of furniture, floor covering, décor, light fixture, appliance, art, wall covering, flooring, bedding, storage container, fencing, heating device, cooling device, bathroom accessory, wall fixture, plant, organization accessory, kitchen accessory, cookware, and tableware.

In some embodiments, the image of the physical scene comprises a high dynamic range (HDR) image.

In some embodiments, the indication of the target position of the first product in the physical scene comprises an indication of a position of a model of the first product in a 3D scene.

In some embodiments, the second product is the same as the first product. In some embodiments, the second product is different from the first product. In some embodiments, the second product is identified using information about a customer.

In some embodiments, a system for obtaining a 2D image of one or more products in a physical scene is provided. The system comprises: a computer hardware processor; and a non-transitory computer-readable storage medium storing instructions that, when executed by the computer hardware processor, cause the computer hardware processor to perform: obtaining a three-dimensional (3D) model of the physical scene; generating an image of the physical scene using the 3D model of the physical scene; determining, based on input provided by a user through a graphical user interface (GUI), position information indicative of a target position of a first product in the physical scene; transmitting, via a communication network to another computing device, the image of the physical scene and the position information; receiving, via the communication network from the other computing device, a 2D image of a second product in the physical scene, the 2D image rendered using the image of the physical space and the position information; and displaying the 2D image of the second product in the physical scene.

In some embodiments, the instructions further cause the computer hardware processor to perform displaying the 3D model of the physical scene in the GUI.

In some embodiments, determining the position information indicative of the target position comprises determining the target position based on input provided by the user through the GUI to position a model of the first product in the 3D model of the physical scene. In some embodiments, the instructions further cause the computer hardware processor to perform: determining a field of view of a camera for capturing the image of the physical scene; and transmitting, via the communication network to the other computing device, the field of view for use in rendering the 2D image of the second product in the physical scene.

In some embodiments, the image of the physical scene comprises a panorama generated using the 3D model of the physical scene. In some embodiments, the instructions further cause the computer hardware processor to perform: obtaining a rotation angle of the panorama relative to a camera position; and transmitting, via the communication network to the other computing device, the rotation angle of the panorama relative to the camera position for use in rendering the 2D image of the second product in the physical scene.

In some embodiments, second product is the same as the first product. In some embodiments, the second product is different from the first product.

In some embodiments, a non-transitory computer-readable storage medium storing instructions is provided. The instructions, when executed by a computer hardware processor, cause the computer hardware processor to perform: obtaining a three-dimensional (3D) model of a physical scene; generating an image of the physical scene using the 3D model of the physical scene; determining, based on input provided by a user through a graphical user interface (GUI), position information indicative of a target position of a first product in the physical scene; transmitting, via a communication network to another computing device, the image of the physical scene and the position information; receiving, via the communication network from the other computing device, a 2D image of a second product in the physical scene, the 2D image rendered using the image of the physical space and the position information; and displaying the 2D image of the second product in the physical scene.

In some embodiments, a method for generating a two-dimensional (2D) image of one or more products in a physical scene is provided. The method is performed by a computing device comprising a computer hardware processor. The method comprises: obtaining, via a communication network from another computing device, an image of the physical scene; obtaining, via the communication network from the other computing device, position information indicative of a target position of a first product in the physical scene; rendering a 2D image of a second product in the physical scene using the image of the physical scene, the position information, and a 3D model of the second product; and providing, via the communication network to the other computing device, the rendered 2D image of the second product in the physical scene for display by the other computing device.

In some embodiments, the image of the physical scene and the position information are generated using a three-dimensional (3D) model of the physical scene. In some embodiments, the 3D model of the physical scene comprises a MATTERPORT model. In some embodiments, the position information is generated using user input provided through an extended reality (XR) interface.

In some embodiments, the method further comprises: generating a 3D scene, the 3D scene including the 3D model of the second product positioned in the 3D scene in accordance with the target position; and rendering the 2D image of the second product in the physical scene using the 3D scene. In some embodiments, generating the 3D scene comprises setting a background environment in the 3D scene to the image of the physical scene. In some embodiments, setting the background environment in the 3D scene to the image of the physical scene comprises: projecting the image of the physical scene onto a sphere to obtain a spherical mapping of the image of the physical scene; and applying the spherical mapping to the 3D scene to set the background environment in the 3D scene to the image of the physical scene.

In some embodiments, the method further comprises: obtaining lighting information about the physical scene; and setting lighting in the 3D scene in accordance with the lighting information. In some embodiments, obtaining the lighting information comprises determining lighting information using the image of the physical scene. In some embodiments, obtaining the lighting information comprises obtaining, from the other computing device, information indicating one or more light sources in the physical scene. In some embodiments, the lighting information indicates ambient light intensity in the physical scene; and setting lighting in the 3D scene in accordance with the lighting information comprises: generating one or more lights in the 3D scene; and apportioning the ambient light intensity among the one or more lights in the 3D scene.

In some embodiments, the method further comprises: obtaining an indication of a plane in the physical scene; and using the indication of the plane in the physical scene to generate lighting effects in the 3D scene.

In some embodiments, the method further comprises: obtaining, from the other computing device via a communication network, one or more camera setting values used to capture the image of the physical scene; and rendering the 2D image of the second product in the physical scene using a virtual camera configured with the one or more camera setting values. In some embodiments, the one or more camera setting values include a field of view. In some embodiments, the image of the physical scene comprises a panorama of at least a portion of the physical scene.

In some embodiments, the method further comprises: obtaining, from the other computing device via a communication network, a rotation angle of the panorama with respect to a camera position; and rendering the 2D image of the second product in the physical scene using a virtual camera configured with the rotation angle.

In some embodiments, the image of the physical scene comprises a high dynamic range (HDR) image. In some embodiments, the image of the physical scene comprises a composite image comprising a virtual model of the first product overlaid onto the image of the physical scene. In some embodiments, the rendering is performed using computer graphics software.

In some embodiments, the first product is selected from a group consisting of furniture, floor covering, décor, light fixture, appliance, art, wall covering, flooring, bedding, storage container, fencing, heating device, cooling device, bathroom accessory, wall fixture, plant, organization accessory, kitchen accessory, cookware, and tableware.

In some embodiments, providing the rendered 2D image of the second product in the physical scene to the other computing device comprises: generating a graphical user interface (GUI) comprising a plurality of images of products in the physical scene, wherein the plurality of images includes the rendered 2D image of the second product in the physical scene; and providing the GUI for display by an application executing on the other computing device. In some embodiments, providing the rendered 2D image of the second product in the physical scene to the other computing device comprises transmitting the rendered 2D image to the other computing device in an email, a short message service (SMS) message, or a multimedia messaging service (MMS) message. In some embodiments, providing the rendered 2D image of the second product in the physical scene to the other computing device comprises: generating a GUI comprising information about the second product including the rendered 2D image of the second product in the physical scene; and providing the GUI for display by an application executing on the other computing device. In some embodiments, the application comprises an Internet browser application and the GUI comprises an Internet webpage. In some embodiments, the application comprises a mobile application.

In some embodiments, the second product is the same as the first product. In some embodiments, the second product is different from the first product. In some embodiments, the method further comprises identifying the second product using information about a user of the other computing device.

In some embodiments, a system for generating a 2D image of at least a first product in a physical is provided. The system comprises: a computer hardware processor; and a non-transitory computer-readable storage medium storing instructions that, when executed by the computer hardware processor, cause the computer hardware processor to perform a method comprising: obtaining, via a communication network from another computing device, an image of the physical scene; obtaining, via the communication network from the other computing device, position information indicative of a target position of a first product in the physical scene; rendering a 2D image of a second product in the physical scene using the image of the physical scene, the position information, and a 3D model of the second product; and providing, via the communication network to the other computing device, the rendered 2D image of the second product in the physical scene to the other computing device for display by the other computing device.

In some embodiments, a non-transitory computer-readable storage medium storing instructions is provided. The instructions, when executed by a computer hardware processor of a computing device, cause the computer hardware processor to perform: obtaining, via a communication network from another computing device, an image of a physical scene; obtaining, via the communication network from the other computing device, position information indicative of a target position of the a product in the physical scene; rendering the 2D image of a second product in the physical scene using the image of the physical scene, the position information, and a 3D model of the second product; and providing, via the communication network to the other computing device, the rendered 2D image of the second product in the physical scene to the other computing device for display by the other computing device.

In some embodiments, a method for obtaining a two-dimensional (2D) image of one or more products in a physical scene is provided. The method is performed by a computing device comprising a computer hardware processor. The method comprises: generating an extended reality (XR) scene; generating, using the XR scene, an image of the physical scene; determining, based on input provided by a user through the XR scene, position information indicative of a target position of a first product in the physical scene; generating a 2D image of a second product in the physical scene using the image of the physical scene and the position information; and displaying the 2D image of the second product in the physical scene.

In some embodiments, generating the 2D image of the second product in the physical scene comprises rending the 2D image of the second product in the physical scene using the image of the physical scene, the position information, and a 3D model of the second product.

In some embodiments, generating the 2D image of the second product in the physical scene comprises: generating a 3D scene, the 3D scene including the 3D model of the second product positioned in the 3D scene in accordance with the target position; and rendering the 2D image of the second product in the physical scene using the 3D scene. In some embodiments, generating the 3D scene comprises setting a background environment in the 3D scene to the image of the physical scene.

In some embodiments, the method further comprises obtaining lighting information indicating one or more light sources in the physical scene, wherein generating the 2D image of the second product in the physical scene comprises setting lighting in the 3D scene in accordance with the lighting information. In some embodiments, obtaining the lighting information indicating the one or more light sources in the physical scene comprises: receiving, through an XR interface, user input identifying the one or more light sources in the physical scene; and determining one or more locations of the one or more light sources in the physical scene based on the user input.

In some embodiments, the method further comprises obtaining an indication of a plane in the physical scene, wherein generating the 2D image of the second product in the physical scene comprises using the indication of the plane in the physical scene to generate lighting effects in the 3D scene.

In some embodiments, the method further comprises determining one or more camera setting values used to capture the image of the physical scene, wherein generating the 2D image of the second product in the physical scene comprises rendering the 2D image of the second product in the physical scene using a virtual camera configured with the one or more camera setting values.

In some embodiments, the second product and the first product are a same product. In some embodiments, the second product is different from the first product. In some embodiments, the method further comprises identifying the second product using information about a customer.

In some embodiments, a system for obtaining a 2D image of one or more products in a physical scene is provided. The system comprises: a camera; a computer hardware processor; and a non-transitory computer-readable storage medium storing instructions that, when executed by the computer hardware processor, cause the computer hardware processor to perform: generating an extended reality (XR) scene; generating, using the XR scene, an image of the physical scene; determining, based on input provided by a user through the XR scene, position information indicative of a target position of a first product in the physical scene; generating a 2D image of a second product in the physical scene using the image of the physical scene and the position information; and displaying the 2D image of the second product in the physical scene.

In some embodiments, generating the 2D image of the second product in the physical scene comprises rending the 2D image of the second product in the physical scene using the image of the physical scene, the position information, and a 3D model of the second product.

In some embodiments, generating the 2D image of the second product in the physical scene comprises: generating a 3D scene, the 3D scene including the 3D model of the second product positioned in the 3D scene in accordance with the target position; and rendering the 2D image of the second product in the physical scene using the 3D scene. In some embodiments, generating the 3D scene comprises setting a background environment in the 3D scene to the image of the physical scene.

In some embodiments, the instructions further cause the computer hardware processor to perform: obtaining lighting information indicating one or more light sources in the physical scene; wherein generating the 2D image of the second product in the physical scene comprises setting lighting in the 3D scene in accordance with the lighting information.

In some embodiments, the instructions further cause the computer hardware processor to perform: obtaining an indication of a plane in the physical scene; wherein generating the 2D image of the second product in the physical scene comprises using the indication of the plane in the physical scene to generate lighting effects in the 3D scene.

In some embodiments, the first product and the second product are a same product. In some embodiments, the second product is different from the first product.

In some embodiments, a non-transitory computer-readable storage medium storing instructions is provided. The instructions, when executed by a computer hardware processor of a computing device, cause the computer hardware processor to perform: generating an extended reality (XR) scene; generating, using the XR scene, an image of a physical scene; determining, based on input provided by a user through the XR scene, position information indicative of a target position of a first product in the physical scene; generating a 2D image of a second product in the physical scene using the image of the physical scene and the position information; and displaying the 2D image of the second product in the physical scene.

In some embodiments, a method for generating a two-dimensional (2D) image of one or more products in a physical scene is provided. The method is performed by a computing device comprising a computer hardware processor. The method comprises: obtaining a three-dimensional (3D) model of the physical scene; generating an image of the physical scene using the 3D model of the physical scene; determining, based on input provided by a user through a graphical user interface (GUI), position information indicative of a target position of a first product in the physical scene; generating a 2D image of a second product in the physical scene using the image of the physical scene and the position information; and displaying the 2D image of the second product in the physical scene.

In some embodiments, generating the 2D image of the second product in the physical scene using the image of the physical scene and the position information comprises rending the 2D image of the second product in the physical scene using the image of the physical scene, the position information, and a 3D model of the second product.

In some embodiments, the 2D image of the second product in the physical scene comprises: generating a 3D scene, the 3D scene including the 3D model of the second product positioned in the 3D scene in accordance with the target position; and rendering the 2D image of the second product in the physical scene using the 3D scene. In some embodiments, generating the 3D scene comprises setting a background environment in the 3D scene to the image of the physical scene.

In some embodiments, the method further comprises determining one or more camera setting values used to capture the image of the physical scene, wherein generating the 2D image of the second product in the physical scene comprises rendering the 2D image of the second product in the physical scene using a virtual camera configured with the one or more camera setting values. In some embodiments, the image of the physical scene comprises a panorama, and the one or more camera setting values comprise a rotation angle of the panorama relative to a camera position. In some embodiments, the one or more camera setting values comprise a field of view.

In some embodiments, the indication of the target position of the first product in the physical scene comprises an indication of a position of a model of the first product in the 3D model of the physical scene.

In some embodiments, the first product and the second product are a same product. In some embodiments, the second product is different from the first product. In some embodiments, the method further comprises identifying the second product using information about a customer.

In some embodiments, system for obtaining a 2D image of one or more products in a physical scene is provided. The system comprises: a computer hardware processor; and a non-transitory computer-readable storage medium storing instructions that, when executed by the computer hardware processor, cause the computer hardware processor to perform: obtaining a three-dimensional (3D) model of the physical scene; generating an image of the physical scene using the 3D model of the physical scene; determining, based on input provided by a user through a graphical user interface (GUI), position information indicative of a target position of a first product in the physical scene; generating a 2D image of a second product in the physical scene using the image of the physical scene and the position information; and displaying the 2D image of the second product in the physical scene.

In some embodiments, generating the 2D image of the second product in the physical scene using the image of the physical scene and the position information comprises rending the 2D image of the second product in the physical scene using the image of the physical scene, the position information, and a 3D model of the second product.

In some embodiments, generating the 2D image of the second product in the physical scene comprises: generating a 3D scene, the 3D scene including the 3D model of the second product positioned in the 3D scene in accordance with the target position; and rendering the 2D image of the second product in the physical scene using the 3D scene. In some embodiments, generating the 3D scene comprises setting a background environment in the 3D scene to the image of the physical scene.

In some embodiments, the instructions further cause the processor to perform determining one or more camera setting values used to capture the image of the physical scene, wherein generating the 2D image of the second product in the physical scene comprises rendering the 2D image of the second product in the physical scene using a virtual camera configured with the one or more camera setting values. In some embodiments, the image of the physical scene comprises a panorama, and the one or more camera setting values comprise a rotation angle of the panorama relative to a camera position.

In some embodiments, the first product and the second product are a same product. In some embodiments, the second product is different from the first product.

In some embodiments, a non-transitory computer-readable storage medium storing instructions is provided. The instructions, when executed by a computer hardware processor, cause the computer hardware processor to perform: obtaining a three-dimensional (3D) model of a physical scene; generating an image of the physical scene using the 3D model of the physical scene; determining, based on input provided by a user through a graphical user interface (GUI), position information indicative of a target position of a first product in the physical scene;

generating a 2D image of a second product in the physical scene using the image of the physical scene and the position information; and displaying the 2D image of the second product in the physical scene.

BRIEF DESCRIPTION OF THE DRAWINGS

Various aspects and embodiments will be described herein with reference to the following figures. It should be appreciated that the figures are not necessarily drawn to scale. Items appearing in multiple figures are indicated by the same or a similar reference number in all the figures in which they appear.

DETAILED DESCRIPTION

Figure 1A:
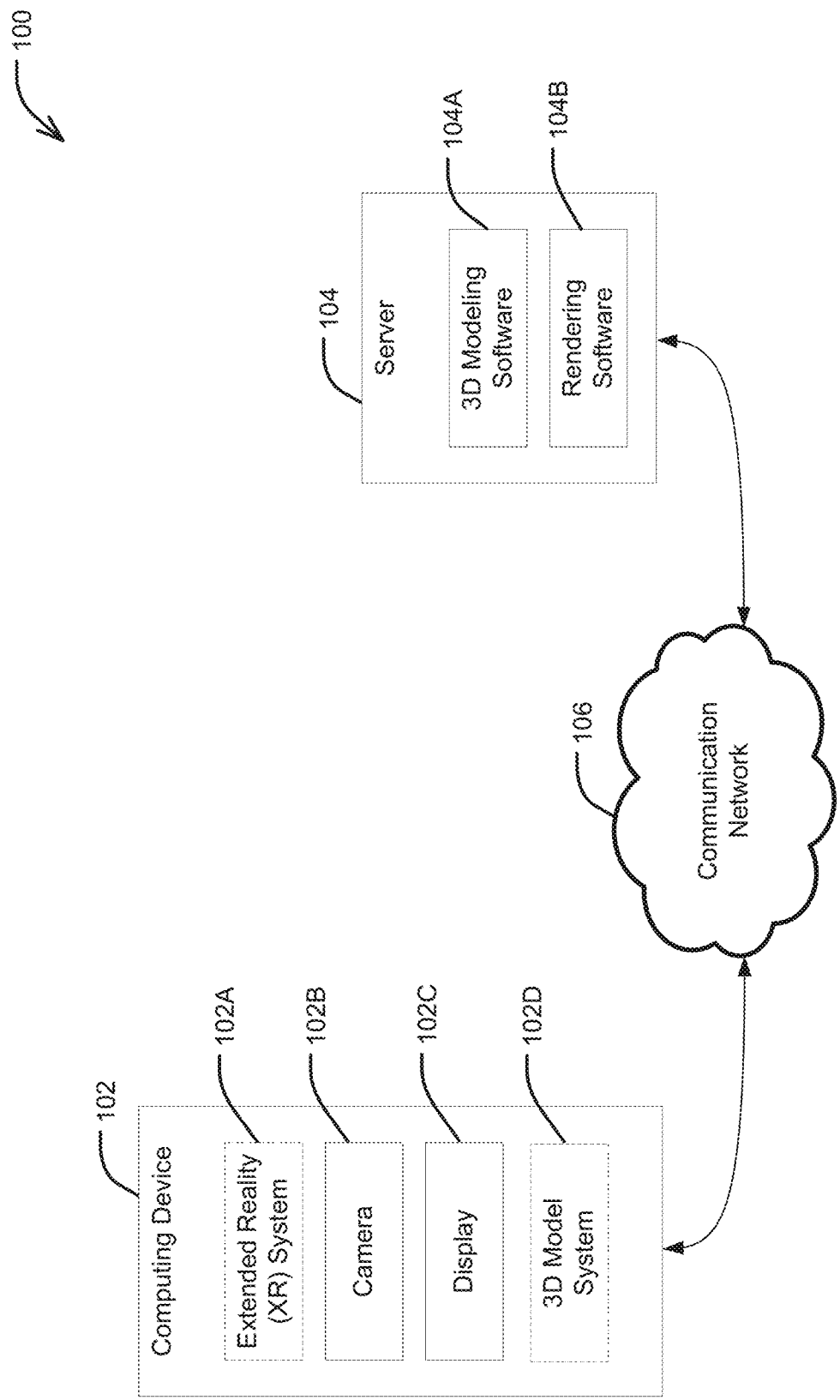
FIG. 1A is a block diagram of an example system in which some embodiments of the technology described herein may be implemented.

Some conventional techniques for visualizing products in physical scenes may use a 3D model to provide a visualization of a product in a physical scene. For example, when a customer shops for products using an Internet website or a mobile device application, the customer may want to visualize the product placed in a physical scene. To provide a visualization of the product in the physical scene, a retailer may provide a 3D model that allows the customer to place a virtual product model in the 3D model of the physical scene. To illustrate, a customer shopping for furniture on an Internet website may want to visualize an article of furniture placed in a room of the customer's home. The website may provide a 3D model system that allows the customer to place a three-dimensional (3D) model of the article of furniture in a 3D model of the room to obtain a visualization of the article of furniture within the room. Other conventional techniques of visualizing products in physical scenes may use extended reality (XR) (e.g., augmented reality (AR)

and/or virtual reality (VR)) to provide a visualization of a product in a physical scene. A retailer may use an XR system that allows the customer to place a virtual product model in an XR scene generated from the physical scene. For example, a mobile device application may provide an augmented reality (AR) system that allows the customer to place a three-dimensional (3D) model of the article of furniture in an AR scene of the physical scene to obtain a visualization of the article of furniture within the physical scene.

The inventors have recognized that conventional techniques for visualizing products in physical scenes do not provide accurate visualizations of products in physical scenes. In order to efficiently render virtual objects in a 3D model or an XR scene, a system may use virtual product models that do not have enough resolution to accurately represent characteristics of the product (e.g., color, texture, and/or shape). Further, the placement of a virtual model in a 3D model of a physical scene or an XR scene may not accurately capture an appearance of the product in the physical scene because the 3D model or XR scene may not accurately capture lighting effects on the product (e.g., shadows, reflections, and/or other effects). Continuing with the example above, conventional techniques for visualizing products in physical scenes may not provide an accurate visualization of an article of furniture in a room because: (1) a 3D model of the article of furniture does not accurately represent characteristics of the article of furniture (e.g., due to a low resolution of the model); and (2) the placement of the 3D model in a 3D scene or an XR scene may not accurately portray lighting effects on the product in the physical scene.

To improve quality of the visualization, conventional techniques involve increasing the quality (e.g., resolution) of product models and of the 3D scene and/or XR scene. For example, higher-resolution product models may be used to provide more accurate product visualizations. However, using higher-resolution product models requires greater computational resources (e.g., memory, bandwidth, etc.) for a device to access, display, and manipulate the product model. Moreover, the need for increased computational resources may affect the user's experience. For example, the increase in utilized computational resources may increase the time needed for a device to generate a visualization of a product model in a 3D scene or an XR scene, which leads to an undesirable delay and poor user experience.

On the other hand, the inventors have taken a different approach in order to address the above-described shortcomings of conventional techniques for visualizing products in physical scenes. In particular, the inventors have developed techniques for visualizing a product in a physical scene by generating a high-quality, photorealistic two-dimensional (2D) image of the product within the physical scene (rather than a higher-resolution 3D image of the product). Such 2D images provide a more realistic visualization of the product within the physical scene than the lower-resolution 3D models used in conventional approaches.

Figure 14:
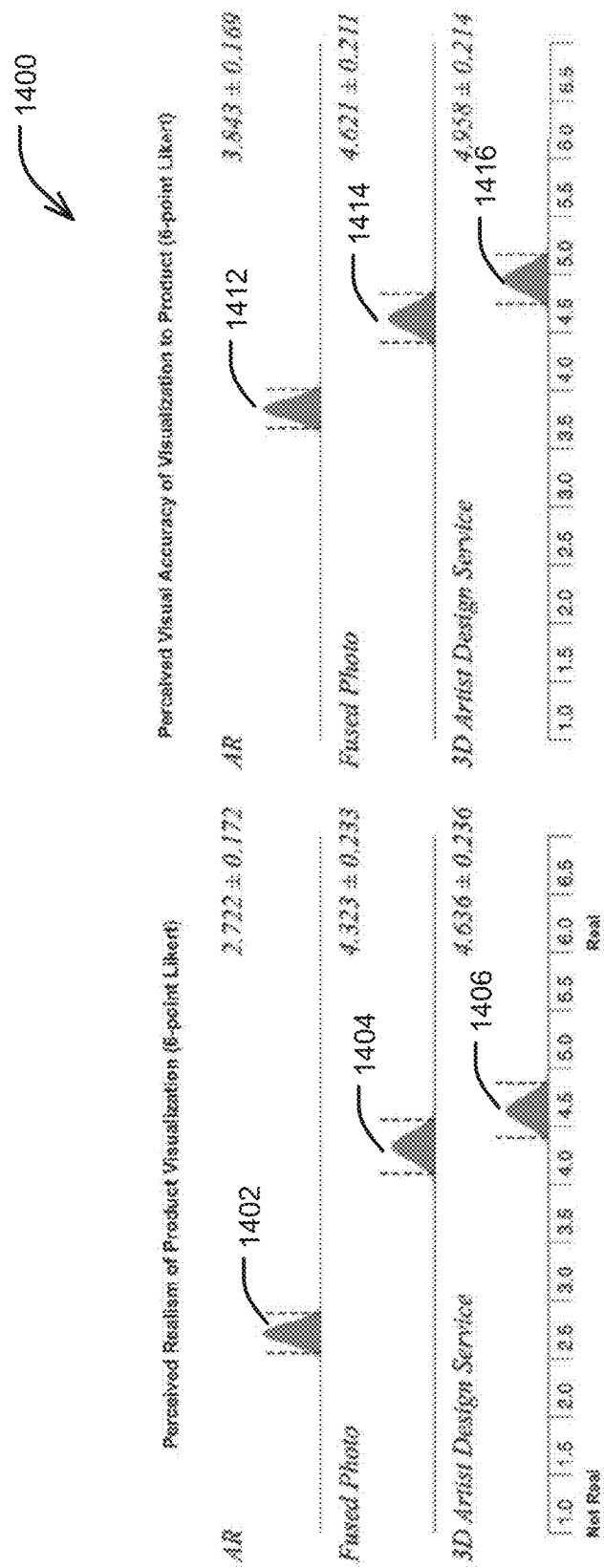
FIG. 14 is a graph illustrating perceived realism of product visualization and perceived visual accuracy of some embodiments relative to conventional systems.

The techniques developed by the inventors and described herein use information generated by a user device to generate the 2D image of the product within the physical scene. The 2D image may provide a visualization of the product that: (1) more accurately represents the characteristics of the product; and (2) more accurately portrays the product when placed in the physical scene (e.g., by capturing lighting effects, reflections, and/or other effects). The 2D image of the product within the physical scene may also be referred as a "fused photo." FIG. 14 is a graph illustrating perceived realism of such "fused photos" relative to conventional visualizations. As shown in FIG. 14, multiple participants were instructed to determine how real each visualization appeared within a physical scene on a 6-point Likert scale. As shown in FIG. 14, the perceived realism 1404 of a 2D image generated using the techniques described herein is greater than the perceived realism 1402 of the same visualization in an augmented reality (AR) system. Indeed, the perceived realism 1402 of the fused photo approaches the perceived realism 1406 of a 3D artist design service. Likewise, the perceived visual accuracy 1414 of a fused photo is greater than the perceived visual accuracy 1412 provided by an AR system. The perceived visual accuracy 1414 of a fused photo approaches the perceived visual accuracy 1416 provided by a 3D artist design service.

Accordingly, some embodiments allow a device to use a lower-resolution product model (e.g., for positioning in a 3D scene or an XR scene) while providing a visualization of a product in a physical scene that is more accurate than that of conventional systems. In contrast to conventional techniques for visualizing products in physical spaces, which require increasing computational resources (e.g., memory, bandwidth, graphical processing capability) to provide more accurate visualizations, the techniques described herein provide more accurate, photorealistic visualizations while reducing the overall computational resources needed by the user's device.

In some embodiments, a user may use a 3D model of a physical scene ("3D scene") or an XR scene displayed on a device (e.g., smartphone, tablet, or laptop) to position a first 3D model of a product (e.g., an article of furniture) in the 3D scene or the XR scene. The device may generate information using the 3D scene or the XR scene, and transmit the information to a server. The information may include an image of the physical scene and position information indicative of a target position of the product in the physical scene. The server may use the information to generate a 3D scene including a second 3D model of the product. The server may use the position of the first 3D model in the 3D scene of the device to position the second 3D model of the product in the 3D scene. The second 3D model of the product may have a higher resolution than the first 3D model positioned in the device. Thus, the second 3D model of the product may provide a more accurate depiction of the product when placed in the physical scene. The server may render a 2D image of its 3D scene including the second 3D model of the product to obtain a 2D image of the product within the physical scene. The server may provide the 2D image to the device. The device may display the 2D image to the user to provide a visualization of the product in the physical scene.

In some embodiments, the rendered 2D image of the product within the physical scene may be presented to the user in a variety of settings. For example, the rendered 2D image may be shown on an Internet website displayed by the device (e.g., using an Internet browser application), or in a graphical user interface (GUI) of a mobile application. In another example, the rendered 2D image may be provided in a gallery of images of various different products in the physical scene. In another example, the rendered 2D image may be provided to the user on a product details page in which the image is shown with other information about the product (e.g., price, reviews, specifications, etc.). In another example, the rendered 2D image may also be transmitted to the user in an email, an SMS message, and/or an MMS message. In another example, the rendered 2D image may be provide to a user in a product recommendation (e.g., displayed in a social media platform). In some embodiments, the rendered 2D image may be provided to the user in a brick and mortar location to provide a user with a visualization of a product in a physical scene.

Some embodiments described herein address all the above-described issues that the inventors have recognized with conventional techniques for generating visualizations of products in physical scenes. However, it should be appreciated that not every embodiment described herein addresses every one of these issues. It should also be appreciated that embodiments of the technology described herein may be used for purposes other than addressing the above-discussed issues of conventional techniques.

According to some embodiments, a method for generating a two-dimensional (2D) image of one or more products in a physical scene (e.g., a physical space in a home) is provided. For example, the product may be an article of furniture, a floor covering, décor, a light fixture, appliance, art, a wall covering, flooring, bedding, storage container, fencing, a heating device, a cooling device, a bathroom accessory, a wall fixture, a plant, an organization accessory, a kitchen accessory, cookware, tableware, and/or any other furnishing or product. The method may be performed by a computing device (e.g., a server) comprising a computer hardware processor. The method comprises: obtaining, via a communication network (e.g., the Internet) from another computing device (e.g., a smartphone, laptop, tablet, or desktop computer), an image of the physical scene; obtaining, via the communication network from the other computing device, position information (e.g., a matrix transform and/or coordinates) indicative of a target position of a first product in the physical scene; rendering a 2D image of a second product in the physical scene using the image of the physical scene, the position information, and a 3D model of the second product; and providing, via the communication network to the other computing device, the rendered 2D image of the second product in the physical scene for display by the other computing device.

In some embodiments, the second product may be the same as the first product. In some embodiments, the second product may be different from the first product. For example, the second product may be determined by information about a user (e.g., preferences, shopping trends, and/or information about other products in the physical scene).

In some embodiments, the image of the physical scene and the position information are generated using a three-dimensional (3D) model of the physical scene (e.g., a MATTERPORT 3D model of the physical scene). In some embodiments, the position information is generated using user input provided through an extended reality (XR) interface.

In some embodiments, the method comprises generating a 3D scene, the 3D scene including the 3D model of the second product positioned in the 3D scene in accordance with the target position; and rendering the 2D image of the second product in the physical scene using the 3D scene. In some embodiments, generating the 3D scene comprises setting a background environment in the 3D scene to the image of the physical scene (e.g., by projecting the image onto a background of the 3D scene). In some embodiments, setting the background environment in the 3D scene to the image of the physical scene comprises: projecting the image of the physical scene onto a sphere to obtain a spherical mapping of the image of the physical scene; and applying the spherical mapping to the 3D scene to set the background environment in the 3D scene to the image of the physical scene.

In some embodiments, the method comprises: obtaining lighting information about the physical scene (e.g., location(s) of one or more lights in the physical scene); and setting lighting in the 3D scene in accordance with the lighting information (e.g., by placing lights in the 3D scene). In some embodiments, obtaining the lighting information comprises determining lighting information using the image of the physical scene (e.g., by analyzing pixel values of the image to identify light(s) in the physical scene). In some embodiments, obtaining the lighting information comprises obtaining, from the other computing device, information indicating one or more light sources in the physical scene (e.g., provided by user input).

In some embodiments, the lighting information indicates ambient light intensity in the physical scene; and setting lighting in the 3D scene in accordance with the lighting information comprises: generating one or more lights in the 3D scene; and apportioning the ambient light intensity among the one or more lights in the 3D scene (e.g., by dividing the light intensity equally among the light(s) in the 3D scene). In some embodiments, the method comprises: obtaining an indication of a plane in the physical scene (e.g., a transform); and using the indication of the plane in the physical scene to generate lighting effects (e.g., shadows and/or reflections on a surface) in the 3D scene. In some embodiments, the method comprises: obtaining, from the other computing device via a communication network, one or more camera setting values used to capture the image of the physical scene; and rendering the 2D image of the first product in the physical scene using a virtual camera configured with the one or more camera setting values. In some embodiments, the one or more camera setting values include a field of view.

In some embodiments, the image of the physical scene comprises a panorama of at least a portion of the physical scene. In some embodiments, the method comprises: obtaining, from the other computing device via a communication network, a rotation angle (e.g., in degrees) of the panorama with respect to a camera position; and rendering the 2D image of the first product in the physical scene using a virtual camera configured with the rotation angle (e.g., by setting the rotation angle of the virtual camera to the obtained rotation angle). In some embodiments, the image of the physical scene comprises a high dynamic range (HDR) image. In some embodiments, the image of the physical scene comprises a composite image comprising a virtual model of the first product overlaid onto the image of the physical scene.

In some embodiments, the rendering is performed using computer graphics software. In some embodiments, providing the rendered 2D image of the second product in the physical scene to the other computing device comprises: generating a graphical user interface (GUI) comprising a plurality of images of products in the physical scene (e.g., a gallery view), wherein the plurality of images includes the rendered 2D image of the second product in the physical scene; and providing the GUI for display by an application executing on the other computing device (e.g., on a website or a mobile application). In some embodiments, providing the rendered 2D image of the second product in the physical scene to the other computing device comprises transmitting the rendered 2D image to the other computing device in an email, a short message service (SMS) message, or a multimedia messaging service (MMS) message. In some embodiments, providing the rendered 2D image of the second product in the physical scene to the other computing device comprises: generating a GUI comprising information about the second product including the rendered 2D image of the second product in the physical scene; and providing the GUI for display by an application executing on the other computing device. In some embodiments, the application comprises an Internet browser application and the GUI comprises an Internet webpage. In some embodiments, the application comprises a mobile application.

According to some embodiments, a method for obtaining a two-dimensional (2D) image of one or more products (e.g., article(s) of furniture, or other product(s) described herein) in a physical scene is provided. The method is performed by a computing device comprising a computer hardware processor. The method comprises: obtaining a three-dimensional (3D) model of the physical scene; generating an image (e.g., panorama) of the physical scene using the 3D model of the physical scene; determining, based on input provided by a user through a graphical user interface (GUI), position information indicative of a target position of a first product in the physical scene; transmitting, via a communication network to another computing device (e.g., a server), the image of the physical scene and the position information; receiving, via the communication network from the other computing device, a 2D image of a second product in the physical scene, the 2D image rendered using the image of the physical scene and the position information; and displaying the 2D image of the second product in the physical scene.

In some embodiments, the second product may be the same as the first product. In some embodiments, the second product may be different from the first product. For example, the second product may be determined by information about a user (e.g., preferences, shopping trends, and/or information about other products in the physical scene).

In some embodiments, the method further comprises displaying the 3D model of the physical scene in the GUI (e.g., on a website). In some embodiments, determining the position information indicative of the target position comprises determining the target position based on input provided by the user through the GUI to position a model of the first product in the 3D model of the physical scene. In some embodiments, displaying the 3D model of the physical scene in the GUI comprises displaying the 3D model of the physical scene using JAVASCRIPT. In some embodiments, displaying the 3D model of the physical scene using JAVASCRIPT comprises displaying the 3D model of the physical scene using THREE.JS (3JS).

In some embodiments, the method further comprises determining a field of view (e.g., horizontal and vertical field of view) of a camera for capturing the image of the physical scene; and transmitting, via the communication network to the other computing device, the field of view for use in rendering the 2D image of the first product in the physical scene (e.g., for use in configuring a virtual camera). In some embodiments, the image of the physical scene comprises a panorama (e.g., stitched from multiple images) generated using the 3D model of the physical scene. In some embodiments, the method further comprises: obtaining a rotation angle of the panorama relative to a camera position; and transmitting the rotation angle of the panorama relative to the camera position to the other computing device via the at least one communication network.

In some embodiments, the method further comprises determining a plane in the 3D model of the physical scene. In some embodiments, determining the plane in the 3D model of the physical scene comprises determining the plane in the 3D model of the physical scene using ray casting. In some embodiments, the image of the physical scene comprises a high dynamic range (HDR) image. In some embodiments, the indication of the target position of the first product in the physical scene comprises an indication of a position (e.g., a matrix transform) of a model of the first product in a 3D scene.

According to some embodiments, a method for obtaining a two-dimensional (2D) image of one or more products in a physical scene is provided. The method may be performed by a computing device comprising a computer hardware processor. The method comprises: generating an extended reality (XR) scene (e.g., an AR scene or a VR scene); generating, using the XR scene, an image of the physical scene (e.g., captured by a camera); determining, based on input provided by a user through the XR scene, position information indicative of a target position of a first product in the physical scene (e.g., by positioning a product model in the XR scene); transmitting the image of the physical scene and the position information to another computing device via a communication network; receiving a 2D image of a second product in the physical scene from the other computing device via the communication network, the 2D image rendered using the image of the physical scene and the position information; and displaying the 2D image of the second product in the physical scene.

In some embodiments, the second product may be the same as the first product. In some embodiments, the second product may be different from the first product. For example, the second product may be determined by information about a user (e.g., preferences, shopping trends, and/or information about other products in the physical scene).

In some embodiments, determining the position information indicative of the target position comprises: receiving, through an XR interface, a user input indicating a position in the XR scene at which to place a model of the first product; and determining the target position based on the user input. In some embodiments, the method further comprises: determining one or more camera setting values used to capture the image of the physical scene; and transmitting, via the communication network to the other computing device, the one or more camera setting values for user in rendering the 2D image of the second product in the physical scene. In some embodiments the one or more camera setting values comprise camera exposure offset (EV) and field of view (FOV).

In some embodiments, the method further comprises: obtaining lighting information indicating one or more light sources (e.g., windows and/or lights) in the physical scene; and transmitting, via the communication network to the other computing device, the lighting information for use in rendering the 2D image of the first product in the physical scene. In some embodiments, obtaining the lighting information indicating the one or more light sources in the physical scene comprises: receiving, through an XR interface, user input identifying the one or more light sources in the physical scene (e.g., touch screen inputs identifying light sources); and determining one or more locations of the one or more light sources in the physical scene based on the user input. In some embodiments, the lighting information further comprises an indication of ambient light intensity in the physical scene.

In some embodiments, the method further comprises: obtaining an indication of a plane in the physical scene (e.g., a matrix transform indicating a location of the plane); and transmitting, via the communication network to the other computing device, the indication of the plane for use in rendering the 2D image of the first product in the physical scene. In some embodiments, obtaining the indication of the plane in the physical scene comprises identifying the plane in the XR scene.

FIG. 1A is a block diagram of an example system 100 in which some embodiments of the technology described herein may be implemented. The system includes a computing device 102 in communication with a server 104 over a communication network 106.

The computing device 102 may be any suitable computing device. For example, the computing device 102 may comprise a desktop computer. In some embodiments, the computing device 102 may comprise a mobile computing device. For example, the computing device 102 may be a smartphone, tablet, laptop, or other mobile computing device. In some embodiments, the computing device 102 may comprise an extended reality (XR) device. For example, the computing device 102 may be a set of smart glasses, a smart watch, a set of virtual reality (VR) goggles, a holographic display, or other XR device. Some embodiments are not limited to computing devices described herein.

As shown in the example of FIG. 1A, the computing device 102 includes an extended reality (XR) system 102A. The XR system 102A may include a software platform installed on the computing device 102 that is configured to generate an XR scene. The XR system 102A may include one or more application program interfaces (API(s)) that can be used to generate an extended reality. The computing device 102 may use the API(s) to generate XR scenes in applications of the computing device 102. For example, a software application installed on the computing device 102 may use the XR system 102A to generate an AR scene, and provide an AR interface through which a user may place products in the AR scene. In another example, a video game application may use the XR system 102A to generate a virtual reality (VR) environment including computer-generated simulations.

In some embodiments, the XR system 102A may include an augmented reality (AR) system. For example, the AR system may be APPLE's ARKIT for IOS, or GOOGLE's ARCORE for ANDROID, or any other suitable AR system. A software application may use the AR system to generate an AR scene. The AR system may be configured to provide an AR interface that a user may use to place virtual objects in an AR scene. The AR system may be configured to superimpose the virtual objects on a view of a physical scene included in the AR scene. For example, an application installed on the computing device 102 may use the AR system to generate an AR scene from a physical scene (e.g., captured by camera 102B coupled to the computing device 102). The software application may provide an AR interface through which a user can place a product model (e.g., a model of furniture) in the AR scene. The software application may be configured to provide an AR interface through which the user can provide indications about characteristics of the physical scene. For example, the AR interface may include an interface through which a user may indicate one or more light sources in the physical scene.

In some embodiments, the XR system 102A may be a virtual reality (VR) system. The VR system may generate a VR environment that a user can interact with. A software application may use the AR system to generate a virtual reality. For example, a software application may use the VR system to generate a VR environment in which a user can view, modify, and place product models in the virtual reality. In some embodiments, the computing device 102 may be configured to use the VR system to generate a virtual environment from a physical scene. For example, a software application may use the VR system to generate a virtual rendition of a room in the user's home. The user may perform actions in the virtual environment and interact with one or more virtual elements therein. For example, the user may place 3D product models in the virtual environment.

In some embodiments, the computing device 102 may be configured to generate information from an XR scene (also referred to herein as "XR scene information"). The XR scene information may include information about a physical scene (also referred to herein as "physical scene information") from which the XR scene is generated. For example, the XR system 102A may provide an image of the physical scene from which an XR scene is generated. In another example, the XR system 102A may provide an indication of lighting in the physical scene (e.g., ambient light intensity and/or ambient light temperature). Physical scene information may include information about the physical scene provided by a user. For example, the physical scene information may include indication(s) of one or more light sources in the physical scene. Examples of physical scene information are described herein.

The XR scene information may further include virtual scene information. The virtual scene information may include information about one or more virtual objects that are superimposed by the XR system 102A onto the XR scene. For example, the XR system 102A may generate virtual scene information indicating a product placed in the XR scene, and a position in the XR scene at which a 3D model of the product has been placed. Examples of virtual scene information are described herein.

The XR system 102A may be configured to transmit obtained XR scene information to a server (e.g., server 104). The XR scene information, including the physical scene information and the virtual scene information, may be used by the server to generate a 2D image of a product within a physical scene. The computing device 102 may be configured to obtain the 2D image of the product in the physical scene and display it to a user of the computing device 102 (e.g., on display 102C). The image may provide the user with a visualization of the product within the physical scene. For example, the user may be shopping for furniture, and the computing device 102 may obtain a 2D image of an article of furniture in a room of the user's home by: (1) generating XR scene information from an XR scene generated from an image feed of the room; (2) transmitting the XR scene information (e.g., physical scene information and virtual scene information) to the server; and (3) receiving the 2D image of the article of furniture within the room generated from the XR scene information from the server.

As shown in the example of FIG. 1A, the computing device 102 includes a camera 102B. In some embodiments, the camera 102B may be integrated with the computing device 102. For example, the computing device 102 may be a smartphone and the camera 102B may be a digital camera integrated in the smartphone. In some embodiments, the camera may be removably attached to the computing device 102. For example, the computing device 102 may be a laptop computer and the camera may be a digital camera that is removably attached to the laptop computer. Although the example of FIG. 1A shows the camera 102B as a component of the computing device 102, in some embodiments, the camera 102B may be separate from the computing device 102. For example, the camera 102B may be a camera attached to a wearable component (e.g., a headpiece), where images captured by the camera 102B are transmitted to the computing device 102.

In some embodiments, the camera 102B may be used by the XR system 102B to generate an XR scene. The camera 102B may capture an image of a physical scene which may be used by the XR system 102B to generate an XR scene. For example, the XR system 102B may generate an augmented reality using an image feed of a physical scene captured by the camera 102B. In some embodiments, the camera 102B may be used by the XR system 102B to determine physical scene information. For example, the camera 102B may be used by the XR system 102A to estimate lighting in a physical scene (e.g., using imaging sensors of the camera). In some embodiments, the XR system 102B may be configured to determine values for one or more camera settings used to capture the physical scene. For example, the camera setting(s) may include camera exposure offset, vertical field of view, and/or horizontal field of view of the camera 102B (e.g., when used to capture an image of a physical scene).

As shown in the example of FIG. 1A, the computing device 102 includes a display 102C. The display 102C may be configured to show an extended reality (e.g., generated by XR system 102A) and/or a 3D model of a physical scene (e.g., generated by 3D model system 102D). In some embodiments, the display 102C may be a display of a mobile computing device. For example, the display may be a smartphone or tablet display. In some embodiments, the display 102C may be a touch screen. A user may interact with an XR scene shown on the display 102C through the touch screen. For example, the user may indicate light source(s) in a physical scene by tapping points within an XR scene shown on the display 102C. In some embodiments, the display 102C may be a display generated by an XR device. For example, the display 102C may be an AR display shown on smart glasses, or a VR display shown in VR goggles. In some embodiments, the display 102C may be an external display connected to the computing device 102. For example, the display 102C may be an external monitor connected to the computing device 102.

As shown in FIG. 1A, the computing device 102 includes a 3D model system 102D. The 3D model system 102D may be configured to obtain a 3D model of a physical scene ("3D scene"). In some embodiments, the 3D model system 102D may be configured to obtain the 3D scene by obtaining a 3D scene generated using images of the physical scene. For example, the 3D model system 102D may generate the 3D scene using images captured using the camera 102B and/or another camera. In some embodiments, the 3D model system 102D may include a 3D modelling software application. For example, the 3D model system 102D may include MATTERPORT CAPTURE, AUTOCAD, UNITY, REVIT, 3DS MAX, BLENDER, or other suitable 3D modelling software. The software application may guide a user of the computing device 102 to capture images of a physical scene (e.g., from various positions) which may then be used by the software application to generate a 3D model of the physical scene. In some embodiments, the 3D model system 102D may be configured to obtain a 3D scene by accessing a previously generated 3D scene. For example, the 3D model system 102D may access a previously generated 3D scene from a repository of generated 3D scenes (e.g., through a website).

In some embodiments, the 3D model system 102D may be configured to display a 3D scene on the display 102C of the computing device. The 3D model system 102D may be configured to generate an interactive display of the 3D scene that allows a user of the computing device 102 to navigate to different positions in the 3D scene. The different positions in the 3D scene may provide different views of the 3D scene. As an illustrative example, the 3D scene may be a 3D model of a space within a home (e.g., a room), an entire floor of a home, an entire home, or other physical space. The 3D model system 102D may comprise a software application that generates a display of a 3D scene. For example, the 3D model system 102D may include a JAVASCRIPT application that, when executed by the computing device 102 (e.g., using an Internet browser application), causes the computing device to display the 3D scene. The JAVASCRIPT application may use a library that provides 3D display functionality (e.g., THREE.JS (3JS)). In some embodiments, the 3D model system 102D may include software development kit (SDK) of a 3D modelling software application. The 3D model system 102D may be configured to use the SDK of the 3D modelling software application to allow a user to position a product model in a 3D scene generated by the 3D modelling software application. The 3D model system 102 may be configured to use the SDK to obtain information from the 3D scene (e.g., camera information). For example, the 3D model system 102D may include MATTERPORT's BUNDLE SDK which allows a user to position product models into a MATTERPORT 3D scene.

In some embodiments, the 3D model system 102D may be configured to allow a user to position a 3D model of a product (e.g., an article of furniture) in a 3D scene. A 3D model of a product may also be referred to herein as a "product model". The 3D model system 102D may be configured to generate a GUI through which a user may position the product model in the 3D scene. For example, the 3D model system 102D may allow the user to drag a product model to a location in the 3D scene and/or modify an orientation of the product model (e.g., by rotating the product model). In some embodiments, the 3D model system 102D may be configured to allow the user to select a product model from among a plurality of product models. For example, the 3D model system 102D may allow the user to select from a repository of product models of different articles of furniture in order. The user may select product model(s) of one or more articles of furniture and position them in the 3D scene.

In some embodiments, the 3D model system 102D may be configured to obtain an image of a physical scene using a 3D scene. The 3D model system 102D may be configured to extract the image of the physical scene from the 3D scene. For example, the 3D model system 102D may capture an image of a view set by user input received through a GUI. In some embodiments, the image of the physical scene may be a high dynamic range (HDR) image. In some embodiments, the 3D model system 102D may be configured to determine information about an image of the physical scene. The information may include a camera field of view used to capture the image of the physical scene. In some embodiments, the image of the physical scene may be a panorama. A panorama may be an image with a horizontally elongated field of view. A panorama may have an aspect ratio of at least 2:1 (i.e., the width of the image is at least twice the length of the image). In some embodiments, the 3D model system 102D may be configured to obtain a rotation angle of a panorama relative to a camera position.

In some embodiments, the 3D model system 102D may be configured to determine position information indicative of a target position of a product in a physical scene. In some embodiments, the 3D model system 102D may be configured to determine the position information based on input provided by a user through a GUI to position the product model in a 3D scene. For example, the 3D model system 102D may: (1) determine coordinates of the position of the product model in the 3D scene; and (2) determine the position information using the coordinates. In some embodiments, the 3D model system 102D may be configured to determine the position information to be a matrix transform based on a position of the product model in the 3D scene.

The 3D model system 102D may be configured to transmit information to a server (e.g., server 104) for generation of a 2D image of a product in a physical scene. The information may include an obtained image of a physical scene and position information. In some embodiments, the 3D model system 102D may be configured to transmit information in addition to the image of the physical scene and the position information such as a camera field of view and/or a panorama angle (e.g., when the image is a panorama). The computing device 102 may be configured to obtain the 2D image of the product in the physical scene from the server and display it to a user of the computing device 102 (e.g., on display 102C). The image may provide the user with a visualization of the product within the physical scene. For example, the user may be shopping for furniture, and the computing device 102 may obtain a 2D image of an article of furniture in a room of the user's home by (1) displaying a 3D model of the room using the 3D model system 102D; (2) obtaining an image of the room using the 3D mode of the room; (3) determining, through input provided by a user through a GUI, position information indicative of a target position of the article of furniture in the room; (4) transmitting the image of the room and the position information to the server; and (5) receiving the 2D image of the article of furniture within the room generated from the image of the room and the position information.

As indicated by the dotted lines around the XR system 102A and the 3D model system 102D, in some embodiments, the computing device 102 may not include the XR system 102A and include the 3D model system 102D. In some embodiments, the computing device may include the XR system 102A and not include the 3D model system 102D. In some embodiments, the computing device may include both the XR system 102A and the 3D model system 102D.

The server 104 of FIG. 1A may comprise one or more computing devices (e.g., one or multiple servers). Server 104 may be configured to host one or more services and/or applications on a single or multiple devices. In some embodiments, the server 104 may provide service to multiple computing devices. Although the example of FIG. 1A shows only computing device 102, the server 104 may be in communication with one or more other computing devices not shown in FIG. 1A. For example, the server 104 may generate a 2D image of a product within a physical scene in response to receiving information from any one of several computing devices.

In some embodiments, the server 104 may be configured to obtain one or more images of a physical scene from a computing device (e.g., computing device 102). The server 104 may be configured to receive the image(s) of the physical scene in a data transmission through communication network 106 (e.g., as network data packets). For example, an image of the physical scene may be an image generated using a 3D model of the physical scene (e.g., as described herein with reference to 3D model system 102D). In another example, an image of the physical scene may be an image generated using an XR scene. The server may be configured to use the image(s) to generate a 2D image of a product within the physical scene.

In some embodiments, the server 104 may be configured to obtain position information indicative of a target position of a product in a physical scene. The server 104 may be configured to receive the position information in a data transmission through communication network 106 (e.g., as network data packets). For example, the position information may be a matrix transform for use in positioning a product model in a 3D scene. In another example, the position information may be coordinates in a 3D scene or an XR scene. The server 104 may be configured to use the position information to position a product model in a 3D scene for generating a 2D image of a product in a physical scene. In some embodiments, the server 104 may be configured to receive information identifying the product. For example, the server 104 may receive an SKU code identifying the product. The server 104 may use the information identifying the product to obtain a product model (e.g., from a repository of product models).

In some embodiments, the server 104 may be configured to obtain information about a physical scene. The information about the physical scene may include lighting information indicating one or more light sources in the physical scene (e.g., from user input obtained through a 3D model of a physical scene or through an XR interface). The lighting information may further include an indication of ambient light intensity in the physical scene (e.g., determined by a camera sensor of the device or provided by a 3D model of the physical scene). In some embodiments, the information about the physical scene may include an indication of a plane in the physical scene. For example, the server 104 may obtain information indicating a location of a plane in the physical scene (e.g., identified by the computing device 102). In some embodiments, the server 104 may be configured to obtain camera information for an obtained image of a physical scene. The camera information may include camera settings. For example, the camera settings may include a camera exposure offset (EV) and/or a camera field of view. In another example, the camera information may include a rotation angle of a panorama relative to a camera position (e.g., determined from a 3D scene).

As shown in FIG. 1A, the server 104 includes 3D modeling software 104A. For example, the 3D modeling software 104A may be AUTODESK 3DS MAX, AUTODESK MAYA, HOUDINI by SIDEFX, LIGHTWARE 3D by NEWTEK, or any other suitable 3D modeling software. The server 104 may be configured to use the 3D modeling software 104A to generate a 3D scene using the information obtained from the computing device 102. The server 104 may be configured to generate a 3D scene using the 3D modeling software 104A with a 3D model of the product positioned in the 3D scene. The server 104 may be configured to identify the 3D model of the product based on an indication of the product (e.g., an SKU code). For example, the server 104 may access the 3D model of the product from a database of 3D product models using the indication of the product. The server 104 may be configured to position the 3D model of the product in the 3D scene according to the position information obtained from the computing device. For example, position information received from the computing device 102 may include a matrix transform or vector indicating an offset from a point in the 3D scene where the product model is to be positioned and an orientation of the product model. The server 104 may use the vector to position the product model in the 3D scene. In some embodiments, the server 104 may be configured to place one or more light sources in the 3D scene according to obtained lighting information indicating light source(s) in the physical space. For example, the server 104 may place light source(s) in the 3D scene according to locations of light source(s) in the physical space (e.g., obtained by the computing device 102 from user input received through an XR interface or a 3D scene).

In some embodiments, the server 104 may be configured to set a background environment in the 3D scene to an image of the physical scene obtained from the computing device 102. In some embodiments, the server 104 may be configured to set the background environment in the 3D scene to the image of the physical scene by (1) projecting the image of the physical space on a sphere to obtain a spherical mapping of the image of the physical space; and (2) applying the spherical mapping to the 3D scene to set the background environment in the 3D scene to the image of the physical space. In some embodiments, the server 104 may be configured to set the background environment in the 3D scene by applying the image of the physical scene as a texture in the 3D scene.

In some embodiments, the server 104 may be configured to use lighting information obtained from the computing device 102 to configure light source(s) placed in the 3D scene. In some embodiments, the server 104 may be configured to obtain an ambient light intensity in the physical scene from the computing device 102. The server 104 may be configured to use the ambient light intensity to set light intensities of the light source(s) placed in the 3D scene. In some embodiments, the server 104 may be configured to apportion the light intensity among the light source(s) placed in the 3D scene. For example, the server 104 may obtain an ambient light intensity of 375 lumens in the physical scene. The server 104 may apportion 80% of the light intensity (i.e., 300 lumens) among three lights placed in the physical scene to set each of the three lights to a light intensity of 100 lumens.

In some embodiments, the server 104 may be configured to determine information about lighting in a physical scene from one or more images of the physical scene (e.g., obtained from the computing device 102). For example, the image may be an HDR image, and the server 104 may use pixel values of the HDR image to determine information about lighting in the physical scene. The server 104 may be configured to identify one or more sources of light in the image(s) of the physical scene. In some embodiments, the system may be configured to identify the source(s) of light using a machine learning model (e.g., a neural network). The system may be configured to generate an input from the image(s) of the physical scene, provide the input to the machine learning model to obtain an output indicating the source(s) of light in the physical image. For example, the output may indicate one or more pixels in the image(s) corresponding to the identified light source(s). In some embodiments, the system may be configured to determine properties of the light source(s) in the physical scene. For example, the system may determine an ambient light intensity and/or a light temperature for at least one (e.g., one, some, all) light source(s) in the physical scene identified from the image(s).

As shown in FIG. 1A, the server 104 includes rendering software 104B. The server 104 may be configured to use the rendering software 104B to render the 2D image of the product within the physical scene. The server 104 may be configured to use the rendering software 104B to render an image of the 3D scene generated using the 3D modeling software 104A to obtain the 2D image of the product within the physical scene. In some embodiments, the server 104 may be configured to render the 2D image from the 3D scene using ray tracing. For example, the rendering software 104B may be V-RAY developed by CHAOSGROUP. The server 104 may render a 2D image of the 3D scene (e.g., generated in AUTOCAD 3DS MAX) using V-RAY to obtain the 2D image of the product within the physical scene.

In some embodiments, the server 104 may be configured to render the 2D image of the product within the physical scene from the 3D scene using a virtual camera. The server 104 may configure the virtual camera based on camera information (e.g., EV, FOV, and/or panorama rotation angle) obtained from a computing device. For example, the server 104 may configure the virtual camera according to camera exposure offset, vertical field of view, and horizontal field of view of the camera 102B when used to capture an image of the physical scene. In another example, the server 104 may configure the virtual camera based on a field of view and panorama rotation angle determined from a 3D model of a physical scene by a computing device. The virtual camera may be used to apply ray tracing to the 3D scene to obtain the 2D image of the product within the physical scene. By configuring the virtual camera according to the camera information, the server 104 may improve the accuracy of the 2D image in depicting the physical scene with the product placed therein. In some embodiments, the system may be configured to determine one or more camera setting values to configure the virtual camera from one or more images of the physical scene. For example, the system may determine a camera exposure offset, vertical field of view, horizontal field of view from the image(s), and/or panorama rotation angle. The system may configure the virtual camera according to the determined camera setting value(s).

The communication network 106 of FIG. 1A may be the Internet, a local area network, a wide area network, and/or any other suitable communication network. Aspects of the technology described herein are not limited in this respect.

Although in the embodiment of FIG. 1A, the computing device 102 and the server 104 are shown as separate systems, functionality performed by the computing device 102 and server 104 in this example embodiment, may be performed by components of a single system, in other embodiments. Such a single system may include the XR system 102A, camera 102B, display 102C, 3D model system 102D, 3D modeling software 104A, and rendering software 104B. For example, the system may be a computing device (e.g., a mobile device such as a smartphone, tablet computer, or a laptop). Accordingly, functionality of the computing device 102 and server 104 described herein may be implemented on a single device (e.g., a mobile device).

Figure 1B:
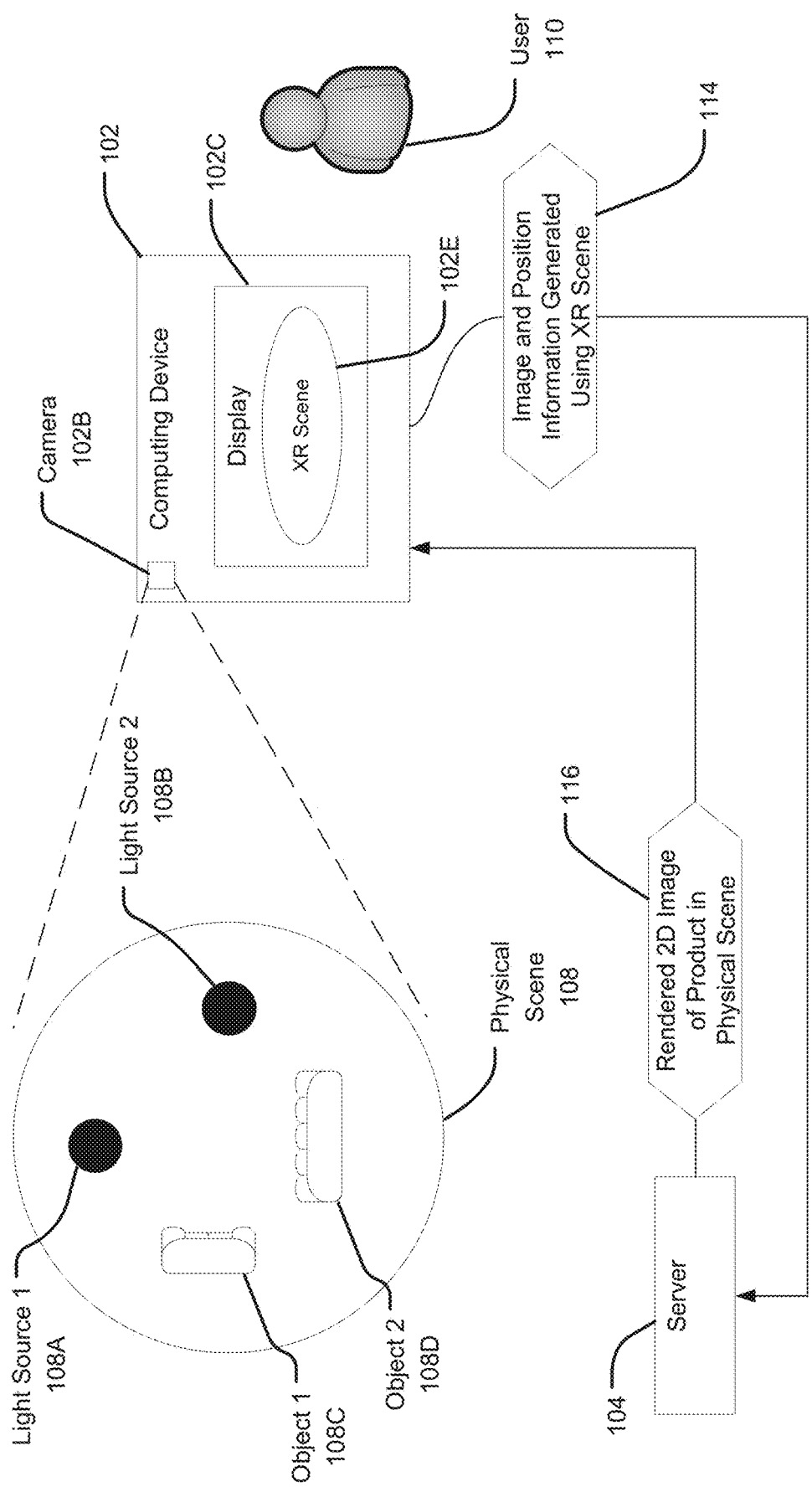
FIG. 1B illustrates an example interaction among the entities shown in FIG. 1A, according to some embodiments of the technology described herein.

FIG. 1B illustrates an example interaction among the entities shown in FIG. 1A. FIG. 1B shows a physical scene 108. The physical scene 108 includes object 1 108C and object 2 108D. The physical scene 108 includes light source 1 108A and light source 2 108B. In one example, the physical scene 108 may be a space (e.g., a room or portion thereof) in a home of the user 110.

As shown in FIG. 1B, the camera 102B of the computing device 102 captures the physical scene 108 (e.g., in an image feed). The computing device 102 may use the image feed captured by the camera 102B to (1) generate an XR Scene 102E (e.g., using XR system 102A); and (2) show the XR scene on the display 102C of the computing device 102. The XR scene may include an XR interface that allows the user 110 to interact with the XR Scene 102E shown on the display 102C. In some embodiments, the display 102C may be a touch screen and the XR Scene 102E may include an XR touch screen interface through which the user 110 may interact with the XR scene. In some embodiments, the XR Scene 102E may be an augmented reality (AR) scene generated from the physical scene 108. An AR interface may allow the user 110 to superimpose virtual objects onto the AR scene 102D. For example, the AR interface may allow the user 110 to position a 3D model of a product (e.g., an article of furniture) in the AR scene 102D. The user 110 may position the 3D model of the product by dragging the 3D model to a location in the AR scene 102D and adjusting an orientation of the 3D model. For example, the user may drag a 3D model of a center table that is to be placed in an area adjacent object 1 108C (e.g., a couch). The user may further adjust an orientation of the 3D model of the center table (e.g., by rotating the 3D model).

In some embodiments, the XR Scene 102E may include an interface through which the user 110 may indicate one or more light sources in the physical scene. In some embodiments, the display 102C may be a touch screen. The user may indicate light sources by tapping on light sources shown in the XR Scene 102E shown on the display 102C. For example, the user may tap a first location in the XR Scene 102E displaying light source 1 108A and a second location in the XR Scene 102E displaying light source 2 108B. The user may scan the camera 102B around the physical scene to indicate all light sources in the physical scene 108. In some embodiments, the computing device 102 may be configured to automatically identify light sources in the physical scene 108. For example, the computing device 102 may provide one or more images of the physical scene 108 (e.g., captured by camera 102B) as input to a machine learning model to obtain an output indicating light sources of the physical scene 108 shown in the image(s).

As shown in FIG. 1B, the computing device 102 generates XR scene information 114 from the XR Scene 102E generated by the device 102. The XR scene information 114 includes physical scene information and virtual scene information.

In some embodiments, the physical scene information may include an image of the physical scene 108 obtained using the camera 102B. For example, the image of the physical scene 108 may be an image of a portion of the physical scene within which the user wants to visualize a product. In some embodiments, the physical scene information includes lighting information indicating one or more light sources (e.g., light sources 108A-B) in the physical scene 108. The light source(s) may be indicated by location(s) (e.g., coordinate(s)) in the physical scene (e.g., obtained from user input indicating the location(s)). In some embodiments, the lighting information may include values for one or more light characteristics in the physical scene 108. The lighting information may include values for ambient light intensity (in lumens) of the physical scene 108, and ambient light temperature (in Kelvin) of the physical scene 108. In some embodiments, the physical scene information includes one or more camera setting values used to capture an image of the physical scene. The camera setting value(s) may include value(s) for camera exposure offset (EV), vertical field of view (in degrees), and/or horizontal field of view (in degrees). In some embodiments, the camera settings value(s) may include value(s) for a zoom setting, a flash setting, an aperture, a shutter speed, and/or other setting for the camera 102B.

In some embodiments, the physical scene information may include an indication of one or more planes in the XR Scene 102E. For example, the plane(s) may be floor plane(s), surface(s) of object(s) (e.g., table(s)), wall plane(s), and/or ceiling plane(s). In some embodiments, the device 102 may be configured to automatically identify one or more plane(s) in the XR Scene 102E. For example, the device 102 may automatically identify plane(s) in the XR Scene 102E by inputting pixel values of the XR Scene 102E into a machine learning model trained to identify plane(s) in the XR scene. In some embodiments, the device 102 may be configured to identify the plane(s) in the XR Scene 102E by using a simultaneous localization and mapping (SLAM) model.

In some embodiments, the indication of the plane(s) (e.g., floor plane(s)) in the XR Scene 102E may be a matrix transform. The matrix transform may be applied to a plane (e.g., a floor plane) of a 3D scene generated by the server 104 to model a plane from the XR scene. For example, the matrix transform may be a 4×4 matrix transform applied by the server 104 to modify a position of a floor plane in a template 3D scene used by the server 104 to generate the 3D scene.

In some embodiments, virtual scene information may include information identifying a product for which a product model is being placed in the XR Scene 102E. The computing device 102 may determine an identification (e.g., an SKU code) for the product. The identification for the product may identify the product among a plurality of products. For example, the device 102 may allow the user 110 to place a 3D model of an article of furniture in the XR Scene 102E. The device 102 may determine an SKU code of the article of furniture based on a selection made by the user 110 (e.g., in a user interface of a software application). In some embodiments, virtual scene information may include a position at which a 3D model is to be placed in the XR Scene 102E. For example, the XR Scene 102E may provide an XR interface on a display of the computing device 102 through which the user can position the 3D model in the XR Scene 102E shown on the display 102C (e.g., on a touch screen by dragging and rotating). In some embodiments, the position of the 3D model may be indicated by coordinates indicating a location in a 3D scene to be generated by the server 104. In some embodiments, the position of the 3D model may be indicated by a vector indicative of an offset from a point in a 3D scene to be generated by the server 104.

In some embodiments, the server 104 may be configured to determine a position of a product in one or more images of a physical scene. For example, the server 104 may receive the image(s) of the physical scene without receiving other XR information. The server 104 may be configured to determine the position of the product in the image(s) of the physical scene. In some embodiments, the server 104 may be configured to identify one or more empty spaces in the physical scene from the image(s) where the product may be placed. The system may determine the empty space(s) by identifying region(s) in the physical scene without other objects where the product may be placed.

In some embodiments, the virtual scene information may include an indication of the 3D model of the product placed in the XR scene. In some embodiments, the indication of the 3D model of the product placed in the XR scene may be a matrix transform of the 3D model of the product (e.g., for positioning in a 3D scene generated by the server 104). In some embodiments, the virtual scene information may include an indication of a camera used to generate the XR scene. In some embodiments, the indication of the camera may be a matrix transform of the camera (e.g., for use in configuring a virtual camera to use for rendering a 2D image).

Turning again to FIG. 1B, the XR scene information 114 generated by the computing device 102 may be transmitted to the server 104 through communication network 106. For example, the XR scene information 114 may be a network data transmission over the Internet.

As shown in FIG. 1B, the server 104 may receive the XR scene information 114 through the communication network 106. The server 104 may be configured to use the XR scene information 114 to render a 2D image of a product within the physical scene 108 using the XR scene information 114 obtained from the device 102. In some embodiments, the server 104 may be configured to render the 2D image 116 of the product within the physical scene 108 by (1) using the XR scene information 114 to generate a 3D scene including a 3D model of the product; and (2) rendering the 2D image of the product in the physical scene from the 3D scene (e.g., by applying a ray tracing algorithm with a virtual camera). Embodiments of techniques for rendering the 2D image 116 are described herein with reference to FIGS. 2A-2B, and FIG. 3.

In some embodiments, the server 104 may be configured to use a 3D model of the product that has a higher resolution than that of a 3D model used by the computing device 102. A lower resolution 3D model of the product may allow efficient positioning of the 3D model of the product in the XR Scene 102E generated by the computing device 102. For example, the lower resolution 3D model may allow the XR system 102A of the computing device 102 to efficiently render the 3D model of the product in the XR Scene 102E (e.g., within 5 ms). The server 104 may be configured to use a higher resolution 3D model of the product that provides a more accurate depiction of the product. The server may use a position of the lower resolution 3D model in the XR Scene 102E to position the higher resolution 3D model in the 3D scene. Accordingly, the lower resolution 3D model may be used as a way to stage the higher resolution 3D model placed by the server in the 3D scene. The server may be configured to render a 2D image of the product in the physical scene from the 3D scene including the higher resolution 3D model of the product. As the 2D image is rendered using a higher resolution 3D model of the product, the 2D image may provide a more accurate depiction of the product within in the physical scene than the lower resolution 3D model positioned in the XR Scene 102E.

As shown in FIG. 1B, the rendered 2D image 116 of the product within the physical scene 108 is transmitted to the device 102 over the communication network 106. The device 102 may be configured to display the rendered 2D image 116 on the display 102C. In some embodiments, the server 104 may be configured to (1) generate images of one or more intermediate stages in the rendering; and (2) transmit the images of the intermediate stage(s) of the rendering to the computing device 102 for display to the user 110. For example, the server 104 may perform ray tracing on a 3D scene, and generate images of the stages of a ray tracing algorithm being applied to generate the 2D image 116. The server 104 may transmit the images of the stages of the ray tracing algorithm to the computing device 102. The device 102 may show the images on the display 102C for the user 110.

Figure 1C:
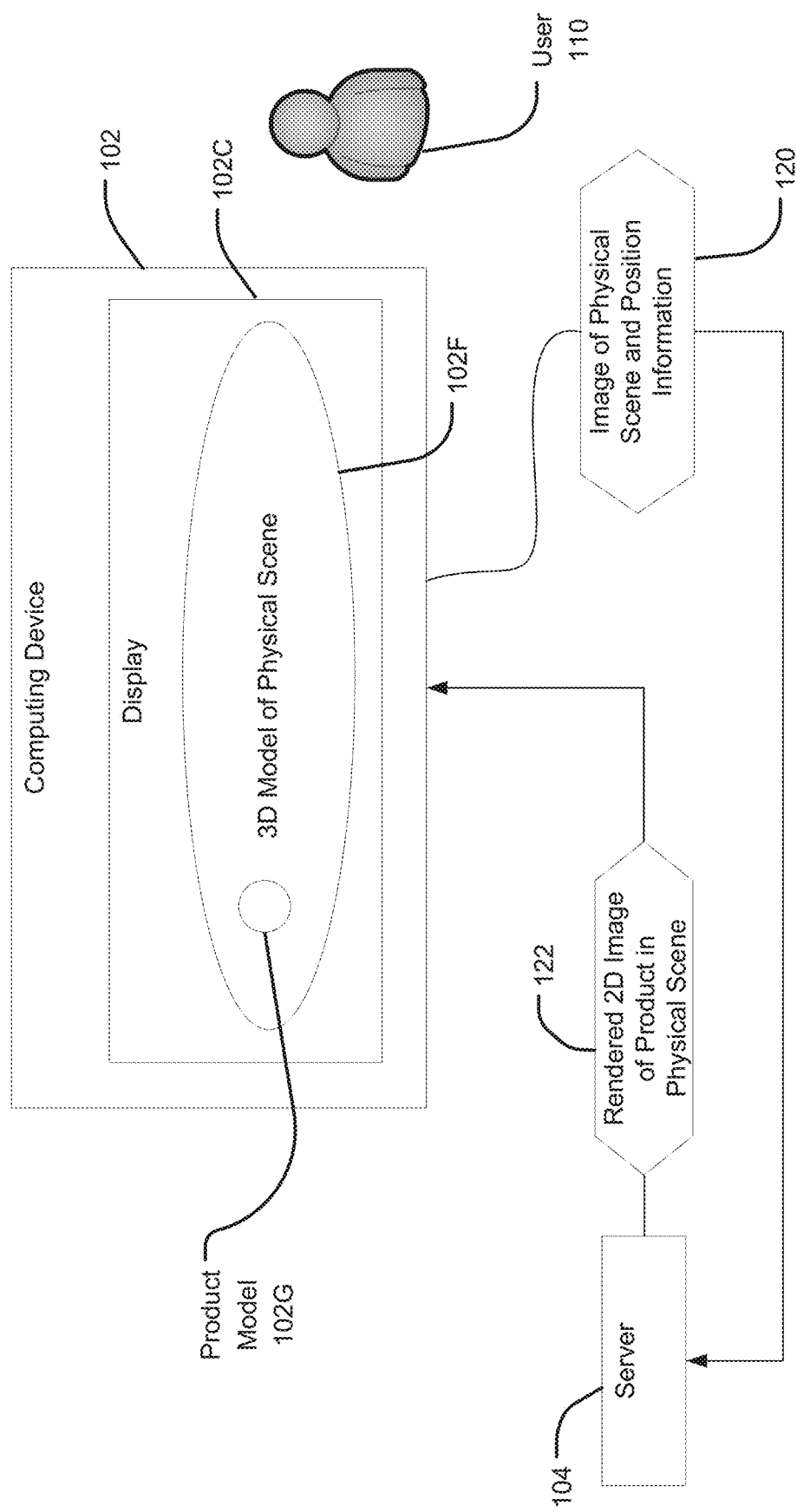
FIG. 1C illustrates another example interaction among the entities shown in FIG. 1A, according to some embodiments of the technology described herein.

FIG. 1C illustrates an example interaction among the entities shown in FIG. 1A, according to some embodiments of the technology described herein. FIG. 1C shows a 3D model 102F of a physical scene (also referred to as "3D scene 102F"). For example, the physical scene may be physical scene 108 shown in FIG. 1B. The 3D model system 102D may be configured to display the 3D scene 102F on the display 102C of the computing device 102. The 3D scene 102F may include a GUI that allows the user 110 to interact with the 3D scene 102F shown on the display 102C. For example, the GUI may be provided in a website or a mobile application. The GUI may allow the user 110 to position a product model 102G within the 3D scene 102F. For example, the GUI may allow the user 110 to position a product model of article of furniture in the 3D scene 102F. The user 110 may position the product model 102G by dragging the 3D model to a location in the 3D scene 102F, and adjusting a location and orientation of the product model 102G. For example, the user may drag a product model 102G of a center table that is to be placed in an area adjacent object 1 108C (e.g., a couch) shown in FIG. 1B. The user 110 may further adjust an orientation of the product model 102G (e.g., by rotating the 3D model). In some embodiments, the 3D scene may allow the user 110 to modify a view in the 3D scene 102F and/or navigate to different locations in the 3D scene 102F. For example, the user 110 may click, and drag a mouse to navigate within the 3D scene 102F. In another example, the user 110 may use buttons provided in a GUI to navigate through the 3D scene.

As shown in FIG. 1C, the computing device 102 generates information 120 including an image of a physical scene and position information. For example, the image of the physical scene may be an image of a portion of the physical scene within which the user wants to visualize a product. The computing device 102 may be configured to generate the image of the physical scene using the 3D scene 102F. In some embodiments, the computing device 102 may be configured to extract an image (e.g., an HDR image) from the 3D scene 102F. For example, the computing device 102 may extract a panorama from the 3D scene 102F. In some embodiments, the computing device 102 may be configured to determine the position information based on placement of the produce model 102G in the 3D scene 102F. For example, the computing device 102 may use coordinates of the product model 102G in the 3D scene 102F to determine the position information. In some embodiments, the position information may be a matrix transform indicating a target position in the physical scene (e.g., for use by the server 104 in placing a product model in a 3D scene). In some embodiments, the computing device 102 may be configured to automatically determine a position in the 3D scene 102F (e.g., without user input), and generate the position information based on the determined position. For example, the computing device 102 may identify a position in the 3D scene 102F that is empty, and generate the position information based on the identified position.

In some embodiments, the information 120 may include information in addition to the image of the physical scene and the position information. The information 120 may include a field of view of the 3D scene 102F from which the image was generated (e.g., for use by the server 104 in configuring a virtual camera). For example, the field of view may include a vertical and a horizontal field of view. In some embodiments, the information 120 may include a rotation angle of the image with respect to a camera position obtained from the 3D scene 102F. For example, the information 120 may include a rotation angle of a panorama of the 3D scene 102F with respect to a camera position. The device 102 may be configured to obtain information from the 3D scene. For example, the device 102 may use a software development kit (SDK) of a 3D modelling software application that provides the 3D scene to obtain information from the 3D scene (e.g., by using an application program interface (API) and/or function calls).

In some embodiments, the server 104 may be configured to determine a position of a product in one or more images of a physical scene. For example, the server 104 may receive the image(s) of the physical scene without receiving other information. The server 104 may be configured to determine the position of the product in the image(s) of the physical scene. In some embodiments, the server 104 may be configured to identify one or more empty spaces in the physical scene from the image(s) where the product may be placed. The system may determine the empty space(s) by identifying region(s) in the physical scene without other objects where the product may be placed.

Turning again to FIG. 1C, the information 120 generated by the computing device 102 may be transmitted to the server 104 through communication network 106. For example, the information 120 may be a network data transmission over the Internet.

As shown in FIG. 1C, the server 104 may receive the information 120 through the communication network 106. The server 104 may be configured to use the information 120 to render a 2D image 122 of a product within the physical scene using the information 120 obtained from the device 102. In some embodiments, the server 104 may be configured to render the 2D image 122 of the product within the physical scene by: (1) using the scene information 120 to generate a 3D scene including a 3D model of the product; and (2) rendering the 2D image of the product in the physical scene from the 3D scene (e.g., by applying a ray tracing algorithm with a virtual camera). Embodiments of techniques for rendering the 2D image 116 are described herein with reference to FIGS. 2A-2B, and FIG. 3.

In some embodiments, the server 104 may be configured to use a 3D model of the product that has a higher resolution than that of a 3D model used by the computing device 102. A lower resolution 3D model of the product may allow efficient positioning of the 3D model of the product in the 3D scene 102F displayed by the computing device 102. For example, the lower resolution 3D model may allow the 3D model system 102D of the computing device 102 to efficiently render the 3D model of the product in the 3D scene 102F (e.g., within 5 ms). The server 104 may be configured to use a higher resolution 3D model of the product that provides a more accurate depiction of the product. The server may use a position of the lower resolution produce model 102G in the 3D scene 102F to position the higher resolution 3D model in the 3D scene of the server 104. Accordingly, the lower resolution produce model 102G may be used as a way to stage the higher resolution 3D model placed by the server in the 3D scene. The server may be configured to render a 2D image 122 of the product in the physical scene from the 3D scene including the higher resolution 3D model of the product. As the 2D image is rendered using a higher resolution 3D model of the product, the 2D image may provide a more accurate depiction of the product within in the physical scene than the lower resolution produce model 102G positioned in the 3D scene 102F.

As shown in FIG. 1C, the rendered 2D image 122 of the product within the physical scene 108 is transmitted to the device 102 over the communication network 106. The device 102 may be configured to display the rendered 2D image 122 on the display 102C. In some embodiments, the server 104 may be configured to (1) generate images of one or more intermediate stages in the rendering; and (2) transmit the images of the intermediate stage(s) of the rendering to the computing device 102 for display to the user 110. For example, the server 104 may perform ray tracing on a 3D scene, and generate images of the stages of a ray tracing algorithm being applied to generate the 2D image 116. The server 104 may transmit the images of the stages of the ray tracing algorithm to the computing device 102. The device 102 may show the images on the display 102C for the user 110.

Figure 2:
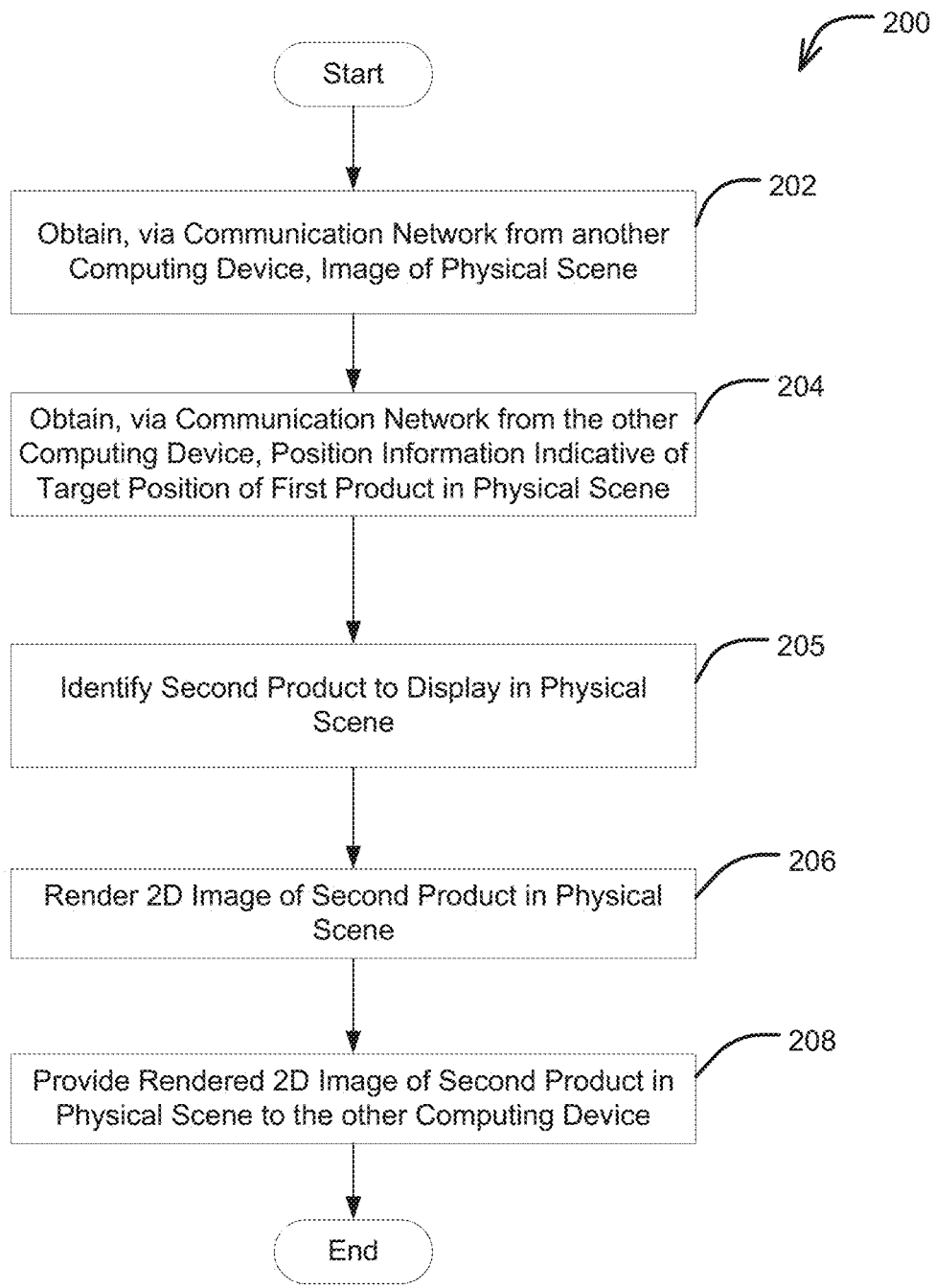
FIG. 2 is a flowchart of an example process for generating a two-dimensional (2D) image of a product within a physical scene, according to some embodiments of the technology described herein.

FIG. 2 shows a flowchart of an example process 200 for generating a 2D image of a product in a physical scene, according to some embodiments of the technology described herein. Process 200 may be performed by a system (e.g., server 104 described herein with reference to FIGS. 1A-C). In some embodiments, the system may include a suitable computing device. In some embodiments, the system may include multiple computing devices communicatively coupled to one another.

Process 200 begins at block 202, where the system performing process 200 obtains, via a communication network from another computing device, an image of a physical scene. In some embodiments, the system may be configured to obtain the image of the physical scene from a device configured to display a 3D model of the physical scene ("3D scene"). The image may be generated by the device using the 3D scene (e.g., as described herein with reference to FIG. 4). For example, the image may be a HDR panorama obtained from the 3D scene. In some embodiments, the system may be configured to obtain an image of a physical scene captured by a camera (e.g., camera 102B of computing device 102). In some embodiments, the image may be a composite image comprising a virtual model of a product overlaid onto the image of the physical image. In some embodiments, the system may be configured to obtain an image of a physical scene from a datastore of previously captured images. For example, the system may access a repository of images, and obtain the image of the physical scene from the repository of images. In some embodiments, the system may be configured to receive an image of a physical scene in a user communication. For example, the image of the physical scene may be an image provided by a user through email, or through an account on a website or mobile application. As another example, the image of the physical scene may be one of a set of stock images used to visualize products.

In some embodiments, the system may be configured to obtain extended reality (XR) scene information from a device. The XR scene information may include physical scene information about the physical scene that includes the image of the physical scene (e.g., captured by a camera coupled to the device). In some embodiments, the physical scene information may include lighting information indicating one or more light sources in the physical scene. Other examples of physical scene information are described herein. The XR scene information may include virtual scene information. The virtual scene information may be obtained from an XR system (e.g., XR system 102A). The virtual scene information may include information identifying a product and a position in the XR scene at which to place a 3D model of the product. For example, the virtual scene information may include an SKU code identifying the product and a vector indicating a position in the XR scene at which to place the 3D model of the product. The vector may be obtained based on a user input through an XR interface allowing the user to position a 3D model of the product in the XR scene. Other examples of physical scene information and virtual scene information are described herein.

In some embodiments, the system may be configured to obtain camera information corresponding to the image. The system may be configured to obtain a camera field of view used to capture the image (e.g., field of view of camera 102B or camera field of view obtained from 3D scene 102F). The system may be configured to obtain an exposure offset (EV) of a camera used to capture the image. In some embodiments, the image may be a panorama, and the system may be configured to obtain a rotation angle of the panorama with respect to a camera position.

In some embodiments, the system may be configured to obtain information about the physical scene in addition to the image of the physical scene. In some embodiments, the system may be configured to obtain an indication of one or more planes in the physical scene. For example, the system may obtain an indication of location of the plane(s) in the physical scene (e.g., coordinates or a matrix transform). In some embodiments, the system may be configured to obtain information about lighting in the physical scene. For example, the system may obtain an indication of one or more light sources in the physical scene. As another example, the system may obtain an indication of ambient light intensity in the physical scene.

Next, process 200 proceeds to block 204, where the system obtains, via the communication network from the other computing device, position information indicative of a target position of a first product in the physical scene. In some embodiments, the system may be configured to obtain the position information by determining the position information. For example, the system may analyze the obtained image to identify an empty space in the physical scene where a product may be placed. In some embodiments, the system may be configured to obtain the position information from a computing device. For example, the position information may be generated by a computing device based on placement of a product model in a 3D scene or in an XR scene (e.g., as described herein with reference to FIGS. 1A-1C). The position information may comprise a matrix transform, a vector, coordinates, and/or other information indicating a target position of the product in the physical scene.

Next, process 200 proceeds to block 205, where the system performing process 200 identifies a second product to display in the physical scene. In some embodiments, the system may be configured to identify the second product as the first product. For example, the system may identify the second product as the first product based on an identification (e.g., SKU number) of the first product obtained from the other computing device (e.g., with the image of the physical scene and the position information). In some embodiments, the second product may be a product in the same category as the first product. For example, the first product may be a first article of furniture (e.g., a couch) and the second product may be a different article of furniture (e.g., dining table). In some embodiments, the second product may be a product of the same style as the first product. For example, if the first product is a first couch, the second product may be a second couch.

In some embodiments, the system may be configured to identify the second product as a different product from the first product. For example, the first product may be a first article of furniture and the system may identify a second article of furniture, different from the first article of furniture, to display in the physical scene. In some embodiments, the system may be configured to identify the second product as a different type of product from the first product. For example, the first product may be a loveseat and the second product may be a recliner. In some embodiments, the system may be configured to identify the second product as a product of a different style or brand than the first product. For example, the first product may be a dining table made of a first material (e.g., a first type of wood) and the system may identify the second product as a dining table made of a second material (e.g., a second type of wood). In another example, the first product may be a couch made of a leather material, and the system may identify the second product as an ottoman made of the same leather material as the couch. In some embodiments, the system may be configured to identify the second product from a set including the first product and the second product. For example, the first product may be a dining table from a dining table set, and the system may identify the second product as a chair from the dining table set.

In some embodiments, the system may be configured to identify the second product using information about a customer. The information may include the customer's indicated preferences, shopping trends, browsing history purchase history, and/or other information about the customer. As an illustrative example, the system may identify the second product by: (1) using the information about the customer to determine, for each of multiple products, a likelihood that the customer will purchase the product; and (2) identify the second product as the product with the greatest likelihood.

In some embodiments, the system may be configured to identify the second product using information about multiple customers. For example, the system may identify the second product based on product sales in a period of time (e.g., the last day, week, month, year, etc.). The system may rank products to display based on sales, and select the highest ranking product as the second product. As another example, the system may rank products based on frequency at which the products are selected for viewing by customers, and identify the second product as the product most frequently selected by customers for viewing.

In some embodiments, the system may be configured to identify the second product based on information about the physical scene. For example, the system may identify the second product based on other products that are present in the physical scene. The system may identify the second product as one that matches a style, color, brand, and/or material of one or more other products in the physical scene. As another example, the system may identify the second product as one that complements one or more other products in the physical scene (e.g., identify a loveseat that complements a recliner). In some embodiments, the system may be configured to identify the second product based on dimensions of the physical scene. For example, the system may identify a second product that fits in dimensions of the physical scene.

In some embodiments, the system may be configured to identify the second product to achieve marketing objectives. For example, the system may identify the second product as one that has a sales promotion associated with it. As another example, the system may identify the second product as a new product that has been added to a retailer's inventory.

Next, process 200 proceeds to block 206 where the system renders a 2D image of the second product in the physical scene. The system may be configured to render the 2D image of a product in the physical scene by (1) generating, using the image of the physical scene and the position information, a 3D scene with a 3D model of the product positioned therein; and (2) rendering the 2D image of the product within the physical scene from the 3D scene. In some embodiments, the system may be configured to use a 3D modelling software application (e.g., AUTOCAD 3DS MAX) to generate the 3D scene, and use a rendering software application (e.g., V-RAY) to render the 2D image from the 3D scene. An example process for rendering the 2D image of the product within the physical scene is described herein with reference to FIG. 3.

Next, process 200 proceeds to block 208, where the system provides the rendered 2D image of the second product in the physical scene to the other computing device. The system may provide the rendered 2D image to the device for displaying to a user of the device. For example, the user may be on an Internet website of a retailer. The user may want to view a visualization of a product (e.g., an article of furniture) in a space (e.g., a room in the user's home). The 2D image rendered by the system may be provided to the user as a visualization of the product place in the space.

Figure 3:
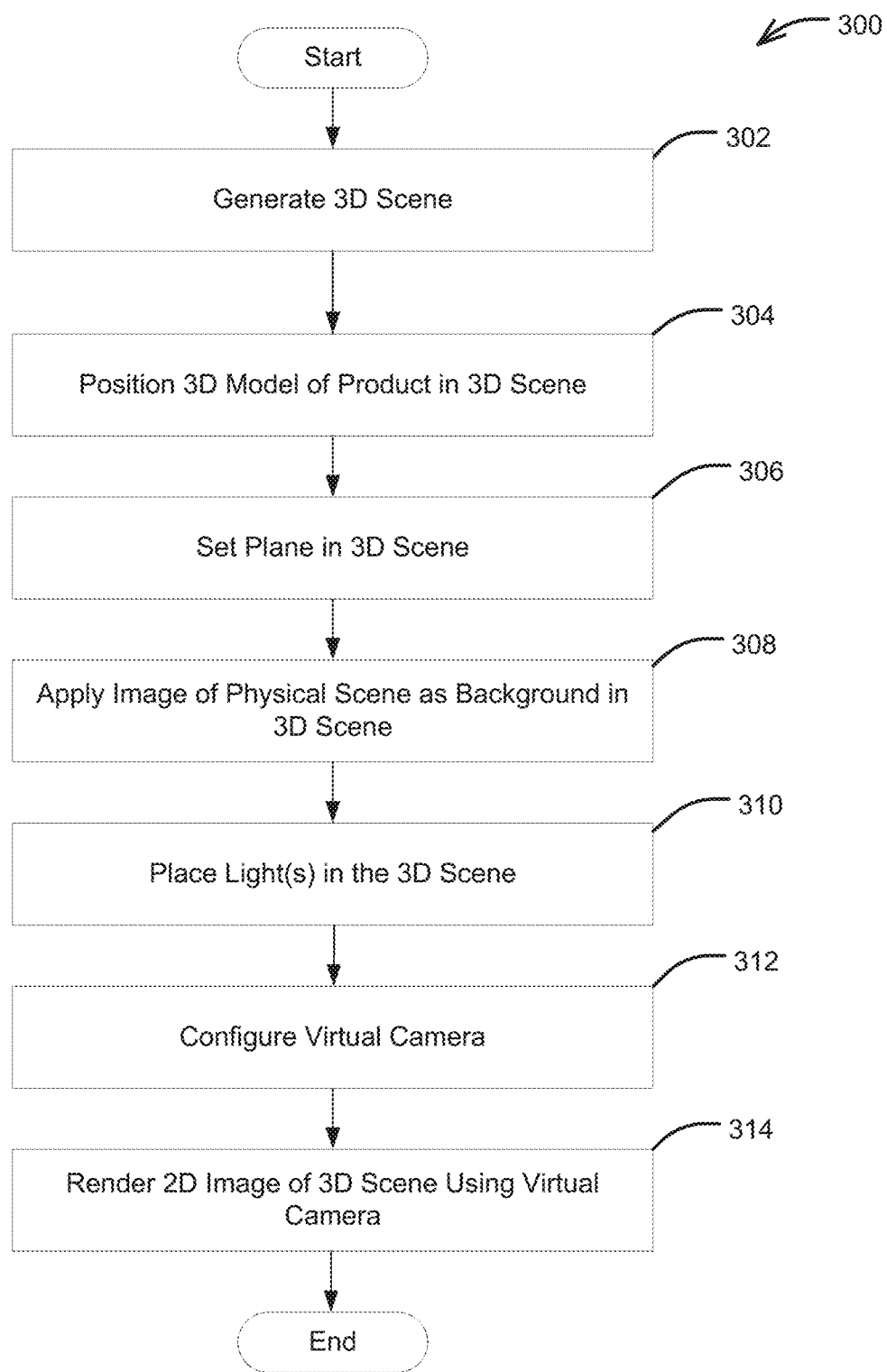
FIG. 3 is a flowchart of an example process for rendering a 2D image of a product within a physical scene in the process of FIG. 2, according to some embodiments of the technology described herein.

FIG. 3 shows an example process 300 for rendering a 2D image of a product within a physical scene, according to some embodiments of the technology provided herein. The process 300 may be performed by a system (e.g., server 104 described herein with reference to FIGS. 1A-1C). In some embodiments, the system may include a suitable computing device. In some embodiments, the system may include multiple computing devices communicatively coupled to one another. In some embodiments, process 300 may be performed at block 206 of process 200 described herein with reference to FIG. 2. For example, the process 300 may begin when the system receives an image of a physical scene and position information from a device. In another example, process 300 may begin when the system receives XR scene information from a device (e.g., to provide a visualization of the product in a physical space to a user of the device) or one or more images of a physical scene.

Process 300 begins at block 302 where the system generates a 3D scene including a 3D model of the product positioned within the 3D scene. In some embodiments, the system may be configured to generate a 3D scene using 3D modelling software (e.g., AUTOCAD 3DS MAX). In some embodiments, the system may be configured to generate the 3D scene by obtaining a template scene, where the template scene had been previously created by the system. In some embodiments, the system may be configured to modify the template scene according to XR scene information obtained from a device as described below at blocks 304-312. In some embodiments, the system may be configured to generate a new 3D scene. The system may customize the newly generated 3D scene using information obtained from the device.

Next, process 300 proceeds to block 304 where the system positions a 3D model of the product in the generated 3D scene. The system may be configured to (1) obtain the 3D product model; and (2) place the 3D product model in the 3D scene. In some embodiments, the system may be configured to obtain the 3D product model based on information identifying the product (e.g., an SKU code) of the product (e.g., indicated by information received from a device, or determined by the system). The system may be configured to use the identification of the product to identify the 3D product model from among multiple 3D product models. For example, the system may access a database storing 3D models for multiple different products of a retailer. The system may query the database for the 3D model product model using the identification of the product.

In some embodiments, the system may be configured to position the 3D product model at a location in the 3D scene based on information received from a device. In some embodiments, the system may be configured to receive information indicating a target position in the physical scene. For example, the information may have been obtained based on placement of a product model in a 3D model of the physical scene on the device. In another example, the information may have been obtained through an XR interface in which a user of the device positioned a 3D product model in an XR scene generated by the device. The system may receive an indication of the position that the user placed the 3D product model. The system performing process 300 may use the received indication to position the 3D product model in the 3D scene generated at block 302. In some embodiments, the 3D product model used by the device (e.g., positioned in a 3D scene or XR scene of the device) may be of lower resolution than the 3D product model used by the system performing process 300. For example, the 3D product model used by the device may be rendered in a 3D scene or an XR scene displayed by the device and thus may have a lower resolution to allow the device to display the 3D model more efficiently on the device (e.g., without delaying user interactions in a 3D scene or an XR scene displayed on the device). The 3D product model of the product used by the system performing process 300 may be of higher resolution, and thus capture physical appearance of the product more accurately.

In some embodiments, the indication of the target position may be coordinates in a 3D scene displayed by the device at which the user placed a 3D product model. In some embodiments, the indication of the target position may be coordinates in an XR scene at which the user placed a 3D product model. The coordinates may indicate a point relative to a point in the 3D scene generated by the system at block 302. In some embodiments, the indication of the position may be a vector indicating an offset from a point in the 3D scene. In some embodiments, the system may be configured to use the indication of the position to place the 3D product model in the 3D scene. For example, the system may position the 3D product model at coordinates indicated by information received from the device. In another example, the system may position the 3D product model offset from a point in the 3D scene based on a vector indicated by information received from the device.

In one example, the indication of the position may be a vector that indicates a displacement from a point in the 3D scene's coordinate system. The vector may indicate an offset from an origin point of (0, 0, 0) in the 3D scene. The system may receive an offset vector of (1, 1, 1) indicating a displacement of 1 unit along each axis from the origin of (1, 1, 1). In this example, the system may position the 3D model of the product in the 3D scene at point (1, 1, 1).

In some embodiments, the system may be configured to position the 3D model of the product in the 3D scene using a matrix transform (e.g., a 4×4 matrix transform) obtained from a device. The matrix transform may be determined by the device based on a placement of a 3D product model in a 3D scene or in an XR scene on the device. In some embodiments, the matrix transformation may indicate a position, rotation, and/or scale for the 3D model of the product in the 3D scene. The system may be configured to apply the matrix transform to the 3D model of the product to rotate the model in the 3D scene to match an orientation of a 3D model placed by a user in the 3D scene or the XR scene on the device. In some embodiments, the coordinate system of the 3D scene or the XR scene on the device may match a coordinate system of the 3D scene generated by the system at block 302. The system may apply a matrix obtained from the device directly to the 3D scene. In some embodiments, the coordinate system of the 3D scene or the XR scene on the device may be different from that of the 3D scene of the system. The system may be configured to perform a basis change to an obtained matrix to obtain a matrix in the coordinate space of the 3D scene generated by the system performing process 300. The system may be configured to determine a matrix transformation to transform a matrix obtained from the XR scene to a matrix that may be used in the 3D scene generated by the system performing process 300.

In one example, the system may obtain a 4×4 matrix of $$\begin{pmatrix} 1 & 0 & 0 & 2 \\ 0 & 1 & 0 & 2 \\ 0 & 0 & 1 & 2 \\ 0 & 0 & 0 & 1 \end{pmatrix}$$

(e.g., from the device or from application of a matrix transformation to a matrix obtained from the device). The matrix may indicate that the 3D model of the product in the 3D scene is to be translated from an origin of (0, 0, 0) by (2, 2, 2) units without any rotation or scaling.

In some embodiments, the system may be configured to determine a location in the 3D scene generated at block 302 at which to position the 3D product model from the image of the physical scene. In some embodiments, the system may be configured to determine the location based on user input, as described herein. However, in other embodiments, the system may be configured to automatically determine the location in the 3D scene without user input indicating the location. The system may be configured to identify a space in the physical scene at which to position the 3D product model. For example, the system may identify an empty space on a floor in the physical scene at which to place a 3D product model of an article of furniture. The system may determine coordinates and/or a vector indicating the location in the 3D scene from the image(s) of the physical scene. In some embodiments, the system may be configured to determine the location in the 3D scene using a machine learning model. The system may be configured to (1) generate an input using image(s) of the physical scene; and (2) providing the input to a trained machine learning model (e.g., a neural network) to obtain an output indicating a location in the 3D scene at which to position the 3D product model in the 3D scene. In some embodiments, the system may be configured to determine a location in the 3D scene at which to position the 3D product model by a user of the system. For example, an associate of a furniture seller may indicate a position in the 3D scene at which to position the 3D product model.

In some embodiments, the system may be configured to determine a location in the 3D scene at which to position a 3D product model by using dimensions of a boundary (e.g., a box) enclosing the 3D product model. The system may be configured to determine a size of a plane in the physical scene and determine whether the plane can accommodate the dimensions of the boundary enclosing the 3D product model. The system may be configured to determine an orientation of the 3D product model by positioning the 3D product model such that one or more points of the 3D product model would be visible to a user (e.g., viewing from a point of view of the image(s)). For example, the system may determine an orientation of a 3D product model of an article of furniture that would make certain features of the article of furniture visible to a user. In some embodiments, the system may be configured to train a machine learning model for determining a position of the 3D product model. For example, the machine learning model may be a neural network. The system may be configured to generate input for the machine learning model from available space in a physical scene and/or spatial constraints determined for identified planes (e.g., as described at block 306) in the physical scene. The system may be configured to obtain output from the machine learning model indicating a position at which to place the 3D product model in the 3D scene.

Next, process 300 proceeds to block 306, where the system sets a plane in the 3D scene. In some embodiments, the system may be configured to set the plane in the 3D scene using information received from a device. The system may be configured to receive information indicating a plane in a 3D scene or in an XR scene displayed by the device. In some embodiments, the indication of the plane may be a matrix transform (e.g., a 4×4 matrix transform) of a plane determined by the device according to planes identified in a 3D scene or an XR scene of the device. The system may be configured to use the 4×4 matrix transform to modify a plane of a template 3D scene. The system may apply the matrix transform obtained from the device to the plane (e.g., a floor plane) of the template scene to set the floor plane in the 3D scene.

In some embodiments, the system may be configured to receive an indication of locations of one or more planes in a 3D scene or in an XR scene. The system may use the indication of the locations to generate a plane in the 3D scene. For example, the system may receive coordinates of locations of a floor plane in a 3D scene, and use the coordinates to position a floor plane in the 3D scene generated at block 302. In another example, the system may receive coordinates of locations of floor planes in an XR scene, and use the coordinates to position a floor plane in the 3D scene. In some embodiments, the system may be configured to position the plane(s) using one or more matrix transforms received from the device. The system may be configured to generate, for each plane identified in an XR or 3D scene of the device, a plane in the 3D scene. For example, the system may generate a matte plane for each plane. A generated plane may capture shadows and bounce light like a real surface.

In some embodiments, the system may be configured to use the plane generated in the 3D scene to render one or more shadows in the 3D scene (e.g., at block 314). The system may be configured to render the shadow(s) on the plane to depict shadows that would appear in a physical space with the product placed therein (e.g., due to one or more light sources in the physical space). For example, light entering the physical scene would contact the product, and result in a shadow forming on a plane of the physical scene.

In some embodiments, the system may be configured to generate a plane in the 3D scene from one or more images of the physical scene. The system may be configured to (1) identify a plane (e.g., floor, ceiling, and/or walls) in the image(s) of the physical scene; and (2) generate the plane in the 3D scene from the identified plane(s) in the image(s) of the physical scene. For example, the system may position a floor plane in the 3D scene according to an identified floor plane in the image(s) of the physical scene. The system may be configured to identify a plane in the image(s) of the physical scene by applying one or more simultaneous localization and mapping (SLAM) techniques to the image(s) of the physical scene to determine a plane for the 3D scene.

In some embodiments, the system may be configured to identify a planes in the image(s) of the physical scene using a machine learning model (e.g., a neural network). The machine learning model may be trained to indicate depth information in the image(s) of the physical scene. The depth information indicated by the machine learning model may be used to identify the plane in the physical scene. In some embodiments, the machine learning model may be trained to segment an image into multiple regions. The depth information may be used to identify a plane in the regions of the image. In some embodiments, the machine learning model may include: (1) a first sub-model trained to indicate depth information; and (2) a second sub-model trained to divide an image into multiple portions.

For example, the first sub-model may be a first neural network for determining depth information in the image(s) of the physical scene. The first neural network may be trained using supervised learning techniques by using a set of images with annotated depth data. For example, the first neural network may be trained using a ScanNet dataset which contains 2.5 million views with annotated depth and camera poses. The system may use the first neural network to determine depth information in the image(s) of the physical scene. For example, the depth information may indicate a height of one or more surfaces in the image(s) of the physical scene. In this example, the second sub-model may be a second neural network. For example, the second neural network may be a semantic segmentation neural network. The system may use the second neural network to segment an image of the physical scene into regions. The system may search for planes in the image regions using the depth information obtained from the first neural network. Other machine learning models in addition to or instead of a neural network may be used, as aspects of the technology described herein are not limited in this respect.

In some embodiments, the position of a plane in an image of a physical scene may depend on one or more camera parameters. For example, a focal point and optical center of the camera used to capture the image may affect estimation of the position of the plane (e.g., using a machine learning model). In some embodiments, the system may be configured to: (1) determine a camera used to obtain the image of the physical scene; and (2) obtain the focal point and optical center according to the determined camera. For example, the system may obtain the information about the camera from a specification provided by a manufacturer of the camera. In some embodiments the system may be configured to estimate an optical center and focal length of the camera. The system may be configured to estimate the optical center and the focal length of the camera using one or more vanishing points in the image of the physical scene. For example, the system may estimate the optical center and focal point of the camera using computer vision techniques described in "Determination of Food Portion Size by Image Processing," published in 2008 30th Annual International Conference of the IEEE Engineering in Medicine and Biology Society, pp. 871-874, September 2008, which is incorporated by reference herein.

Next, process 300 proceeds to block 308 where the system uses an image of the physical scene to apply a background to the 3D scene. The image of the physical scene may be obtained from a device. For example, the image of the physical scene may have been obtained by the device using a 3D model of the physical scene. In another example, the image of the physical scene may have been captured by a camera of the device. The image of the physical scene may show a physical space or portion thereof where the user would like to see the product placed. In some embodiments, the system may be configured to set the background of the 3D scene to the obtained image of the physical scene such that a 2D image rendered from the 3D scene includes the image of the physical scene therein.

In some embodiments, the image of the physical scene may be applied to the 3D scene such that the image of the physical scene spans an entire 2D image rendered from the 3D scene. The system may be configured to set a background image in the 3D scene to encompass a field of view (e.g., horizontal and/or vertical field of view) of a virtual camera used for rendering a 2D image from the 3D scene (e.g., as described at block 312). Thus, when the 2D image is rendered from the 3D scene using the virtual camera, the image of the physical scene will be included in the 2D image (e.g., by spanning the entire 2D image).

The inventors have recognized that an image of the physical scene captured by the device may be planar. As the image of the physical scene is planar, a 2D image rendered from the 3D scene would not accurately capture reflection and/or translucency of a 3D model of the product placed in the 3D scene. For example, a translucent glass product may appear black in a 2D image that is rendered from the 3D scene when the image of the 2D scene is applied as a planar background. In another example, a reflection of the product on a wooden floor in the image of the physical scene may not be rendered when the image of the physical scene is applied as a planar background in the 3D scene. In another example, color bounce off a floor shown in the image of the physical scene may not be accurately captured when a planar image of the physical scene is applied to the 3D scene.

To address the above-described problems, in some embodiments, the system may be configured to: (1) warp a planar image of the physical scene; and (2) apply the warped image of the 3D scene. In some embodiments, the system may be configured to warp the image of the physical scene by: (1) projecting the image of the physical scene onto a unit sphere; and (2) applying a spherical mapping obtained from the projection to the scene. By applying a warped image of the physical scene to the 3D scene, a 2D image rendered from the 3D scene may display translucency and/or reflection in the 2D image more accurately than when a planar image of the physical scene is applied to the 3D scene. For example, the system may map the warped image onto an equirectangular representation such that, when rendered with a virtual camera, the original unwarped image is yielded.

Next, process 300 proceeds to block 310 where the system places one or more lights (e.g., point lights) in the 3D scene. In some embodiments, the system may be configured to receive, from the device, an indication of one or more light sources in the physical scene. For example, the device may have provided an XR interface through which the device obtained user indications of the light source(s) in the physical scene (e.g., as described at block 510 of process 500 described herein with reference to FIG. 5). In some embodiments, the indication of the light source(s) may be indications of location(s) in the 3D scene at which to place light source(s). For example, the indications of the light source(s) may be coordinates or a vector specifying the location(s) in the 3D scene. The system may be configured to place the light(s) in the 3D scene according to the determined light sources or the indication of the light source(s) obtained from the device. The system may be configured to place light(s) at the specified location(s) in the 3D scene.

In some embodiments, the system may be configured to place the light(s) in the 3D scene by determining one or more light sources in the physical scene from image(s) of the physical scene. The system may be configured to determine the light source(s) in the physical scene from the image(s) by: (1) generating an input from the image(s) of the physical scene (e.g., from pixel values of the image(s)); and (2) providing the input to a machine learning model (e.g., a neural network) trained to identify light sources to obtain an indication of light source(s) in the physical scene. For example, the output may indicate a location of light source(s) in the image(s) of the physical scene. In some embodiments, the machine learning model may be a neural network (e.g., a convolutional neural network). Other machine learning models in addition to or instead of a neural network may be used, as aspects of the technology described herein are not limited in this respect. In some embodiments, the system may be configured to place the light(s) in the 3D scene by determining light source(s) from the image(s) of the physical scene by analyzing pixel values. For example, an image of a physical scene may be an HDR panorama of the physical scene in which the system may identify pixels associated with light source(s).

In some embodiments, the system may be configured to use multiple machine learning models to determine the light source(s) in the physical scene from the image(s). The system may be configured to use a first machine learning model to identify pixels in an image associated with light sources in a physical scene. For example, the system may use the first machine learning model to obtain a segmentation map indicating pixels in the image associated with a light source. The system may be configured to use a second machine learning model to identify light sources in the physical scene. For example, the system may use the second machine learning model to obtain an environment map indicating the light source(s) in the physical scene. The environment map may be a panoramic image indicating light sources in the physical scene. The system may be configured to use a third machine learning model to improve a quality of an environment map obtained from the output of the second machine learning model. For example, an environment map obtained from the output of the second machine learning model may be a low dynamic range (LDR) image. The system may be configured to use the third machine learning model to obtain a high dynamic range (HDR) image. The system may be configured to use the HDR environment map obtained from an output of the third machine learning model to determine light source(s) to be placed in the 3D scene. The system may be configured to use the HDR environment map to determine: (1) location(s) of the light source(s); and (2) properties (e.g., ambient light intensity and/or ambient light temperature) of the light source(s). In some embodiments, each of the machine learning models may be a neural network (e.g., a convolutional neural network). Other machine learning models in addition to or instead of a neural network may be used, as aspects of the technology described herein are not limited in this respect.

In some embodiments, the machine learning models may be trained by applying a supervised learning technique to a set of training data. The training data may be obtained from: (1) a set of panoramic images of one or more physical scenes (e.g., 360° panoramic images) with known areas of lighting; and (2) cropped sections of the panoramic images representing input images (e.g., captured by a device camera). Training data for the first machine learning model may include: (1) the cropped sections of the panoramic images as inputs; and (2) segmentation maps generated from the panoramic images, where each segmentation map indicates pixels in the cropped sections associated with sources of light in the physical scenes. Training data for the second machine learning model may include: (1) segmentation maps obtained from the first machine learning model as inputs; and (2) environment maps of entire physical scenes (e.g., obtained from an associated panoramic image) as target outputs. Training data for the third machine learning model may include: (1) LDR environment maps obtained from outputs of the second network as inputs; and (2) HDR environment maps obtained from the original panoramic images as target outputs.

In some embodiments, the system may be configured to place a dome light in the 3D scene. The dome light may provide one uniform light for the entire 3D scene. The dome light may be used in conjunction with the light(s) placed in the 3D scene using the indications of the light source(s) in the physical scene (e.g., obtained from the device). In some embodiments, the system may be configured to obtain an ambient light intensity in the physical scene from the device. For example, the device may determine an ambient light intensity in the physical scene using sensors (e.g., imaging sensors) of the device. In another example, the device may determine an ambient light intensity in a 3D model of the physical scene (e.g., model 102F). The system may receive the ambient light intensity determined by the device. In some embodiments, the system may be configured to set light intensities of light(s) placed in the 3D scene using the ambient light intensity obtained from the device. In some embodiments, the system may be configured to determine an ambient light intensity and ambient light temperature from image(s) of the physical scene. For example, the system may determine the ambient light intensity and ambient light temperature from an output of a machine learning model used to determine light source(s) in the physical scene. Example machine learning models for determining the light source(s) in the physical scene are described herein.

In some embodiments, the system may be configured to apportion the ambient light intensity among the light(s) placed in the 3D scene. The system may be configured to apportion the ambient light intensity among: (1) a dome light placed in the 3D scene; and (2) one or more point lights placed in the scene using indications of light source(s) in the physical scene. For example, the system may apportion 20% of the ambient light intensity obtained from the device to the dome light, and apportion the remaining 80% of the ambient light intensity among point light(s) placed in the 3D scene. The 80% of the light intensity may be distributed uniformly among the point light(s). In another example, the system may apportion 50% of the ambient light intensity to the dome light and apportion 50% of the ambient light intensity to the point light(s). In another example, the system may apportion 25% of the ambient light intensity to the dome light and apportion 75% of the ambient light intensity to the point light(s). In some embodiments, the system may be configured to distribute the ambient light intensity non-uniformly among the point light(s). For example, the system may determine that a first light source in the physical scene has a greater light intensity than a second light source in the physical scene. The system may set a light intensity for a first point light placed in the 3D scene corresponding to the first light source greater than a light intensity for a second point light placed in the 3D scene corresponding to the second light source.

In some embodiments, the system may be configured to set radii of one or more of the light(s) placed in the 3D scene. For example, the system may determine the radii of point light(s) placed in the 3D scene. In some embodiments, the system may be configured to set the radius of a light placed in the 3D scene using a distance of the light from the 3D model of the product positioned in the 3D scene (e.g., at block 304). For example, the system may set the radius of light to a value that is inversely proportional to the distance of the light from the 3D model of the product positioned in the 3D scene.

In some embodiments, the system may be configured to obtain an ambient light temperature (in Kelvin) from the device. The system may be configured to use the obtained ambient light temperature to set light temperature(s) of the light(s) placed in the 3D scene. In some embodiments, the system may be configured to determine an ambient light temperature from image(s) of the physical scene. For example, the system may analyze the image(s) of the physical scene to determine an ambient light temperature in the physical scene. In some embodiments, the system may be configured to set a color temperature of each light placed in the 3D scene to the obtained or determined ambient light temperature. For example, the system may obtain a color temperature of 3000 Kelvin and set a color temperature of all the lights placed in the 3D scene to a color temperature of 3000 Kelvin. In some embodiments, the system may be configured to set a different color temperature for a dome light placed in the 3D scene than for other lights (e.g., point lights) placed in the 3D scene.

Next, process 300 proceeds to block 312, where the system configures a virtual camera used for rendering a 2D image from the 3D scene (e.g., in the V-RAY rendering software application). The system may configure the virtual camera such that it renders the 2D image to replicate capture of an image of a physical scene by a camera of the device. In some embodiments, the system may be configured to: (1) obtain one or more camera setting values (e.g., obtained from a 3D model of the physical scene, or used by a camera of the device to capture the image of the physical scene); and (2) configure the virtual camera according to the camera setting value(s). In some embodiments, the system may be configured to obtain a field of view. The field of view may include a vertical field of view (degrees) and a horizontal field of view (degrees). In some embodiments, the system may be configured to obtain a camera exposure offset value (EV). The system may be configured to set a camera exposure offset value, vertical field of view, and/or a horizontal field of view of the virtual camera using the values obtained from the device. For example, the system may set camera setting values for the virtual camera to camera setting values obtained from the device. In another example, the system may set a global exposure offset to the exposure offset obtained from the device.

In some embodiments, the system may be configured to position the virtual camera using information obtained from the device. The system may receive an indication of the camera position relative to the 3D scene. The indication may be a matrix transform to be used for the virtual camera (e.g., to position the virtual camera relative to the 3D scene). For example, the device may determine a matrix transform (e.g., a 4×4 transform) to modify a position of the virtual camera in a template 3D scene used by the system. The matrix transform may position the virtual camera relative to the 3D scene to match a position of a camera used by the device to capture the image of the physical scene. In some embodiments, the system may be configured to obtain a rotation angle of a panorama relative to a camera position obtained from the device. The system may be configured to orient (e.g., rotate) the virtual camera based on the rotation angle obtained from the device.

In some embodiments, the system may be configured to: (1) determine one or more camera setting values from image(s) of the physical scene; and (2) configure the virtual camera according to the determined camera setting value(s). In some embodiments, the system may be configured to determine a camera exposure offset value (EV), a vertical field of view (degrees), and a horizontal field of view (degrees). The system may be configured to set a camera exposure offset value, vertical field of view, and horizontal field of view of the virtual camera using the determined values. For example, the system may set camera setting values for the determined values.

The system may be configured to position the virtual camera relative to the 3D scene. In some embodiments, the system may be configured to position the virtual camera using a matrix transform (e.g., world transform) of a camera used by the device to generate an XR scene. In some embodiments, the system may be configured to determine a position of the virtual camera from image(s) of the physical scene. The system may be configured to determine a position of the virtual camera relative to the physical scene from the image(s) of the physical scene. The position may be a position in the 3D scene at which to place the virtual camera. For example, the device may determine coordinates at which to position the virtual camera.

In some embodiments, the virtual camera may be used to replicate a field of view of an image of the physical scene. For example, the virtual camera may be positioned at the origin (0, 0, 0) of the 3D scene. A plane textured with an image of the physical scene may be positioned such that a field of view of the virtual camera is filled. Thus, the system may not need to determine a position of the virtual camera in the 3D scene from the image(s) of the physical scene.

Next, process 300 proceeds to block 314 where the system renders a 2D image of the 3D scene using the virtual camera to obtain the 2D image of the product within the physical scene. In some embodiments, the system may be configured to render the 2D image by applying a ray-tracing technique (e.g., using the V-RAY rendering software application). The system may trace a path from the virtual camera through each pixel in a virtual screen spanning at least a portion of the 3D scene, and determine a value for the pixel. Accordingly, the raytracing approximates image capture performed by a camera when capturing an image of the physical scene. By applying raytracing using the virtual camera (e.g., configured as described at block 312) to the 3D scene generated at blocks 302-310, the system obtains the 2D image of the product within the physical scene. The 2D image of the product within the physical scene may include an image of the product with sufficient resolution to provide a realistic depiction of the model, and incorporate effects of features of the physical scene (e.g., lighting, reflection, and/or shadows).

After the 2D image of the product within the physical scene is rendered, process 300 ends. For example, the 2D image of the product may be provided to the device for display to the user (e.g., as described at block 208 of process 200).

Figure 4:
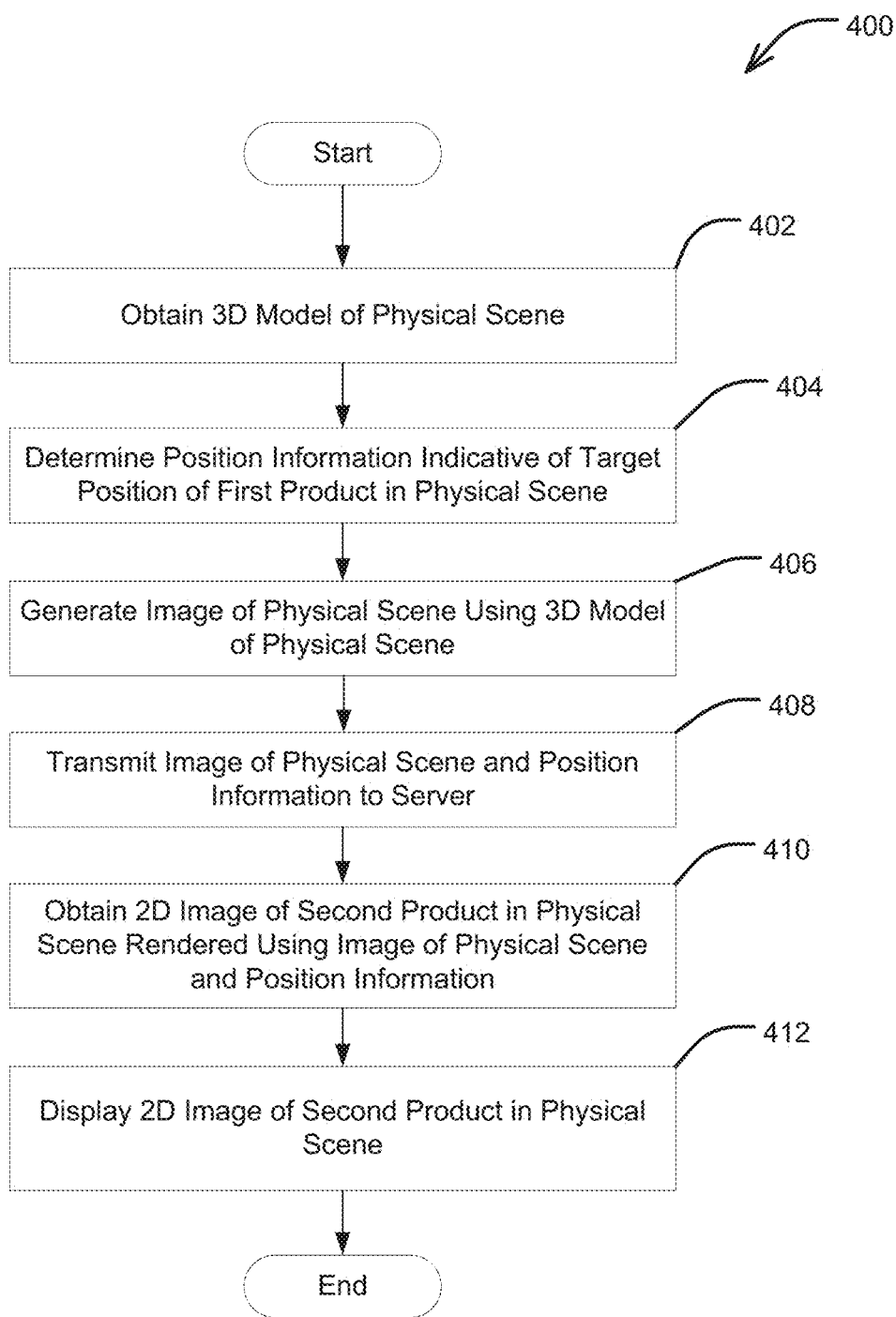
FIG. 4 is a flowchart of an example process for obtaining a 2D image of a product within a physical scene using a 3D model of the physical scene, according to some embodiments of the technology described herein.

FIG. 4 shows a flowchart of an example process 400 for obtaining a 2D image of a product in a physical scene, according to some embodiments of the technology described herein. Process 400 may be performed by a system. The system may be any suitable computing device. (e.g., computing device 102 described herein with reference to FIGS. 1A-1C).

Process 400 may be performed by a system to provide a user a visualization of a product in a physical scene. For example, a user may be shopping for furniture for a room in a house of the user (e.g., on a mobile application or an Internet website). The user may use the system to browse products (e.g., articles of furniture). A user may want to see a visualization of a product in the physical scene (e.g., in the room of the house). The system may perform process 400 to obtain a 2D image of the product in the physical scene to provide to the user.

Process 400 begins at block 402, where the system performing process 400 obtains a 3D model of a physical scene ("3D scene"). In some embodiments, the system may be configured to obtain the 3D scene from a repository of 3D models of physical scenes. For example, the system may access the 3D model of the physical scene from a repository through a website. In another example, the system may obtain the 3D scene from a data store of the system. In some embodiments, the 3D scene may be a MATTERPORT 3D scene. In some embodiments, the system may be configured to obtain the 3D scene by generating the 3D scene using one or more images of the physical scene. For example, the system may receive images of the physical scene and use a 3D modelling software application (e.g., MATTERPORT) to generate the 3D scene using the received images. The images may include images from various viewpoints that may be used to generate a 3D scene. In some embodiments, the system may be configured to display the 3D scene on a display of the system. The system may be configured to display the 3D scene in a GUI that allows a user to modify a view in the 3D scene and/or navigate to different locations in the 3D scene. For example, a user of the system may access a display of the 3D scene on a website. In another example, a user of the system may access a display of the 3D scene on a mobile application. In some embodiments, the system may be configured to display the 3D scene on a website by executing a JAVASCRIPT software application using an Internet browser application. The JAVASCRIPT application may use a 3D display library (e.g., 3JS) to display the 3D scene.

Next, process 400 proceeds to block 404, where the system determines position information indicative of a target position of a first product in the physical scene. In some embodiments, the system may be configured to determine the position information by: (1) receiving user input positioning a 3D model of the first product in the 3D scene; and (2) determining the position information based on the position of the 3D product model in the 3D scene. For example, the system may use coordinates of the position of the 3D product model in the 3D scene to determine the position information. In some embodiments, the system may be configured to determine the position information by determining a matrix transform based on the position of the 3D product model in the 3D scene. For example, the system may determine a matrix transform for use by a server in positioning a 3D product in a 3D scene generated by the server (e.g., for use in rendering a 2D image of the product in the physical scene).

Next, process 400 proceeds to block 406, where the system generates an image of the physical scene using the 3D scene. The system may be configured to extract an image from the 3D scene. For example, the system may extract an image of the physical scene by capturing an image of a view shown in the 3D scene (e.g., based on user input to set the view). In some embodiments, the system may be configured to obtain the image from the physical scene after receiving a user input. For example, the system may obtain the image from the physical scene after selection of a graphical element in a GUI displaying the 3D scene. For example, a user may navigate and/or adjust a view in the 3D scene and/or position a 3D product model in the 3D scene (e.g., as described herein with reference to block 404). The user may then provide input that causes the system to obtain an image of the physical scene using the 3D scene (e.g., to capture a particular view in the 3D scene of interest to the user).

In some embodiments, the system may be configured to determine information in addition to the position information and the image of the physical scene. In some embodiments, the image of the physical scene may be a panorama. The system may be configured to determine a rotation angle of the panorama with respect to a camera position (e.g., for use in configuring a virtual camera for rendering a 2D image of the product in the physical scene). In some embodiments, the system may be configured to determine a camera field of view for the image of the physical scene. The system may be configured to determine a horizontal and vertical field of view of a camera (e.g., in degrees). In some embodiments, the system may be configured to obtain the additional information from the 3D scene. For example, the system may use one or more functions provided by an SDK of 3D modelling software (e.g., MATTERPORT) to obtain field of view and/or rotation angle of a panorama. In some embodiments, the system may be configured to determine one or more light sources in the physical scene using the 3D scene. For example, the system may identify light sources in the 3D scene, or obtain user input indicating the lighting sources. In some embodiments, the system may be configured to determine an ambient light intensity in the physical scene. For example, the system may determine an ambient light intensity in the 3D scene. In some embodiments, the system may be configured to identify one or more planes in the physical scene using the 3D scene. For example, the system may process one or more images from the 3D scene to identify plane(s) in the 3D scene. The system may determine indications of the identified plane(s). For example, the system may determine coordinates for the locations of the identified plane(s).

In some embodiments, the system may be configured to obtain information identifying the first product. The system may be configured to obtain the information identifying the first product based on a user selection (e.g., on a website or in a mobile device application). In some embodiments, the system may be configured to determine an SKU code identifying the first product among a plurality of products. In some embodiments, the system may be configured to determine a universal product code (UPC) of the first product.

Next, process 400 proceeds to block 408 where the system transmits the position information and the image of the physical scene to a server. In some embodiments, the system may be configured to transmit other information described herein in addition to the position information and the image of the physical scene. In some embodiments, the system may be configured to transmit the information in response to a user input. For example, the system may transmit the information in response to a user selection of a graphical user interface element configured to cause the system to transmit the information to a server.

Next, process 400 proceeds to block 410, where the system obtains a 2D image of a second product within the physical scene. In some embodiments, the system may be configured to obtain the 2D image of the second product within the physical scene in response to transmitting the information (e.g., position information, image of physical scene, and/or other information). For example, the transmission of the information to the server may trigger a process to render the 2D image of the second product within the physical scene. The system may be configured to receive the 2D image of the second product in the physical scene as a communication over a network (e.g., the Internet). The 2D image of the second product in the physical scene may be generated by the server (e.g., as described herein with reference to FIGS. 2 and FIG. 3). In some embodiments, the second product may be the same as the first product. In some embodiments, the second product may be different from the first product. Example techniques of identifying the second product are described herein.

Next, process 400 proceeds to block 412, where the system displays the 2D image to the user. The system may be configured to display the 2D image of the second product within the physical scene on a display of the device. For example, the system may display the 2D image on a webpage of a website (e.g., that the user selected the product from). In another example, the system may display the 2D image on a screen of a mobile device application. In some embodiments, the system may be configured to provide an image file comprising the 2D image. The system may save the file for access by the user at a later time. In some embodiments, the system may be configured to display the 2D image to the user in conjunction with one or more other 2D images of products in the physical scene. For example, the user may be browsing a display (e.g., a webpage) showing multiple products. The system may be configured to display a 2D image of each product in the physical scene.

In some embodiments, a rendered 2D image of a product within the physical scene may be presented to the user in a variety of settings. In some embodiments, the system may be configured to generate a graphical user interface displaying the rendered 2D image. The graphical user interface may be presented on a display of the user device. For example, the graphical user interface may be presented on an Internet website displayed by the device (e.g., using an Internet browser application). In another example, the graphical user interface may be presented in a mobile application of the device. In another example, the rendered 2D image may be provided to the user in a browsing interface of a website or mobile application in which the image is one of a gallery of images of various products in the physical scene. To illustrate, if a sofa is selected, the gallery may display images of different colors of the sofa in the physical scene. As another illustrative example, the gallery may display images of different articles of furniture in the physical scene.

In another example, the rendered 2D image may be provided to the user in a product details page in which the image is shown with other information about the product (e.g., price, reviews, specifications, etc.). In some embodiments, the system may be configured to include the rendered 2D image in a communication to the device. For example, the system may transmit the rendered 2D image in an email, an SMS message, and/or an MMS message. In some embodiments, the rendered 2D image may be provided to a user in a product recommendation or advertisement. For example, the rendered 2D image may be provided in a product recommendation on a social media platform (e.g., FACEBOOK, TWITTER, SNAPCHAT, etc.). In some embodiments, the rendered 2D image may be provided to the user in a brick and mortar location where a user may select the product (e.g., by scanning a bar code) and receiving the rendered 2D image (e.g., on a mobile device of the user).

In some embodiments, a user may submit an image of the physical scene and a rendered 2D image of a product in the physical scene may be provided as a digitally furnished rendering of the physical scene. For example, the user may submit the image of the physical scene through a website or electronic communication (e.g., email or text). The image of the physical scene may be used to render the 2D image of a product in the physical scene. The user may receive the rendered image of the product in the physical scene on the website or through an electronic communication (e.g., email or text). As another example, the user may submit an image of the physical scene in a brick and mortar location (e.g., at a kiosk). The submitted image may then be used to generate a 2D image of a product in the physical scene. The 2D image of the product may be displayed to the user at the location (e.g., at a kiosk).

Figure 10:
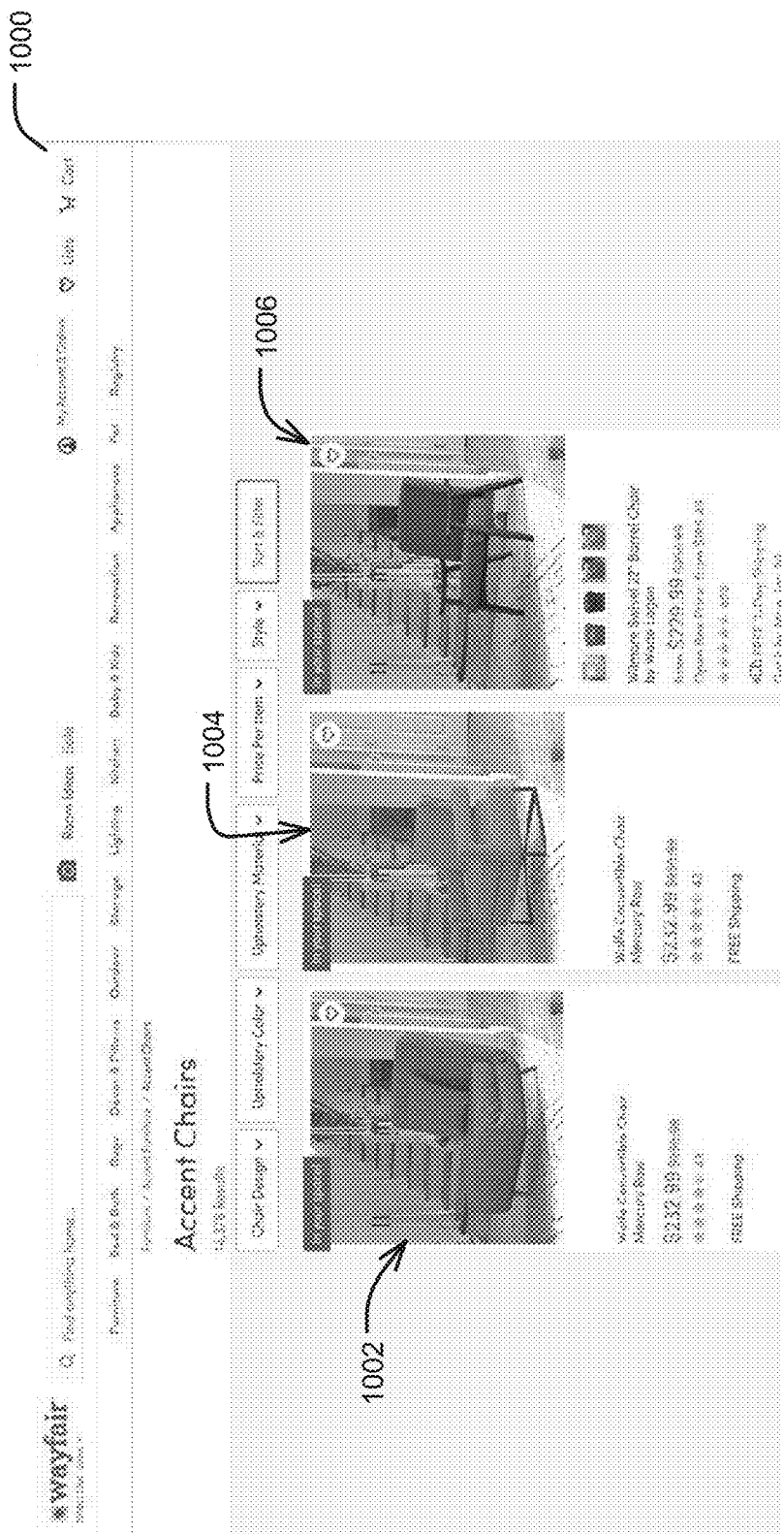
FIG. 10 shows a web-based graphical user interface for browsing products, according to some embodiments of the technology described herein.

FIG. 10 shows a web-based graphical user interface 1000 for browsing products, according to some embodiments of the technology described herein. The graphical user interface 1000 may be presented to a user by an application (e.g., an Internet browser application) of the device. As shown in the example of FIG. 10, the graphical user interface 1000 includes images of products in a gallery view. For example, the gallery view may be presented to the user when the user performs a search (e.g., for "accent chairs") or accesses a product category (e.g., "accent chairs"). The gallery view of FIG. 10 includes a plurality of rendered 2D images of various products within a physical scene. In the example of FIG. 10, the graphical user interface 1000 displays a 2D image 1002 of a first chair in a physical scene, a 2D image 1004 of a second chair in the physical scene, and a 2D image 1006 of a third chair in the physical scene. The images 1002-1006 allow the user to visualize an appearance of each chair in a physical scene. The gallery view may allow the user to visualize multiple different products in a physical scene (e.g., a space in the user's home). The graphical user interface may allow the user to efficiently browse through products, and make a buying decision.

Figure 11:
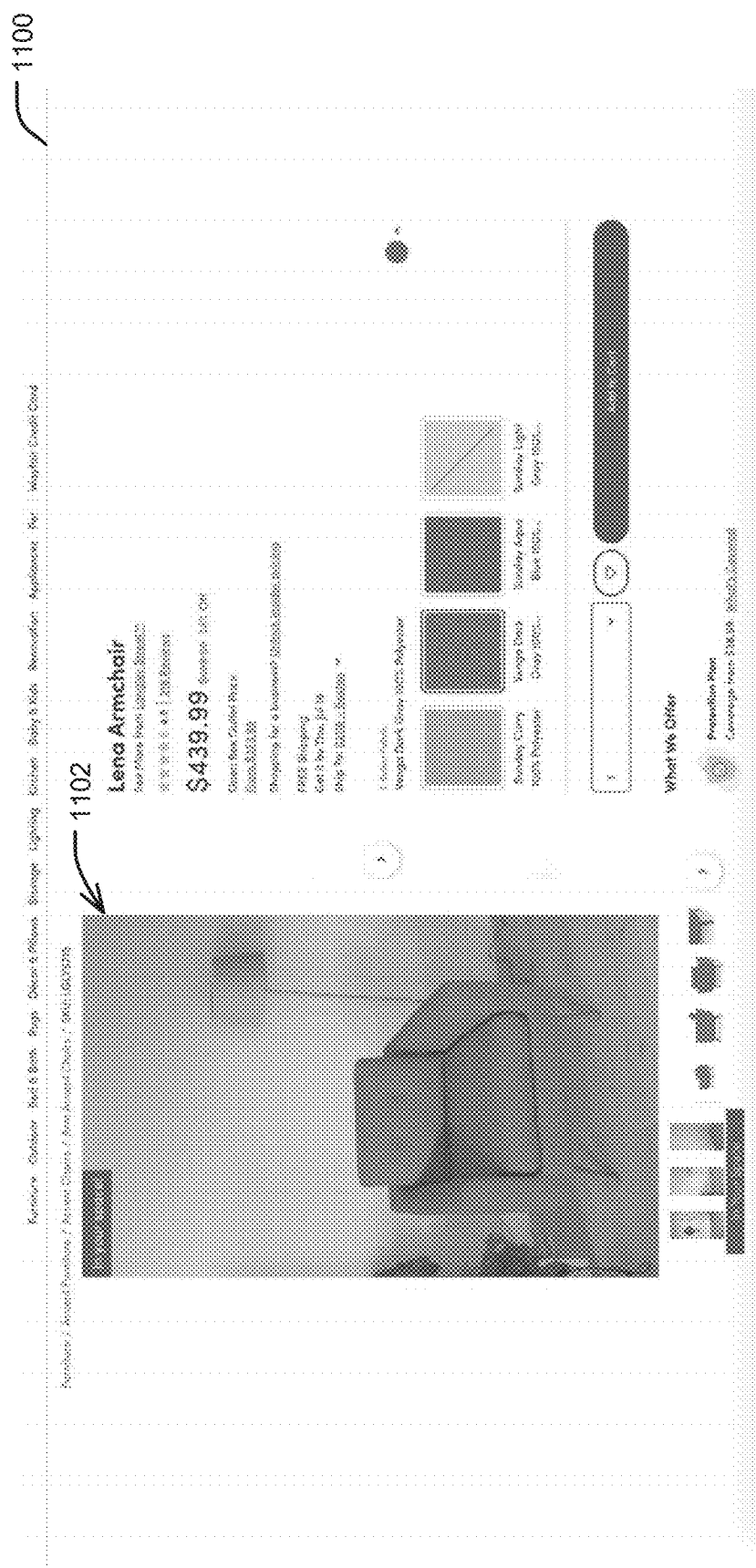
FIG. 11 shows a web-based graphical user interface showing information about a product, according to some embodiments of the technology described herein.

FIG. 11 shows a web-based graphical user interface 1100 showing information about a product, according to some embodiments of the technology described herein. For example, the graphical user interface 1100 may be a product details page of a website and/or an application (e.g., a mobile application). The product details page may include information about a product (e.g., accessed by a user from a gallery view). For example, the product details may include a price, availability, shipping date, photos of the product, options for the product (e.g., color options), dimensions, reviews, and other information.

Figure 12:
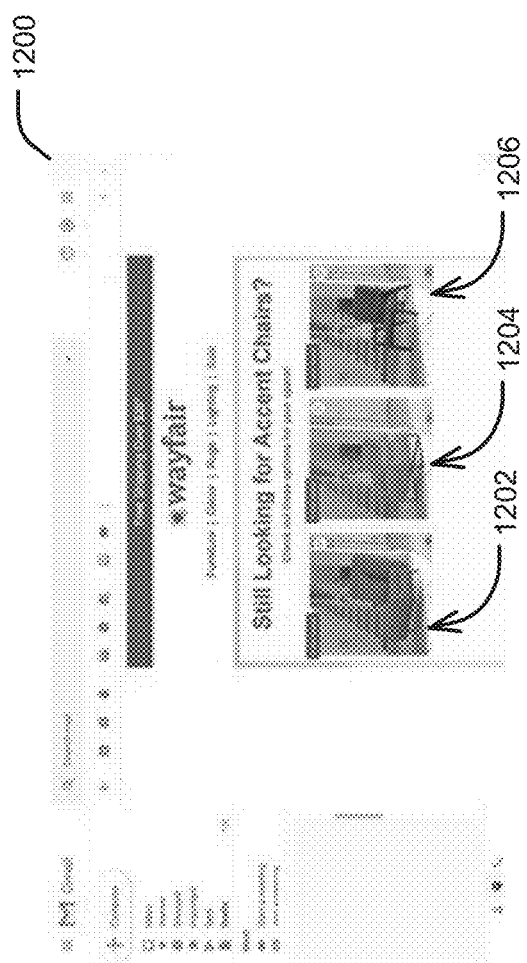
FIG. 12 shows a screenshot of a product recommendation in an email presented on a display of a device, according to some embodiments of the technology described herein.

FIG. 12 shows a screenshot of a product recommendation 1200 in an email presented on a display of a device, according to some embodiments of the technology described herein. The product recommendation display 1200 includes a 2D image 1202 of a first product in a physical scene, a 2D image 1204 of a second product in the physical scene, and a 2D image 1206 of a third product in the physical scene. Each of the 2D images 1202-1206 may be obtained by performing process 212. The physical scene may be from a home of a user's device. As the product recommendation 1200 may include a visualization of products in a physical scene (e.g., a room in the user's home) recognized by the user, the product recommendation 1200 may be more appealing to the user. Thus, the user may be more likely to access the product recommendation. For example, the user may be more likely to access a link to an Internet website for purchasing products shown in images 1202-1206. In some embodiments, the product recommendation may be presented in other ways. For example, the product recommendation may be presented as described herein with reference to block 412 of process 400 described with reference to FIG. 4.

Figure 5:
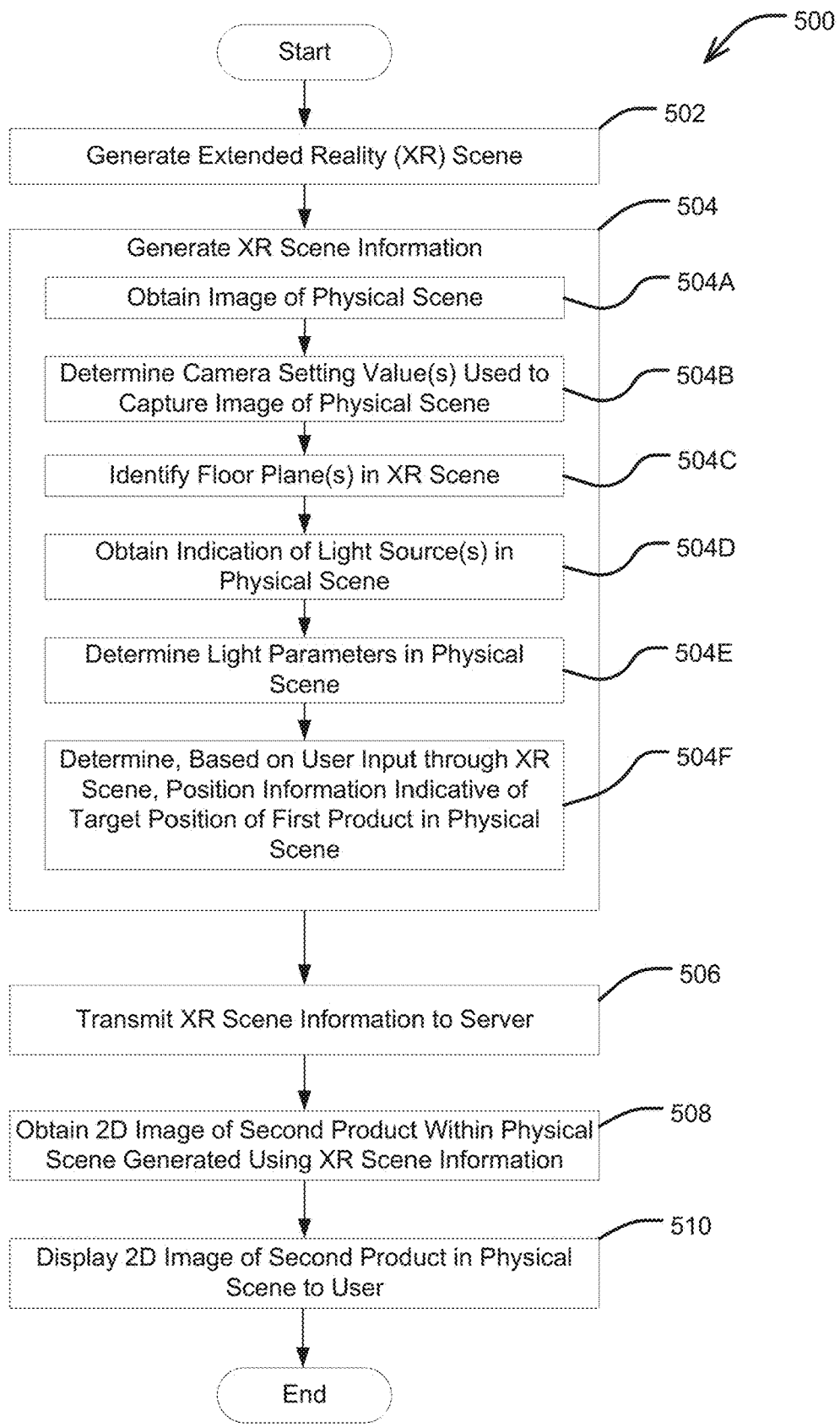
FIG. 5 is a flowchart of an example process for obtaining a 2D image of a product within a physical scene using an XR scene, according to some embodiments of the technology described herein.

Although in example of process 400 the system obtains the 2D image of the second product in the physical scene from a server, in some embodiments, process 400 may be modified such that the system generates the 2D image of the second product in the physical scene instead of obtaining the 2D image of the second product in the physical scene from a server. The system may be configured to generate the 2D image of the second product in the physical scene by rendering the 2D image using the position information determined at block 404 and the image of the physical scene generated at block 406. In such embodiments, the steps at block 408 and 410 of transmitting information to a server and obtaining the 2D image from the server may be removed. In some embodiments, the system may be configured to perform process 200 described herein with reference to FIG. 2 and/or process 300 described herein with reference to FIG. 3 to generate the 2D image. In such embodiments, the steps at blocks 202 and 208 of process 200 of obtaining an image from another computing device and providing the 2D image to the other computing device may be removed. FIG. 5 shows a flowchart of an example process 500 for obtaining a 2D image of a product within a physical scene, according to some embodiments of the technology described herein. Process 500 may be performed by a system. The system may be any suitable computing device (e.g., computing device 102 described herein with reference to FIGS. 1A-1C). In some embodiments, process 500 may be performed by a system to provide a user a visualization of a product in a physical scene. For example, a user may be shopping for furniture for a room in a house of the user (e.g., on a mobile application or an Internet website). The user may use the system to browse products (e.g., articles of furniture). A user may want to see a visualization of a product in the physical scene (e.g., in the room of the house). The system may perform process 500 to obtain a 2D image of the product within the physical scene to provide to the user.

Process 500 begins at block 502 where the system generates an extended reality (XR) scene of the physical scene. In some embodiments, the system may be configured to generate the XR scene using an XR system (e.g., XR system 102A described herein with reference to FIGS. 1A-1C). For example, the system may use ARKIT to generate the XR scene. In another example, the system may use ARCORE to generate the XR scene. In some embodiments, the system may be configured to generate an augmented reality (AR) scene from the physical scene. The AR scene may be shown on a display of the system (e.g., display 102B described herein with reference to FIGS. 1A-1C). The system may provide an AR interface through which a user can place virtual objects in the AR scene. The system may provide the user with a 3D model of the product which the user can place in the AR scene. The user may position the 3D model of the product in the AR scene. For example, the AR scene may be shown on a touch screen of the system, and the user may position the 3D model by dragging the 3D model to a location, and modifying its orientation. For example, the user may position a 3D model of an article of furniture in the AR scene by dragging the 3D model of the article of furniture to a location in the AR scene shown on the display. The user may adjust an orientation of the 3D model (e.g., by rotating and/or flipping the 3D model).

In some embodiments, the system may be configured to generate a virtual reality (VR) scene. The VR scene may be shown to the user on a display of the system (e.g., a VR headset or VR goggles). The system may provide a VR environment that the user can interact with. For example, the user may add 3D models of products in the VR environment. In some embodiments, the system may be configured to generate a VR environment that resembles a physical scene that the user wants to visualize the product in. For example, the system may generate a VR of a room in the user's house. The user may position a 3D model of the product in the VR environment. For example, the user may position a 3D model of an article of furniture in a virtual rendition of a room. In some embodiments, the system may be configured to generate an XR interface through which the user may indicate information about the physical scene. For example, the system may generate an XR interface through which a user can indicate light sources of the physical scene (e.g., by tapping on locations in the XR scene shown on a display of the device).

Next, process 500 proceeds to block 504 where the system generates XR scene information. In some embodiments, the XR scene information may include physical scene information (e.g., image of the physical scene and lighting information) and virtual scene information (e.g., product identification and position of product model to be placed in the XR scene). Examples of physical scene information and virtual scene information are described herein. The XR scene information may include information that is to be used by a server (e.g., server 104 described herein with reference to FIGS. 1A-1C) to generate the 2D image of the product within the physical scene.

The generation of XR scene information at block 504 begins at block 504A where the system obtains an image of a physical scene using a camera. In some embodiments, the system may be configured to obtain the image of the physical scene using a camera. The system may capture the of the physical scene in response to a user input. For example, the system may capture the image of the physical scene in response to a user selection in a touch screen display of the system. In another example, the system may capture the image of the physical scene in response to a voice command by the user. In some embodiments, the image of the physical scene may be an image of a portion of the physical scene (e.g., where a user wants to visualize placement of a product). The system may transmit a command instruction to a camera of the system to cause the digital camera to capture the image.

In some embodiments, the system may be configured to obtain multiple images of the physical scene. For example, the system may obtain multiple images of different portions of the physical scene. In some embodiments, the image may be an image of the physical scene composed from multiple images captured by the system. For example, the image may be a panoramic image of the physical scene composed by stitching together multiple images (e.g., using OPENCV's stitching library). The panoramic image may be captured by panning of a camera (e.g., from left to right by a user) and, while panning, using data from a gyroscope of the device to capture a total field of view in degrees. The system may capture frames of images while the camera is being panned. For example, the system may capture an image frame every 1, 2, 3, 4, 5, 6, 7, 8, 9, 10, 11, 12, 13, 14, or 15 degrees of panning.

In some embodiments, the system may be configured to capture the image in conjunction with displaying an XR scene on a display of the device. The system may be configured to generate the XR scene on the display of the device by obtaining an image feed from a camera. The system may be configured to capture the image of the physical scene by saving an XR scene shown on the display of the device (e.g., in response to a user input). In some embodiments, the system may be configured to generate a composite image. The system may be configured to generate the composite image by superimposing a 3D model of a product on the image of the physical scene shown in the XR scene.

In some embodiments, the system may be configured to obtain the image of the physical scene from a datastore. For example, the image of the physical scene may have been previously captured (e.g., when the system obtained a 2D image of another product in the physical scene). The system may have stored the image of the physical scene captured at the previous time. In some embodiments, the system may be configured to obtain the image of the physical scene.

Next, the generation of XR scene information at block 504 proceeds to block 504B where the system determines one or more camera setting values used to capture the image of the physical scene. In some embodiments, the system may be configured obtain the camera setting value(s) from an XR system (e.g., XR software) used by the device. For example, the system may use ARKIT to generate the XR scene at block 502. ARKIT may provide the camera setting value(s) to the system. The system may access the camera setting value(s) using an API command of the XR system that returns the camera setting value(s). For example, the system may submit a command to ARKIT querying for a value of camera exposure offset. In some embodiments, the system may be configured to determine values of camera exposure offset, vertical field of view, and horizontal field of view. For example, the system may obtain an exposure offset value of a frame in an XR scene of the system (e.g., the exposure offset value of the last captured frame of the XR scene). Examples of camera setting values are described herein.

In some embodiments, the system may be configured to determine a matrix transform for a position of the camera. For example, the system may determine a world transform for the camera position. The matrix transform may be used to place a virtual camera relative to a 3D scene from which a 2D image of the product within the physical scene is rendered. The virtual camera may be used to render the 2D image (e.g., as described herein with reference to FIG. 3). For example, the system may determine a 4×4 matrix transform that is provided to a server. The server may use the 4×4 matrix transform to adjust a floor plane in a template 3D scene (e.g., by applying the transform to a position of the floor plane in the template 3D scene). In some embodiments, the system may be configured to determine the matrix transform using an API command for an XR software application (e.g., ARKIT or ARCORE).

Next, the generation of XR scene information at block 504 proceeds 504C where the system identifies one or more floor planes in the XR scene. The system may be configured to automatically identify the floor plane(s) in the XR scene. In some embodiments, the system may identify the floor plane(s) by determining feature values from pixel values of an XR scene shown on a display of the system, and providing the feature values as input to a machine learning model to obtain output indicating the floor plane(s) in the XR scene. In some embodiments, the system may be configured to automatically identify floor plane(s) in the XR scene by identifying feature points in the scene indicating a floor plane(s). For example, the system may identify points in the scene corresponding to an identified change in geometry indicating a boundary of a floor plane (e.g., using a simultaneous localization and mapping (SLAM) model).

In some embodiments, the system may be configured to generate a visualization of the identified floor plane(s) in the XR scene. For example, the system may highlight the identified floor plane(s) in one or more colors. In some embodiments, the system may be configured to highlight different floor planes in different colors. For example, the system may highlight a first floor plane red and a second floor plane yellow. In some embodiments, the system may be configured to select a floor plane when there are multiple identified floor planes. The system may be configured to select the floor plane based on a user input (e.g., tapping of one of the identified floor planes shown in a display of the XR scene). In some embodiments, the system may be configured to select the floor plane automatically. The system may be configured to select the floor plane by identifying the floor plane that a user positions a 3D model of the product onto in the XR scene (e.g., at block 514).

In some embodiments, the system may be configured to determine a matrix transform from the identified floor plane(s). The matrix transform may be used to place a floor plane in a 3D scene from which a 2D image of the product within the physical scene is generated. For example, the system may determine a 4×4 matrix transform that is provided to a server. The server may use the 4×4 matrix transform to adjust a position of a virtual camera (e.g., by applying the transform to a default position of the virtual camera). In some embodiments, the system may be configured to determine the matrix transform using an API command for an XR software platform (e.g., ARKIT or ARCORE). The system may obtain the matrix transform in response to submitting the API command to the XR software platform.

Next, the generation of XR scene information at block 504 proceeds to block 504D where the system obtains an indication of one or more light sources in the physical scene. In some embodiments, the system may be configured to obtain the indication of the light source(s) using user input provided through an XR interface. For example, a user may tap locations in the XR scene displayed to the user corresponding to the light source(s). As an illustrative example, the physical scene may be a room and the user may tap locations on the displayed XR scene corresponding to light sources in the room (e.g., lights and/or windows). In some embodiments, the system may be configured to obtain indications of the light source(s) by having a user move a field of view of the camera to different areas of the physical scene, and obtaining indications of the light source(s) in each area of the physical scene.

In some embodiments, the system may be configured to automatically identify the light source(s) in the physical scene. In some embodiments, the system may be configured to automatically identify the light source(s) by determine feature values from pixel values of the XR scene shown on a display, and providing the feature values as input to a trained machine learning model (e.g., a neural network) to obtain an output indicating light source(s) detected in the XR scene. In some embodiments, the system may be configured to automatically identify the light source(s) in the physical scene using pixel values in a displayed XR scene. For example, the system may identify one or more ranges of pixel values as corresponding to a light source in the physical scene.

Next, the generation of XR scene information at block 504 proceeds to block 504E where the system determines light parameters in the physical scene. In some embodiments, the system may be configured to determine ambient light intensity and ambient light temperature in the physical scene. The system may be configured to determine the light parameters using imaging sensors of the system. For example, the system may determine the light parameters using imaging sensors of a camera used to capture an image used for generating the XR scene. In some embodiments, the system may be configured to determine the light parameters by querying an XR software platform (e.g., ARKIT or ARCORE). The system may transmit an API command that causes the XR software platform to provide values of one or more light parameters.

Next, the generation of XR scene information at block 504 proceeds to block 504F where the system determines, based on user input through the XR scene, position information indicative of a target position of a first product in the physical scene. The system may be configured to obtain user input indicating a position at which to place a 3D product model of the first product in the XR scene. In some embodiments, the system may be configured to provide a 3D product model which the user may position in the XR scene. For example, the system may provide an XR interface in which the user can drag the 3D product model to a location in the XR scene (e.g., corresponding to a location in the physical scene at which the user wants to visualize the product). In some embodiments, the system may be configured to determine an indication of the position at which the user placed the 3D product model in the XR scene (e.g., coordinates and/or a vector).

In some embodiments, the system may be configured to determine a matrix transform to apply to a 3D product model that is placed in a 3D scene. The matrix transform may be used to modify an orientation and/or location of the 3D product model in a template 3D scene. For example, the system may determine a 4×4 matrix transform that is provided to a server. The server may use the 4×4 matrix transform to adjust the location and/or orientation of the 3D product model in the 3D scene (e.g., by applying the transform to a default 3D product model position in the 3D scene). In some embodiments, the system may be configured to determine the matrix transform using an API command for an XR software platform (e.g., ARKIT or ARCORE).

In some embodiments, the system may be configured to obtain information identifying a product. The system may be configured to obtain the information identifying the product based on a user selection (e.g., on a website or in a mobile device application). In some embodiments, the system may be configured to determine an SKU code identifying the product among a plurality of products. In some embodiments, the system may be configured to determine a universal product code (UPC) of the product.

In some embodiments, the system may be configured to perform some, but not all, of the steps 504A-504F to generate the XR scene information at block 504. In some embodiments the system may be configured to perform the steps at blocks 504A and 504F without performing the steps at blocks 504B-504E. In some embodiments, the system may be configured to perform any combination of one or more of the steps at blocks 504A-504E of block 504 in process 500.

After generating the XR scene information at blocks 504, process 500 proceeds to block 506 where the system transmits the generated XR scene information to a server. The server may use the XR scene information to render the 2D image of the product within the physical scene. In some embodiments, the system may be configured to transmit the XR scene information to the server over a communication network (e.g., communication network 106 described herein with reference to FIGS. 1A-1C). In some embodiments, the system may be configured to transmit the XR scene information in response to a user input. For example, the system may transmit the XR scene information in response to a user selection of a graphical user interface element configured to cause the system to transmit the XR scene information to a server.

Next, process 500 proceeds to block 508 where the system obtains the 2D image of a second product within the physical scene. In some embodiments, the system may be configured to obtain the 2D image of the second product within the physical scene in response to transmitting the XR scene to the server. For example, the transmission of the XR scene information to the server may trigger a process to render the 2D image of the second product within the physical scene. The system may receive the 2D image of the second product within the physical scene as a communication over a network (e.g., the Internet). In some embodiments, the second product may be the same as the first product. In some embodiments, the second product may be different from the first product. For example, the second product may be identified by the server using information about a user of the system performing process 500.

Next, process 500 proceeds to block 510 where the system displays the 2D image to the user. For example, the system may display the 2D image as described at block 412 of process 400 described herein with reference to FIG. 4.

Although in example of process 500 the system obtains the 2D image of the second product in the physical scene from a server, in some embodiments, process 500 may be modified such that the system generates the 2D image of the second product in the physical scene instead of obtaining the 2D image of the second product in the physical scene from a server. The system may be configured to generate the 2D image of the second product in the physical scene by rendering the 2D image using the XR scene information obtained at block 504. In such embodiments, the steps at block 506 and 508 of transmitting information to a server and obtaining the 2D image from the server may be removed. In some embodiments, the system may be configured to perform process 200 described herein with reference to FIG. 2 and/or process 300 described herein with reference to FIG. 3 to generate the 2D image. In such embodiments, the steps at blocks 202 and 208 of process 200 of obtaining an image from another computing device and providing the 2D image to the other computing device may be removed. FIGS. 6A-6D show screenshots of various stages for generating XR scene information, according to some embodiments of the technology described herein. For example, the screen shots of FIG. 6A-6D may be generated from performing process 500 described herein with reference to FIG. 5.

Figure 6A:
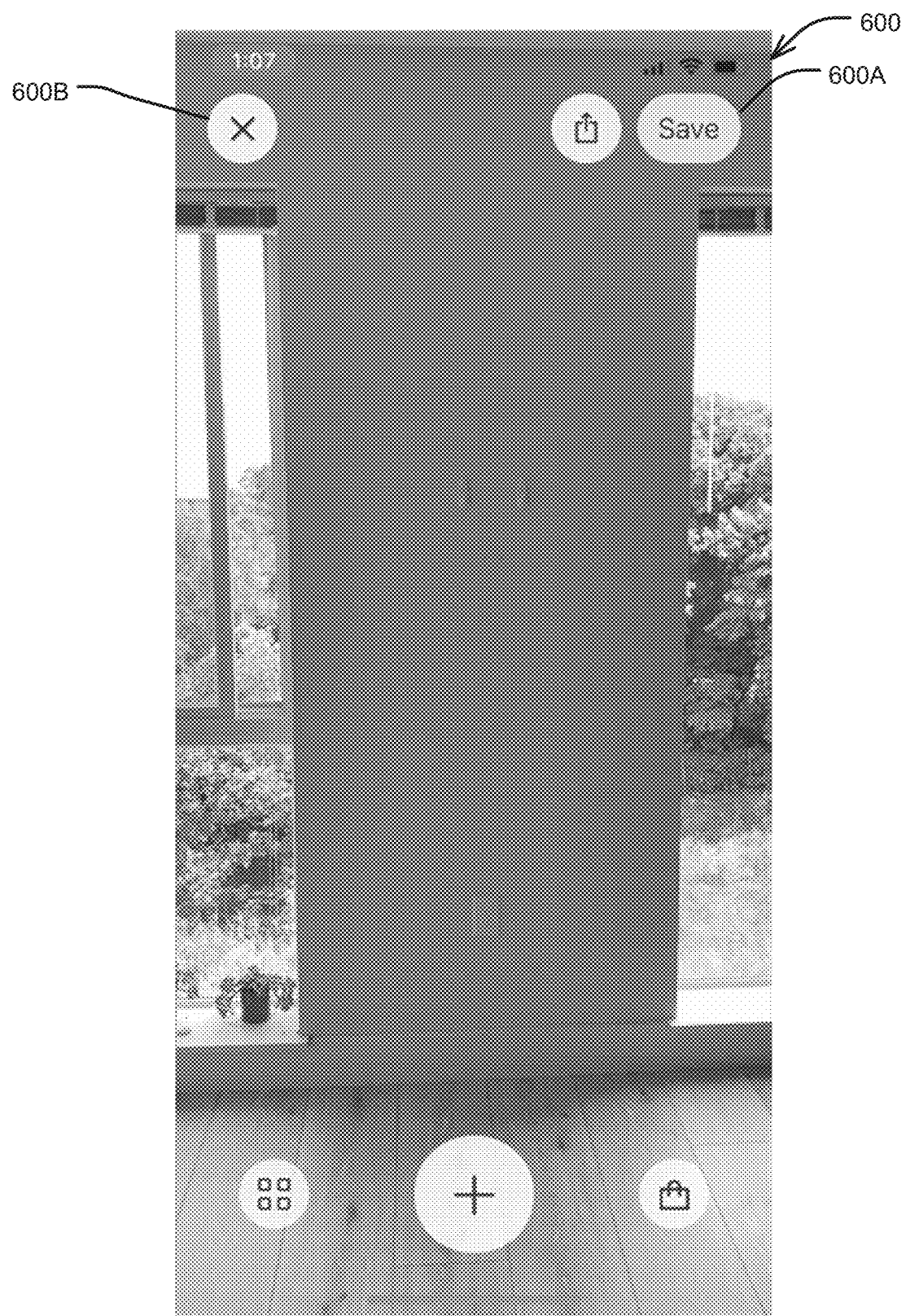
FIG. 6A shows an example of an XR scene shown on a display of a device, according to some embodiments of the technology described herein.

FIG. 6A shows an XR scene 600 on a display of a computing device (e.g., computing device 102). For example, the XR scene 600 may be an AR scene generated by the computing device from an image feed obtained from a camera coupled to the device (e.g., camera 102B). The XR scene 600 includes user interface elements on the XR scene 600. In the example of FIG. 6A, a display of the XR scene 600 includes a user interface element 600A for saving an image (e.g., currently shown on the display). The system may be configured to save the image shown on the screen in response to selection of the user interface element 600A. The display of the XR scene 600 includes a user interface element 600B to close the XR scene 600. The system may be configured to close the XR scene 600 in response to selection of the user interface element 600B.

Figure 6B:
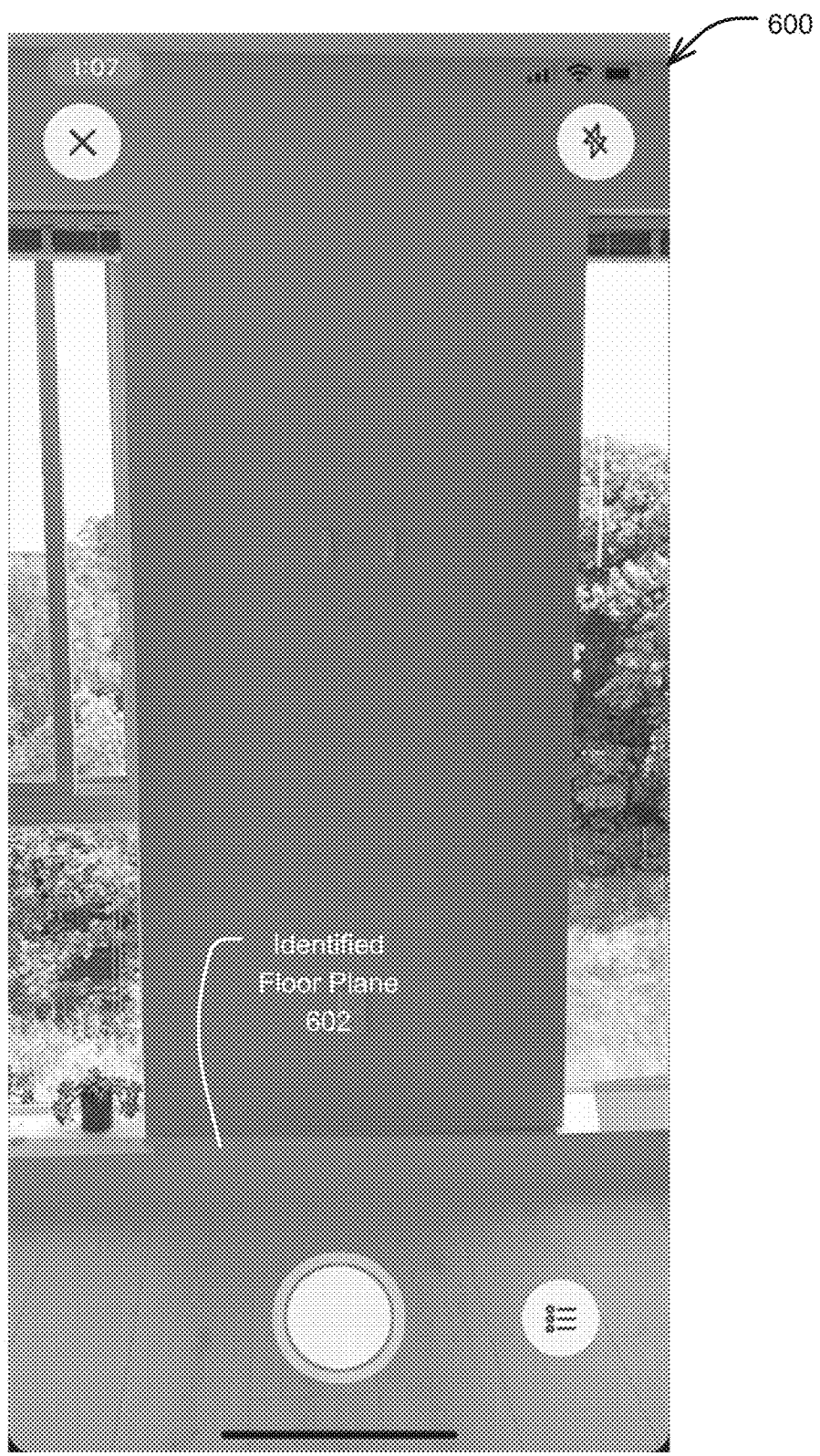
FIG. 6B illustrates identification of a floor plane in the XR scene of FIG. 6A, according to some embodiments of the technology described herein.

FIG. 6B shows the XR scene 600 with an identified floor plane 602 in the XR scene 600 highlighted. For example, the computing device may identify the floor plane 602 as described at block 508 of process 500 described herein with reference to FIG. 5. As shown in the example of FIG. 6B, the identified floor plane 602 is colored for indication to a user of the computing device.

Figure 6C:
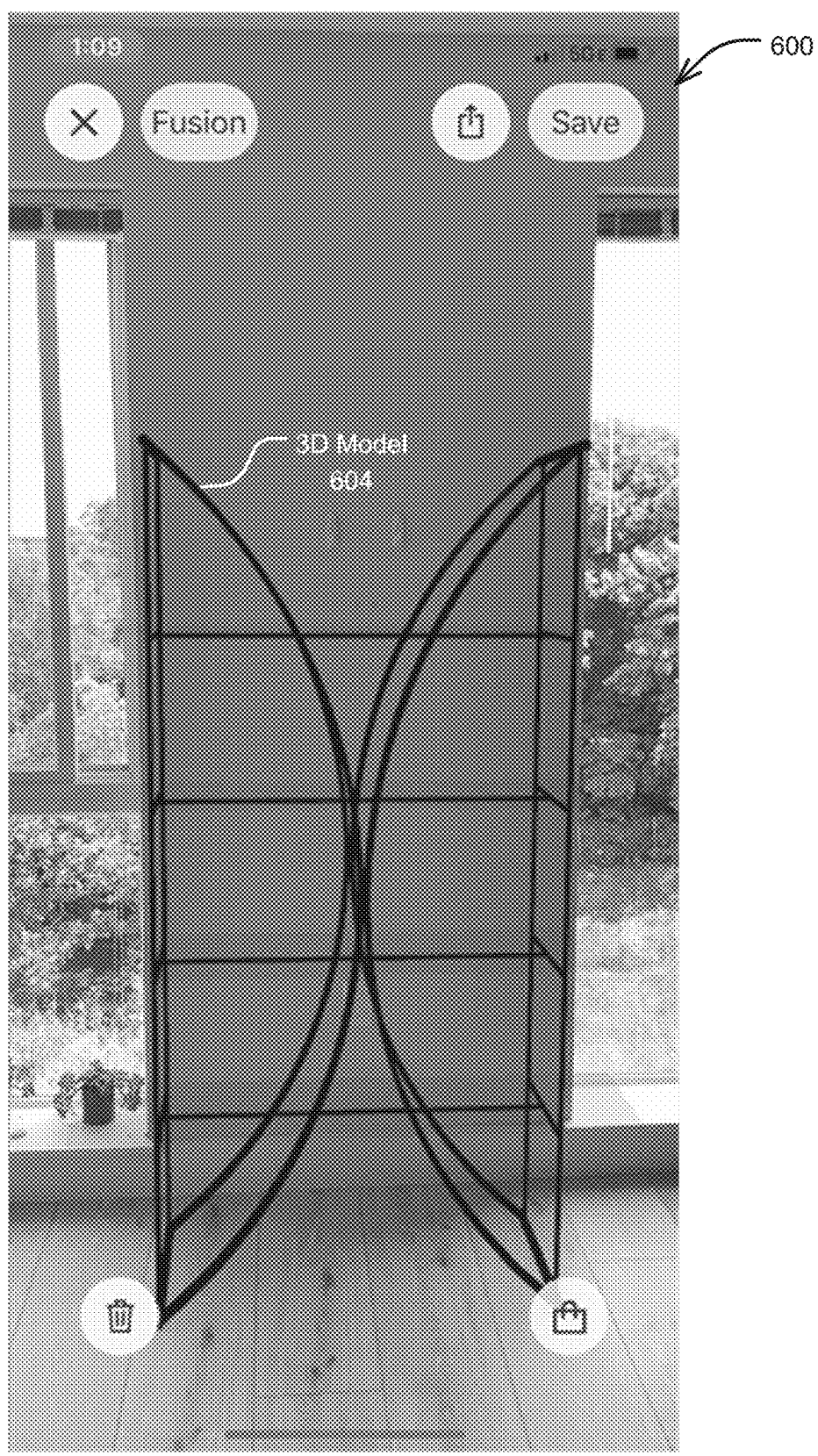
FIG. 6C shows an example of a first three-dimensional (3D) model of a product positioned within the XR scene of FIG. 6A, according to some embodiments of the technology described herein.

FIG. 6C shows XR scene 600 with a 3D model 604 of a product placed therein. The computing device may be configured to load the 3D product model in response to selection of the product by a user (e.g., on an Internet website or in a mobile application). The computing device may allow the user to position the 3D product model 604 in the XR scene 600 to indicate a location in the XR scene 600 at which to place the 3D product model (e.g., by sliding and/or rotating the 3D model 604). The user may position the 3D product model 604 in the XR scene 600 as described at block 514 of process 500. In the example of FIG. 6C, the 3D product model 604 is a model of a bookshelf that the user may want to visualize placed in the portion of the room shown in the XR scene 600.

Figure 6D:
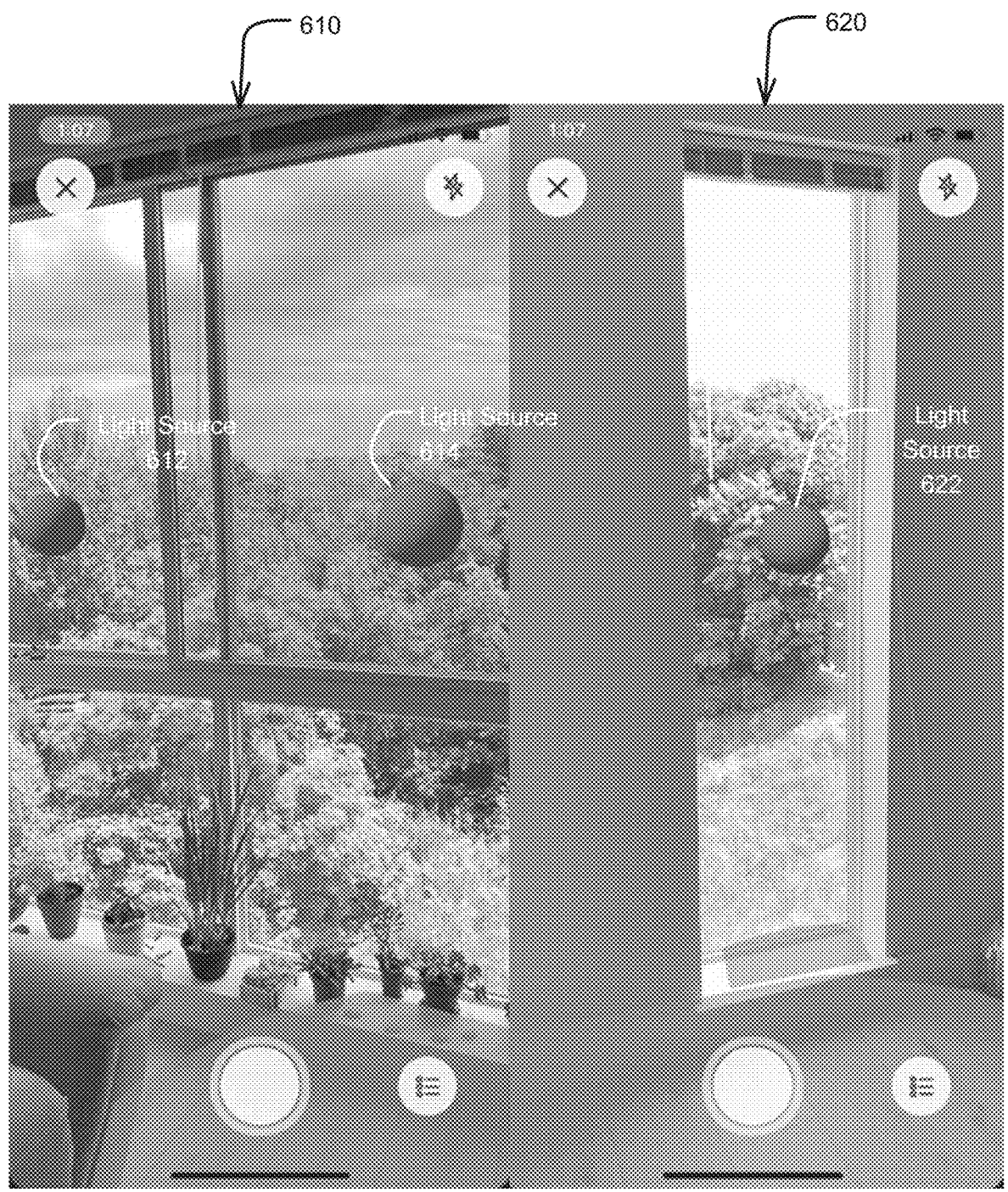
FIG. 6D illustrates identification of light sources in the XR scene of FIG. 6A, according to some embodiments of the technology described herein.

FIG. 6D illustrates identification of different sources of light in the physical scene. The light sources may be identified as described at block 510 of process 500. For example, a user may tap the light sources shown in the different parts of the physical scene. In the example of FIG. 6D, the scene 610 includes light sources 612-614, and the scene 620 includes light source 622. Each of the light sources 612-614, and 622 is a window through which light (e.g., sunlight) may enter the physical scene. Examples of other light sources are described herein.

FIGS. 7A-7D show screenshots of various GUIs generated for obtaining a 2D image of a product within a physical scene using a 3D model of the physical scene, according to some embodiments of the technology described herein. For example, the screen shots of FIG. 7A-7D may be generated from performing process 400 described herein with reference to FIG. 4.

Figure 7A:
FIG. 7A shows an example of a graphical user interface (GUI) showing a 3D model physical scene with a 3D product model positioned therein, according to some embodiments of the technology described herein.

FIG. 7A shows an example of a graphical user interface (GUI) 700 showing a 3D model of a physical scene ("3D scene") with a 3D product model 708 positioned therein, according to some embodiments of the technology described herein. The GUI 700 includes an interface that allows a user to select a 3D product model. The interface includes a search bar 702 in which a user may enter an identifier for the product (e.g., an SKU number). The interface also includes a selectable menu 704 from which a user may select a product category. In the example of FIG. 7A, the selected category is "Accent Chairs". The GUI 700 includes a listing of products in the selected category including items 706A an 706B. The user may select item 706A from the listing to obtain the 3D product model 708 to position in the 3D scene. The GUI may allow the user to adjust the view in the 3D scene and/or navigate to different positions in the 3D scene to obtain different perspectives.

Figure 7B:
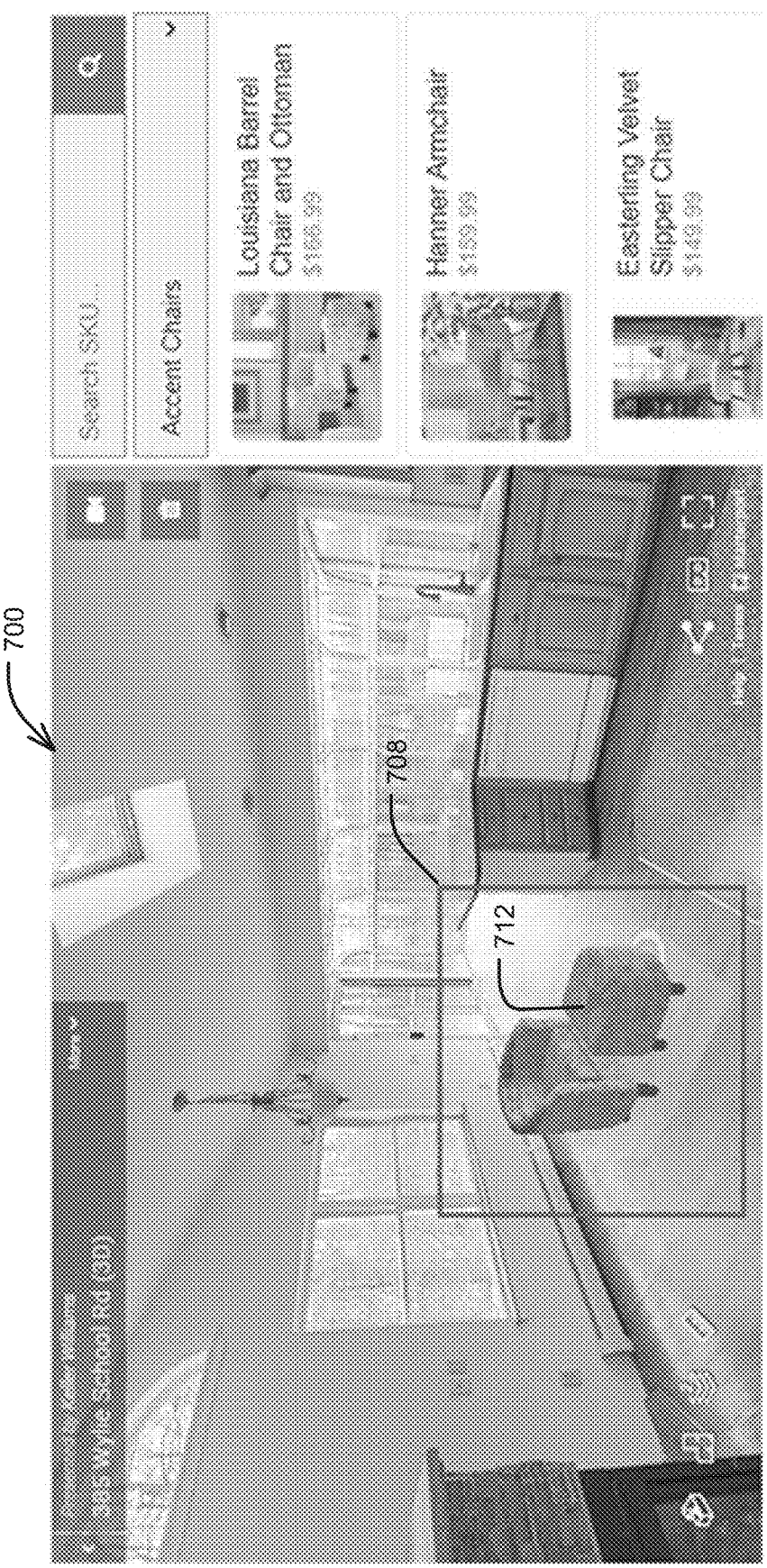
FIG. 7B shows an example of the 3D model of the product in FIG. 7A when the user has selected the 3D product model to change its position, according to some embodiments of the technology described herein.

FIG. 7B shows an example of the 3D model 708 of the product in FIG. 7A when the user has selected the 3D product model 708 to change its position, according to some embodiments of the technology described herein. As shown in FIG. 7B, the user has moved the cursor 712 to the 3D product model 708. The user may select the 3D product model 708 by clicking, tapping, or providing another user input. The user may then drag the 3D product model 708 to a different position. The GUI 700 may further allow the user to adjust an orientation of the 3D product model 708 (e.g., by rotating the 3D product model 708).

Figure 7C:
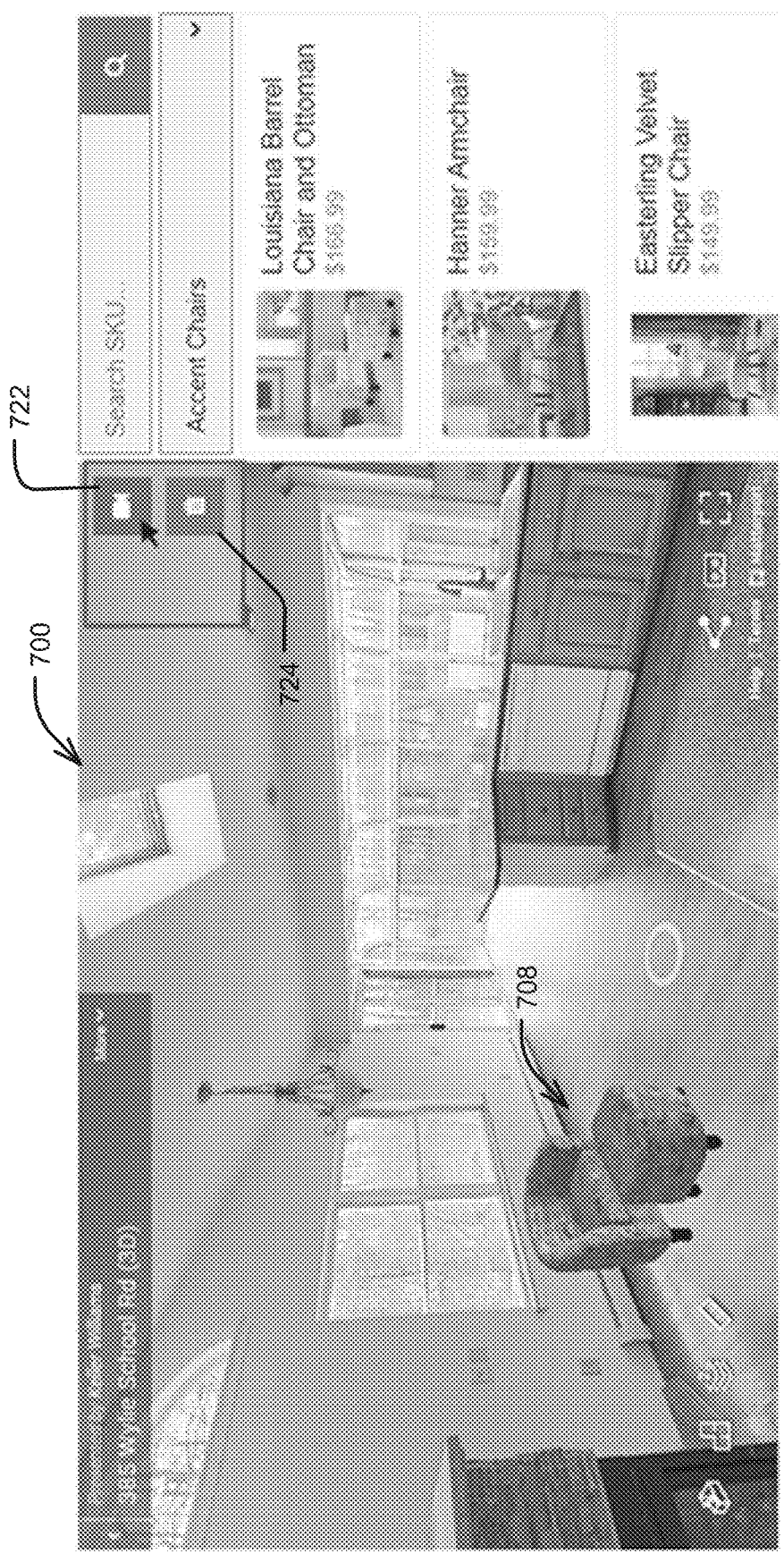
FIG. 7C shows an example of a user providing input through the GUI of FIG. 7A to render a 2D image of the product in the physical scene, according to some embodiments of the technology described herein.

FIG. 7C shows an example of a user providing input through the GUI 700 of FIG. 7A to render a 2D image of the product in the physical scene, according to some embodiments of the technology described herein. The GUI 700 includes a GUI element 722 that, when selected, causes the device to transmit information (e.g., an image of the physical scene, position information, and/or other information) to a server. The server may use the information to render a 2D image of the product in the physical scene. The GUI 700 further includes a GUI element 724 that allows the user to delete products from the 3D scene. For example, when the GUI element 724 is selected, a user may select the 3D product model 708 (e.g., by clicking or tapping) to remove it from the 3D scene.

Figure 7D:
FIG. 7D shows an example rendered 2D image of the product in the physical scene, according to some embodiments of the technology described herein.

FIG. 7D shows an example rendered 2D image 730 of the product in the physical scene, according to some embodiments of the technology described herein. The rendered image 730 includes the physical scene including an image 732 of the product. The rendered image 730 thus provides a visualization of the produce in the physical scene.

FIGS. 8A-8D show screenshots of rendering a 2D image of a product in a physical scene, according to some embodiments of the technology described herein. For example, the screenshots of FIG. 8A-8D may be generated while performing process 300 described herein with reference to FIG. 3.

Figure 8A:
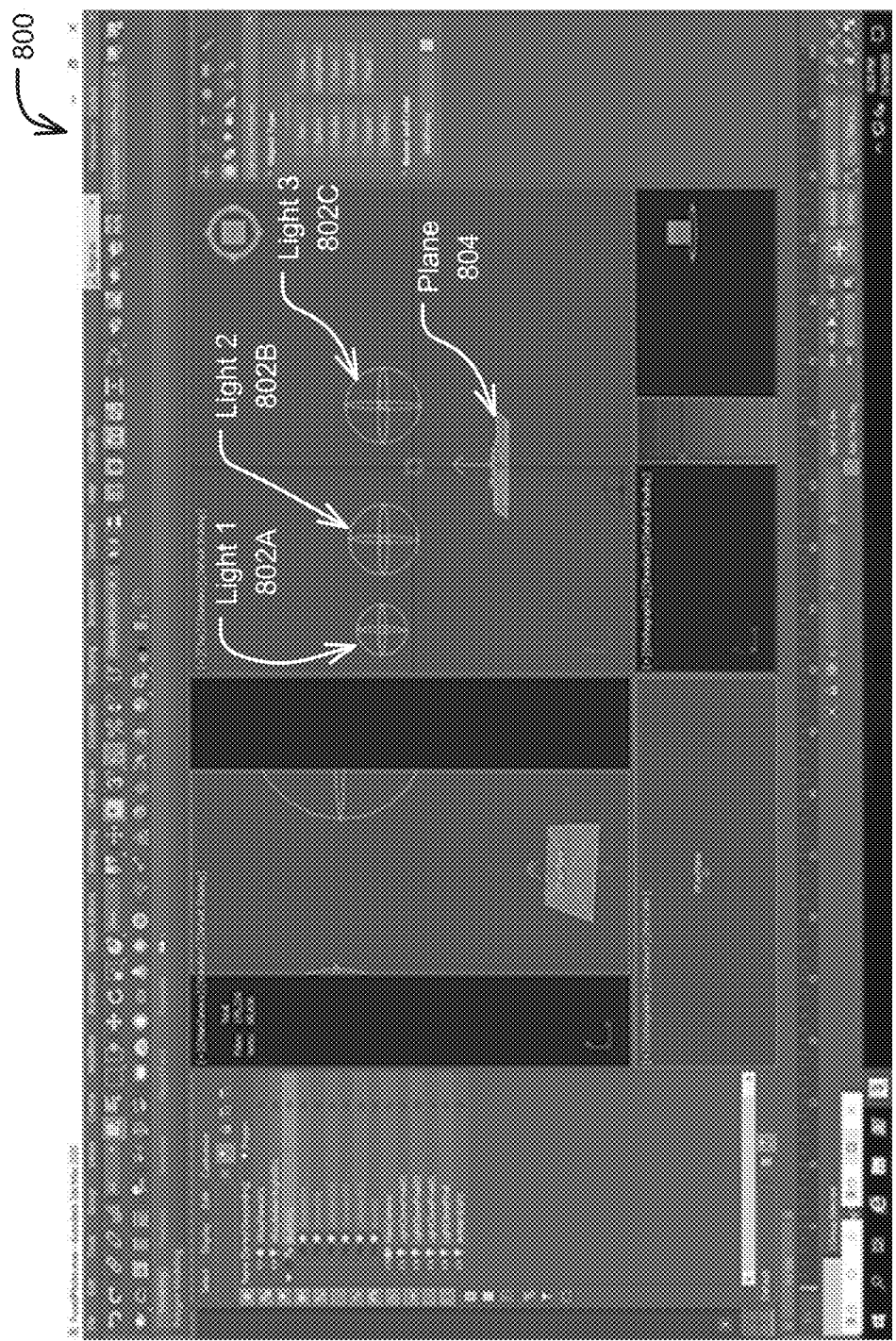
FIG. 8A shows an example of a 3D scene generated using information obtained from a device, according to some embodiments of the technology described herein.

FIG. 8A shows a screenshot of a 3D scene 800 generated by a server (e.g., server 104) using information obtained from a device (e.g., position information, lighting information, camera information, and/or other information). As shown in FIG. 8A, the 3D scene 800 includes lights 802A-C. The lights 802A-C may be placed in the 3D scene 800 using indications (e.g., coordinates) of light sources in the physical scene (e.g., indicated in the XR scene as shown in FIG. 6D). The 3D scene 800 includes a plane 804 which is positioned in the 3D scene 800 using an indication of an identified floor plane (e.g., as described at block 306 of process 300 described herein with reference to FIG. 3). For example, the plane 804 may be a template plane that the server positions in the 3D scene 800 by applying a matrix transform (e.g., to a template floor plane) obtained from the computing device.

Figure 8B:
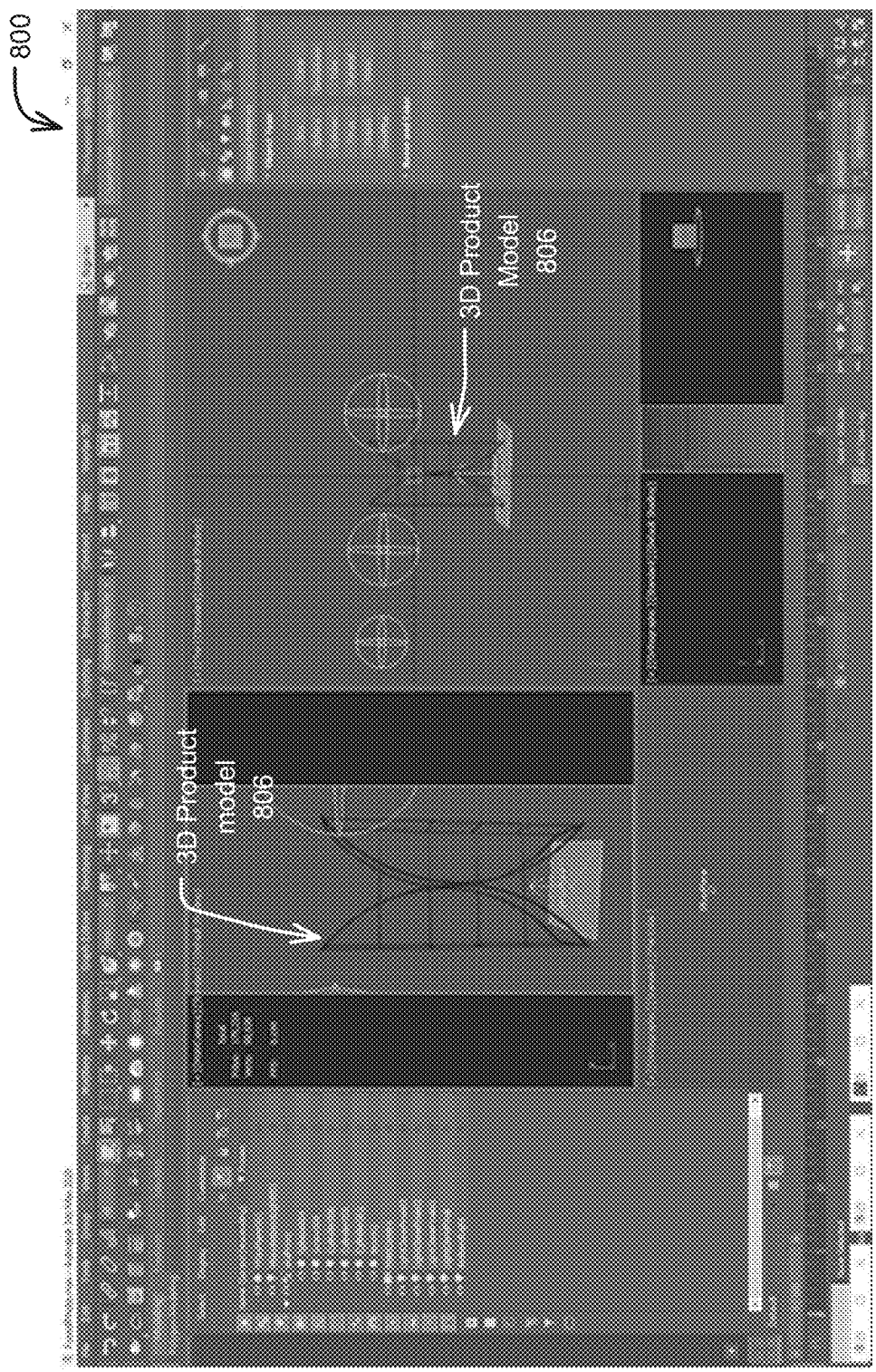
FIG. 8B shows an example of a 3D product model positioned in the 3D scene of FIG. 8A, according to some embodiments of the technology described herein.

FIG. 8B shows a 3D model 806 of the product positioned in the 3D scene 800. The 3D model of the product 806 may be positioned in the 3D scene 800 using position information (e.g., obtained using a 3D model of the physical scene or an XR scene). The server may position the 3D product model 806 as described at block 304 of process 300. For example, the server may position the 3D product model 806 in the 3D scene 800 by: (1) accessing the 3D product model 806 using an identification obtained from the computing device; (2) placing the 3D product model 806 at coordinates obtained from the computing device; and (3) applying a matrix transform obtained from the computing device to the 3D product model 806 to orient the 3D model 806 (e.g., by rotating the 3D model 806).

Figure 8C:
FIG. 8C shows an example image of a physical scene, according to some embodiments of the technology described herein.

FIG. 8C shows an image of the physical scene 808 obtained from the computing device. As shown in the example of FIG. 8C, the image of the physical scene may be a portion of the physical scene in which the user wants to visualize the product. The server may apply the image of the physical scene 808 as a background in the 3D scene 800 (e.g., as described at block 308 of process 300).

Figure 8D:
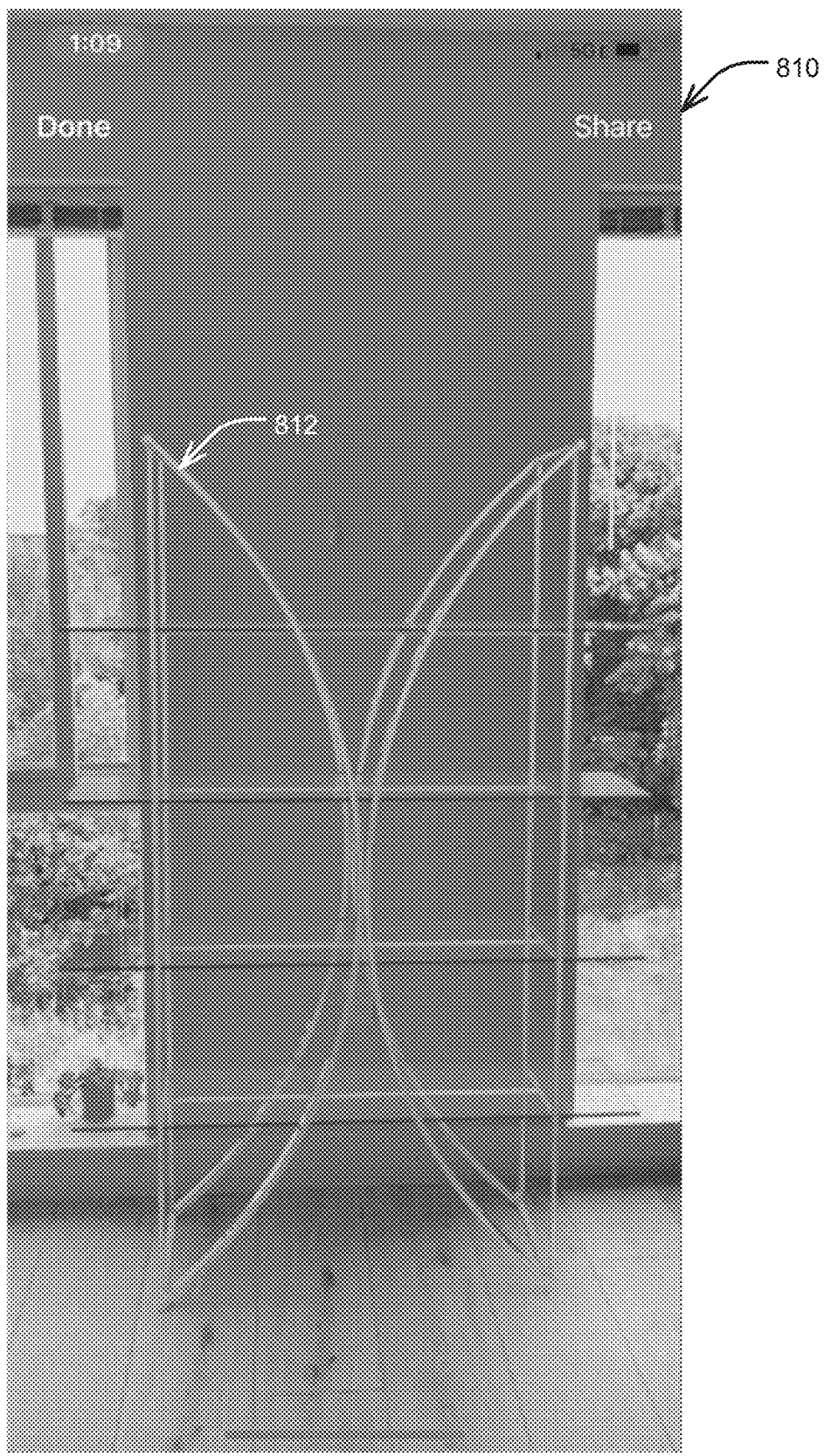
FIG. 8D shows an example of a generated 2D image of the product within the physical scene, according to some embodiments of the technology described herein.

FIG. 8D shows a 2D image 810 of the product within the physical scene rendered from the 3D scene 800. As shown in FIG. 8D, the product 812 is placed in the image of the physical scene as indicated by the location in the XR scene where the user had placed a 3D model. As shown in FIG. 8D, the product 812 shown in the 2D image 810 provides a more realistic representation of the product than the 3D model 604 placed in the XR scene of FIG. 6C. For example, the product 812 in the 2D image 810 shows the white color of the support structures, and the transparency of the glass shelves. By contrast, the 3D model 604 placed in the XR scene shown in FIG. 6C, does not depict the color of the product or the translucency of the glass shelves as accurately as the 2D image 810.

Figure 9:
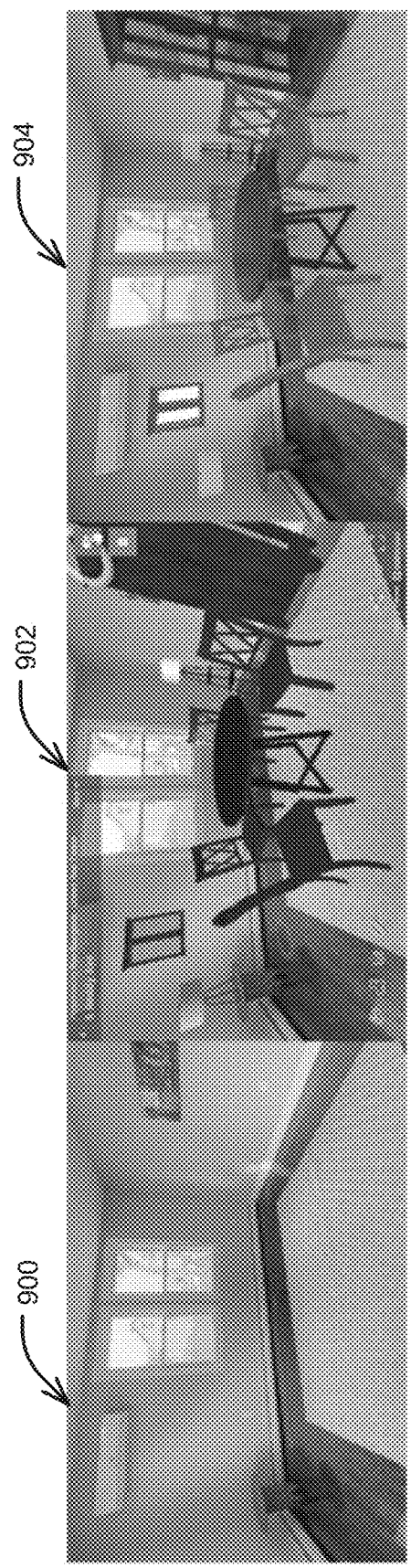
FIG. 9 shows an example sequence of stages for generating a 2D image of a product within a physical scene, according to some embodiments of the technology described herein.

FIG. 9 shows an example sequence of stages for generating a 2D image of a product within a physical scene, according to some embodiments of the technology described herein. For example, the sequence of stages in FIG. 9 may be reached by performing process 400 described herein with reference to FIG. 4. The first screenshot 900 shows a 3D model of a physical scene. The second screenshot 902 shows the 3D model of the physical scene with a 3D product model positioned therein. The third screenshot 904 shows a rendered 2D image of the product in the physical scene. As can be appreciated from FIG. 9, the 3D model of the product does not accurately depict the product as the rendered 2D image (e.g., due to a lower resolution of the model). The rendered 2D image may thus provide a user with a more accurate depiction of the product in the physical scene.

Figure 13:
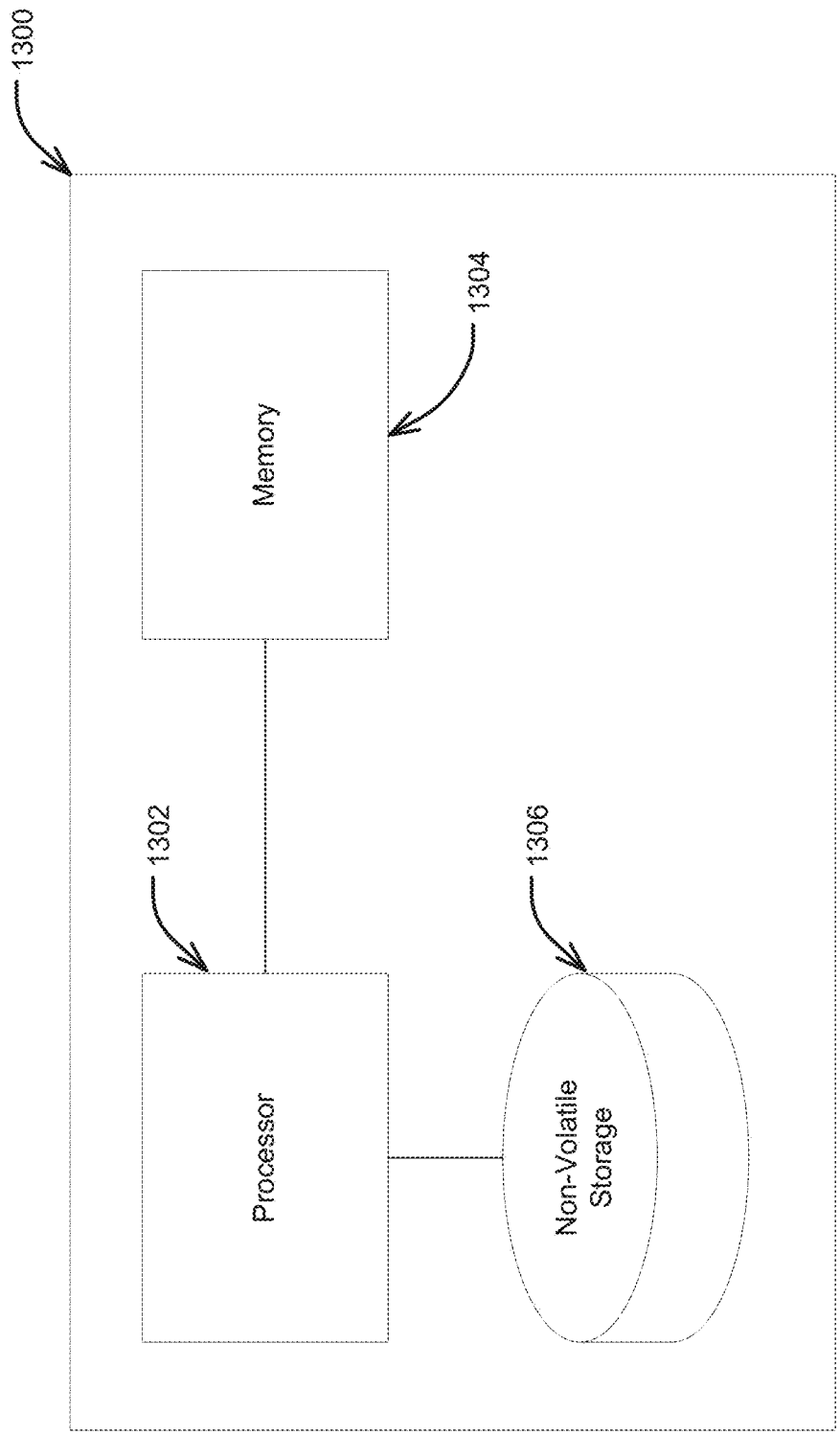
FIG. 13 is a block diagram of an example computer system, according to some embodiments of the technology described herein.

FIG. 13 shows a block diagram of an example computer system 1300 that may be used to implement embodiments of the technology described herein. The computing device 1300 may include one or more computer hardware processors 1302 and non-transitory computer-readable storage media (e.g., memory 1304 and one or more non-volatile storage devices 1306). The processor(s) 1302 may control writing data to and reading data from (1) the memory 1304; and (2) the non-volatile storage device(s) 1306. To perform any of the functionality described herein, the processor(s) 1302 may execute one or more processor-executable instructions stored in one or more non-transitory computer-readable storage media (e.g., the memory 1304), which may serve as non-transitory computer-readable storage media storing processor-executable instructions for execution by the processor(s) 1302.

The terms "program" or "software" are used herein in a generic sense to refer to any type of computer code or set of processor-executable instructions that can be employed to program a computer or other processor (physical or virtual) to implement various aspects of embodiments as discussed above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform tasks or implement abstract data types. Typically, the functionality of the program modules may be combined or distributed.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method for obtaining a two-dimensional (2D) image of one or more products in a physical scene, the method performed by a computing device comprising a computer hardware processor, the method comprising:
   obtaining a three-dimensional (3D) model of the physical scene;
   generating an image of the physical scene using the 3D model of the physical scene;
   determining, based on input provided by a user through a graphical user interface (GUI), position information indicative of a target position of a first product in the physical scene;

transmitting, via a communication network to another computing device, the image of the physical scene and the position information;

receiving, via the communication network from the other computing device, a plurality of 2D images of a respective plurality of products, each of the plurality of products being of a same type as the first product and being a different product from the first product, each of the plurality of 2D images including an image of respective one of the plurality of products in the physical scene and being rendered using the image of the physical scene and the position information; and displaying the plurality of 2D images of the respective plurality of products.

2. The method of claim 1, further comprising displaying the 3D model of the physical scene in the GUI.

3. The method of claim 1, wherein determining the position information indicative of the target position comprises determining the target position based on input provided by the user through the GUI to position a model of the first product in the 3D model of the physical scene.

4. The method of claim 1, further comprising:
determining a field of view of a camera for capturing the image of the physical scene; and
transmitting, via the communication network to the other computing device, the field of view for use in rendering the plurality of 2D images of the respective plurality of products.

5. The method of claim 1, wherein the image of the physical scene comprises a panorama generated using the 3D model of the physical scene.

6. The method of claim 5, further comprising:
obtaining a rotation angle of the panorama relative to a camera position; and
transmitting the rotation angle of the panorama relative to the camera position to the other computing device via the communication network.

7. The method of claim 1, further comprising determining a plane in the 3D model of the physical scene using ray casting.

8. The method of claim 1, wherein the first product is selected from a group consisting of furniture, floor covering, décor, light fixture, appliance, art, wall covering, flooring, bedding, storage container, fencing, heating device, cooling device, bathroom accessory, wall fixture, plant, organization accessory, kitchen accessory, cookware, and tableware.

9. The method of claim 1, wherein the indication of the target position of the first product in the physical scene comprises an indication of a position of a model of the first product in a 3D scene.

10. A system for obtaining a 2D image of one or more products in a physical scene, the system comprising:
a computer hardware processor; and
a non-transitory computer-readable storage medium storing instructions that, when executed by the computer hardware processor, cause the computer hardware processor to perform:
obtaining a three-dimensional (3D) model of the physical scene;
generating an image of the physical scene using the 3D model of the physical scene;
determining, based on input provided by a user through a graphical user interface (GUI), position information indicative of a target position of a first product in the physical scene;
transmitting, via a communication network to another computing device, the image of the physical scene and the position information;
receiving, via the communication network from the other computing device, a plurality of 2D images of a respective plurality of products, each of the plurality of products being of a same type as the first product and being a different product from the first product, each of the plurality of 2D images including an image of a respective one of the plurality of products in the physical scene and being rendered using the image of the physical scene and the position information; and
displaying the plurality of 2D images of the respective plurality of products.

11. The system of claim 10, wherein the instructions further cause the computer hardware processor to perform displaying the 3D model of the physical scene in the GUI.

12. The system of claim 10, wherein determining the position information indicative of the target position comprises determining the target position based on input provided by the user through the GUI to position a model of the first product in the 3D model of the physical scene.

13. The system of claim 10, wherein the instructions further cause the computer hardware processor to perform:
determining a field of view of a camera for capturing the image of the physical scene; and
transmitting, via the communication network to the other computing device, the field of view for use in rendering the plurality of 2D images of the respective plurality of products.

14. The system of claim 10,
wherein the image of the physical scene comprises a panorama generated using the 3D model of the physical scene, and
wherein the instructions further cause the computer hardware processor to perform:
obtaining a rotation angle of the panorama relative to a camera position; and
transmitting, via the communication network to the other computing device, the rotation angle of the panorama relative to the camera position for use in rendering the plurality of 2D images of the respective plurality of products.

15. A non-transitory computer-readable storage medium storing instructions that, when executed by a computer hardware processor, cause the computer hardware processor to perform:
obtaining a three-dimensional (3D) model of a physical scene;
generating an image of the physical scene using the 3D model of the physical scene;
determining, based on input provided by a user through a graphical user interface (GUI), position information indicative of a target position of a first product in the physical scene;
transmitting, via a communication network to another computing device, the image of the physical scene and the position information;
receiving, via the communication network from the other computing device, a plurality of 2D images of a respective plurality of products, each of the plurality of products being of a same type as the first product and being a different product from the first product, each of the plurality of 2D images including a respective image of one of the plurality of products in the physical scene and being rendered using the image of the physical scene and the position information; and displaying the plurality of 2D images of the respective plurality of products.

16. A method for generating a two-dimensional (2D) image of one or more products in a physical scene, the method performed by a computing device comprising a computer hardware processor, the method comprising:

obtaining a three-dimensional (3D) model of the physical scene;

generating an image of the physical scene using the 3D model of the physical scene;

determining, based on input provided by a user through a graphical user interface (GUI), position information indicative of a target position of a first product in the physical scene;

generating a plurality of 2D images of a respective plurality of products, each of the plurality of products being of a same type as the first product and being a different product from the first product, each of the plurality of 2D images including a respective image of one of the plurality of products in the physical scene using the image of the physical scene and the position information; and displaying the plurality of 2D images of the respective plurality of products.

17. The method of claim 16, wherein generating the plurality of 2D images of the respective plurality products in the physical scene using the image of the physical scene and the position information comprises rending the plurality of 2D images of the respective plurality products in the physical scene using the image of the physical scene, the position information, and 3D models of the respective plurality products.

18. The method of claim 16, wherein generating the plurality of 2D images of the respective plurality products in the physical scene comprises:

generating a 3D scene, the 3D scene including 3D models of the respective plurality products positioned in the 3D scene in accordance with the target position; and rendering the 2D image of the respective plurality products in the physical scene using the 3D scene.

19. The method of claim 18, further comprising determining one or more camera setting values used to capture the image of the physical scene, wherein generating the plurality of 2D images of the respective plurality products in the physical scene comprises rendering the 2D image of the respective plurality products in the physical scene using a virtual camera configured with the one or more camera setting values.

20. The method of claim 19, wherein the image of the physical scene comprises a panorama, and the one or more camera setting values comprise a rotation angle of the panorama relative to a camera position.

21. The method of claim 16, wherein the indication of the target position of the first product in the physical scene comprises an indication of a position of a model of the first product in the 3D model of the physical scene.

22. A system for obtaining a 2D image of one or more products in a physical scene, the system comprising:

a computer hardware processor; and a non-transitory computer-readable storage medium storing instructions that, when executed by the computer hardware processor, cause the computer hardware processor to perform:

obtaining a three-dimensional (3D) model of the physical scene;

generating an image of the physical scene using the 3D model of the physical scene;

determining, based on input provided by a user through a graphical user interface (GUI), position information indicative of a target position of a first product in the physical scene;

generating a plurality of 2D images of a respective plurality of products, each of the plurality of products being of a same type as the first product and being a different product from the first product, each of the plurality of 2D images including a respective image of one of the plurality of products in the physical scene using the image of the physical scene and the position information; and displaying the plurality of 2D images of the respective plurality of products.

23. A non-transitory computer-readable storage medium storing instructions that, when executed by a computer hardware processor, cause the computer hardware processor to perform:

obtaining a three-dimensional (3D) model of a physical scene;

generating an image of the physical scene using the 3D model of the physical scene;

determining, based on input provided by a user through a graphical user interface (GUI), position information indicative of a target position of a first product in the physical scene;

generating a plurality of 2D images of a respective plurality of products, each of the plurality of products being of a same type as the first product and being a different product from the first product, each of the plurality of 2D images including a respective image of one of the plurality of products in the physical scene using the image of the physical scene and the position information; and displaying the plurality of 2D images of the respective plurality of products.

* * * * *